Feb. 14, 1967 S. P. LOVAS ET AL 3,303,628
PACKAGING MACHINE AND METHOD OF FORMING PACKAGES
Filed Dec. 17, 1962 33 Sheets-Sheet 3
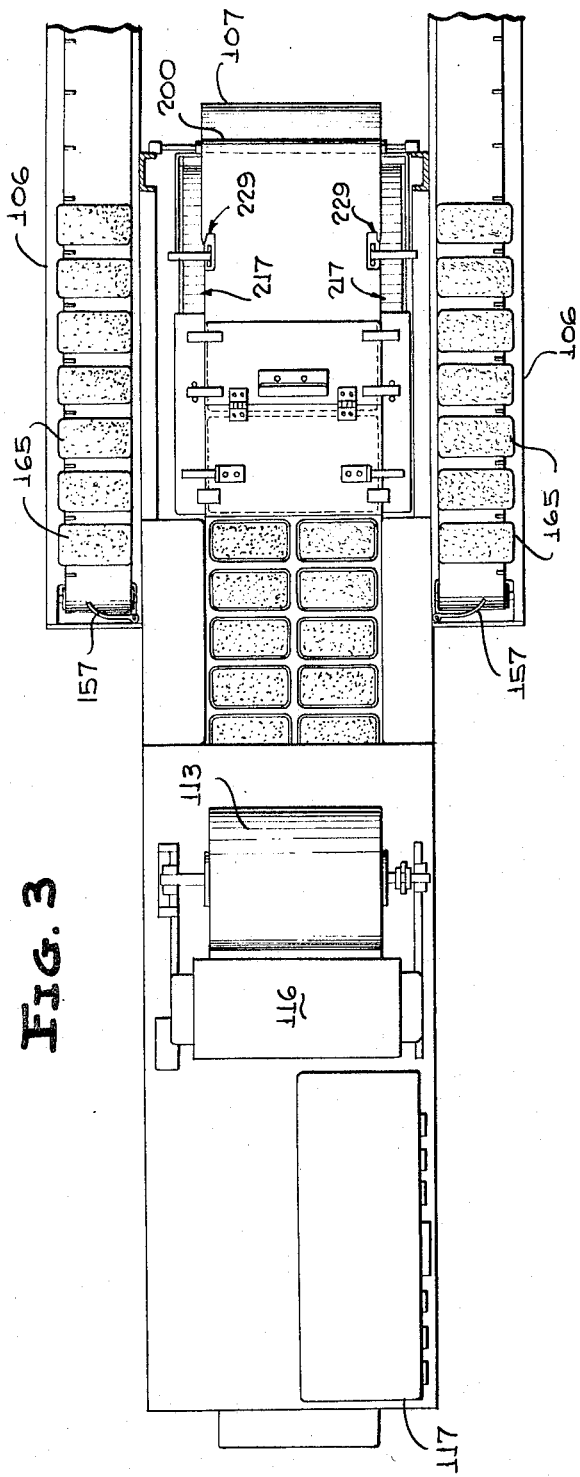
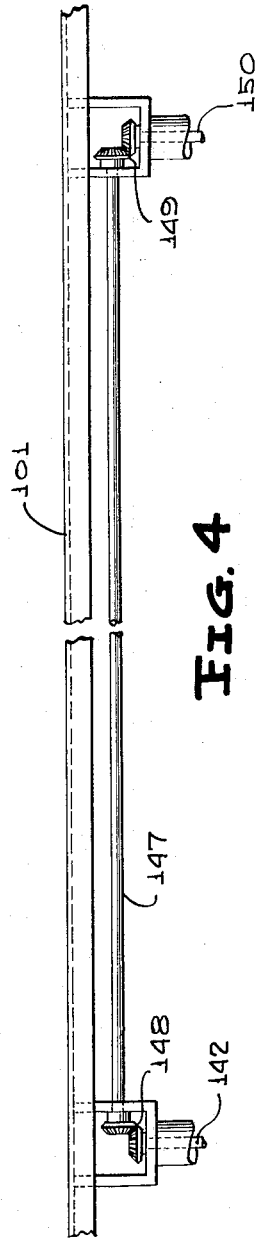
INVENTORS
STEPHEN P. LOVAS &
GEORGE S. DiMONICO
BY
Mason, Porter, Diller & Stewart
ATTORNEYS

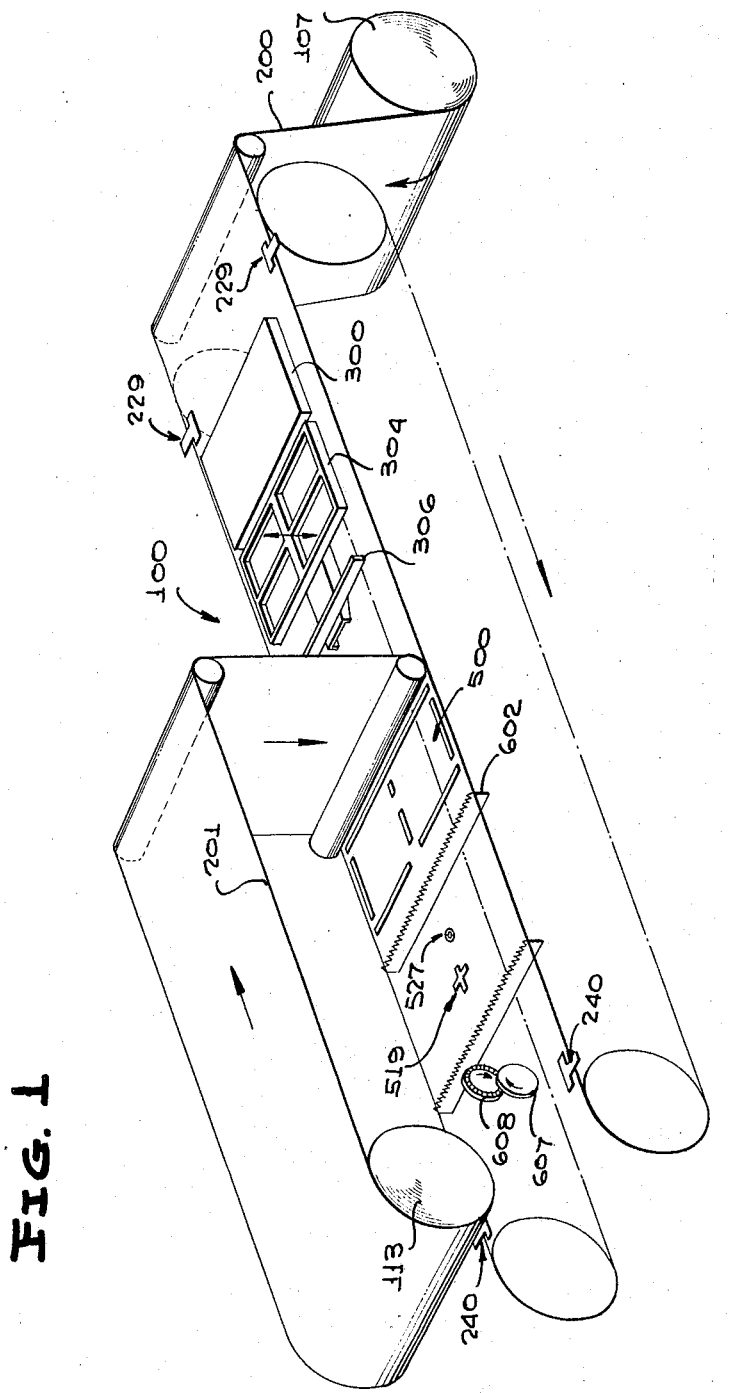

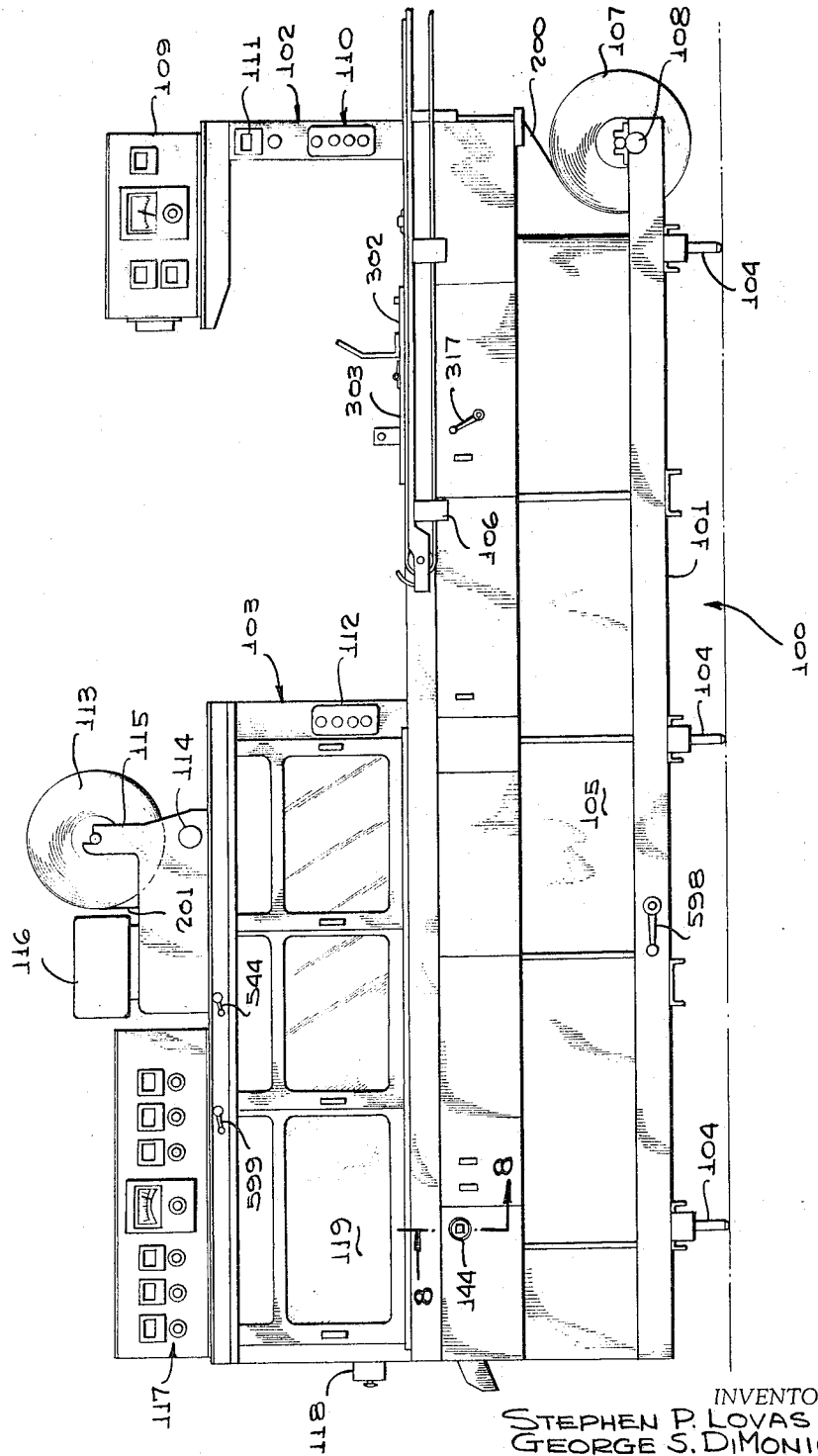

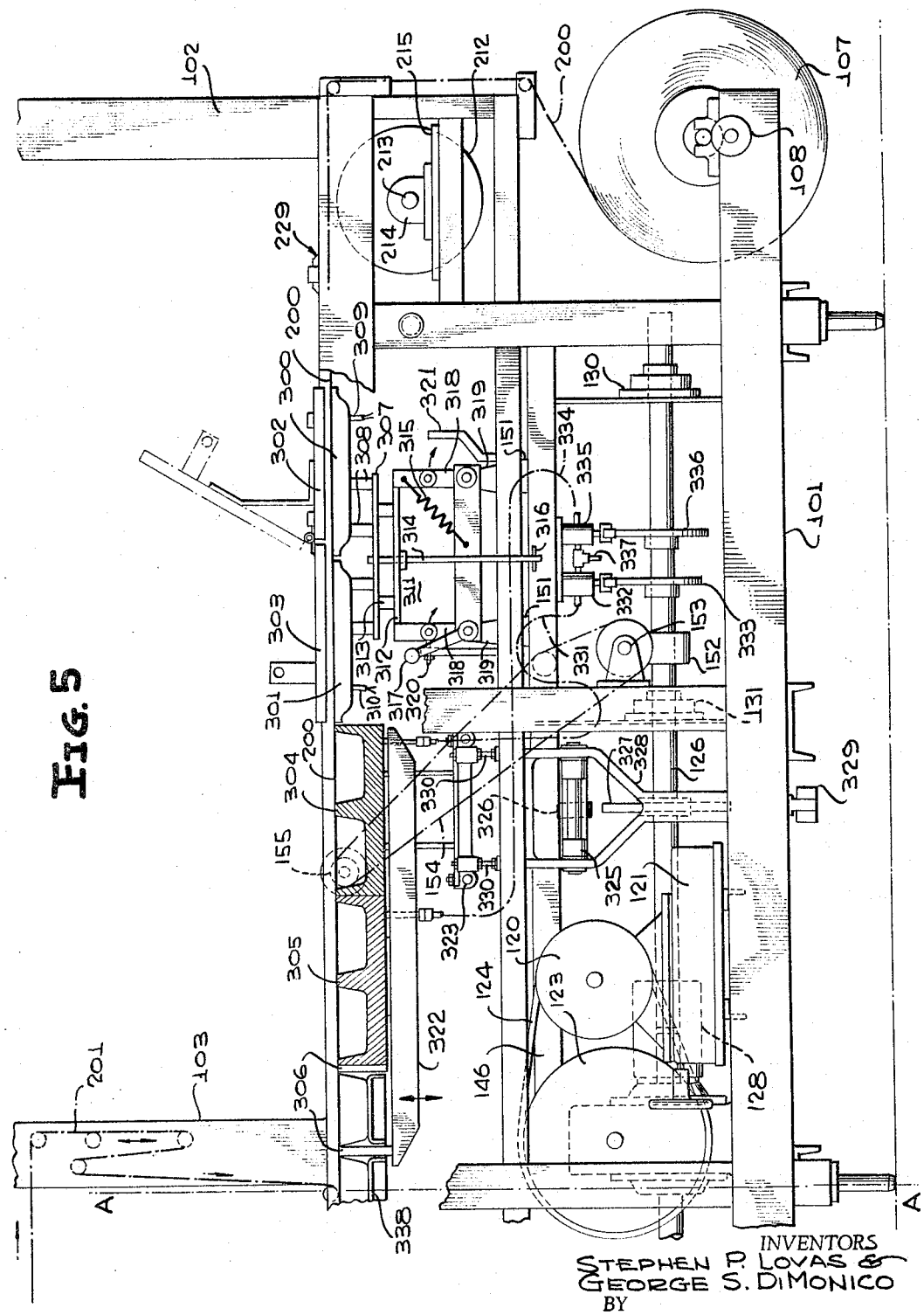

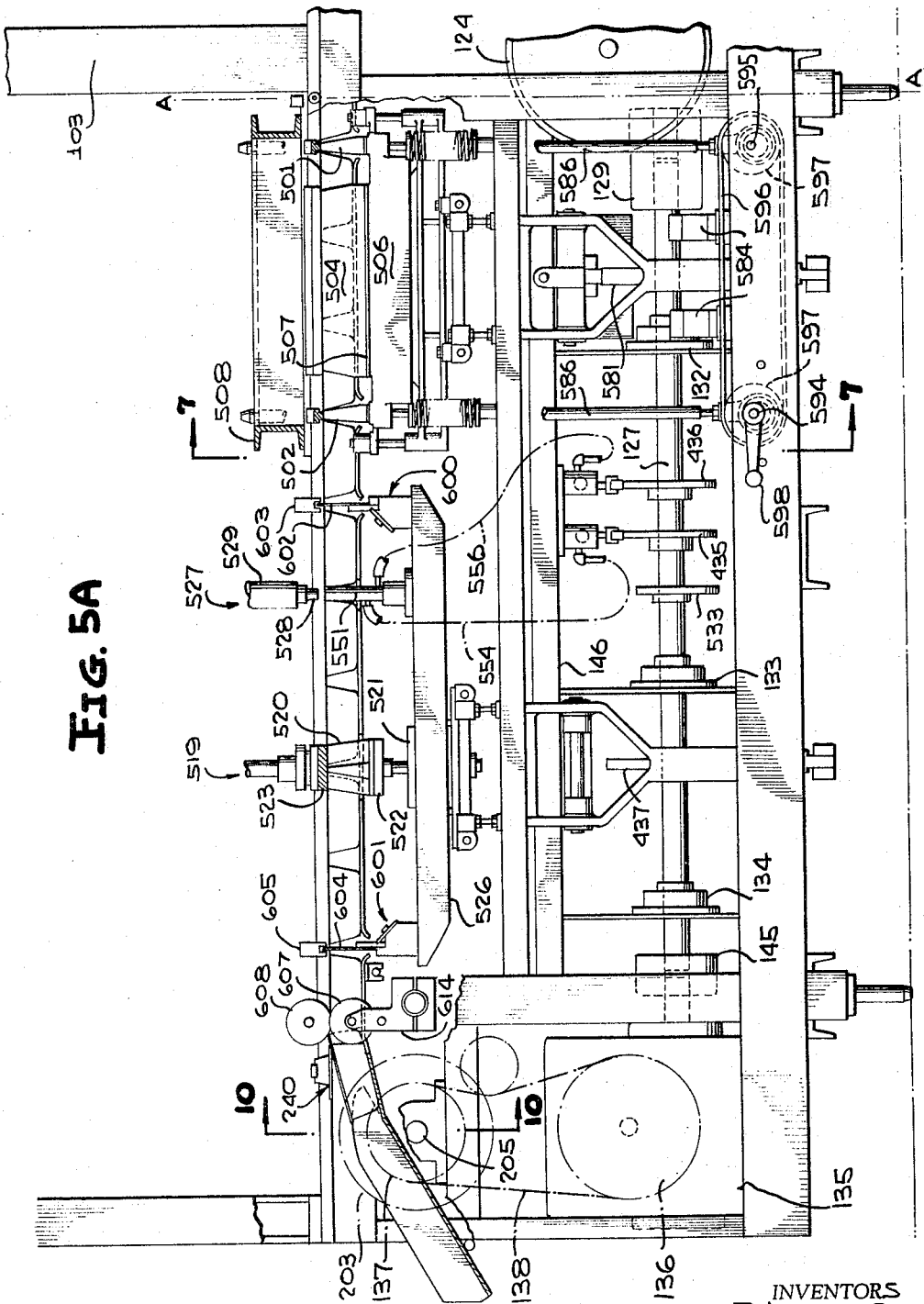

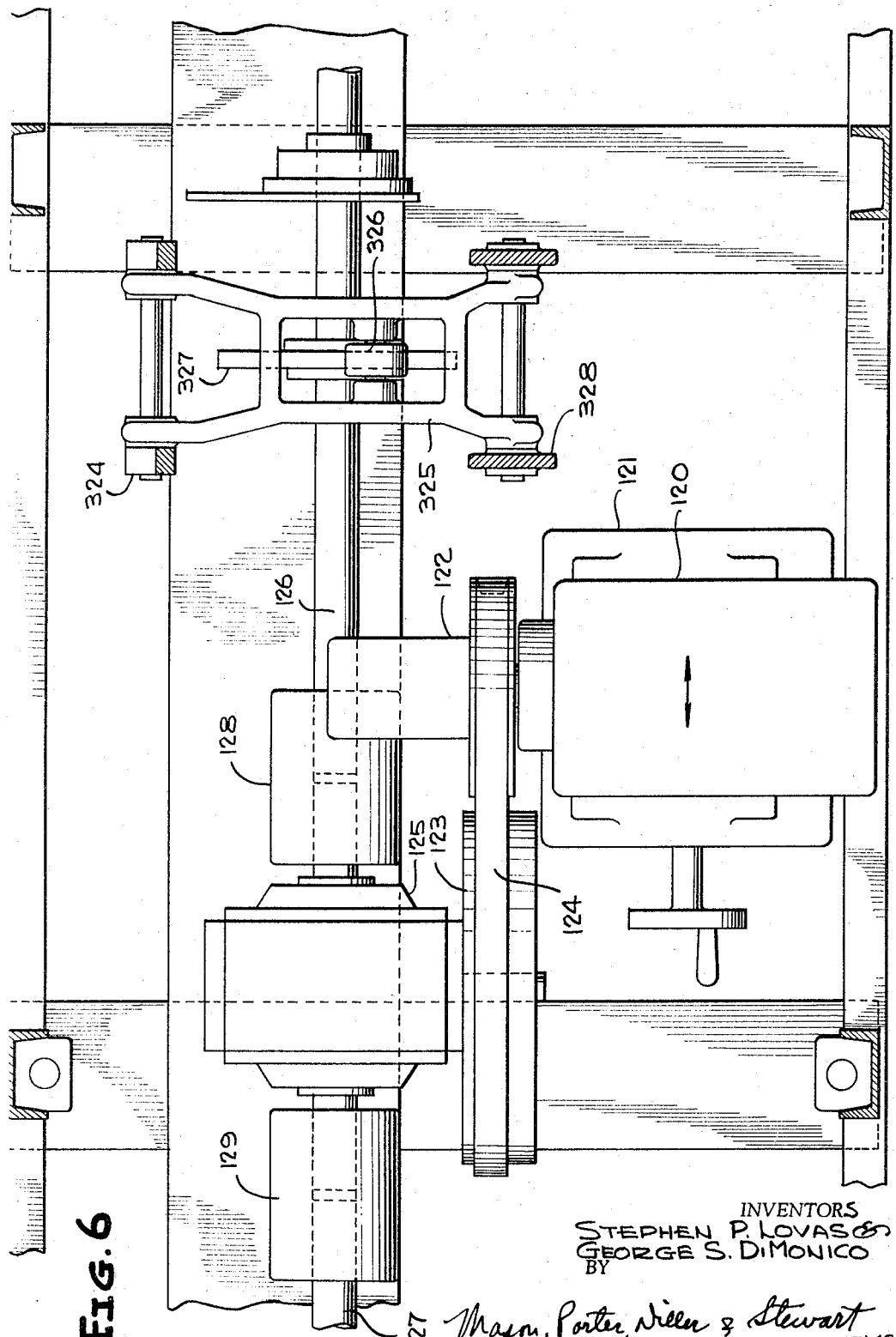

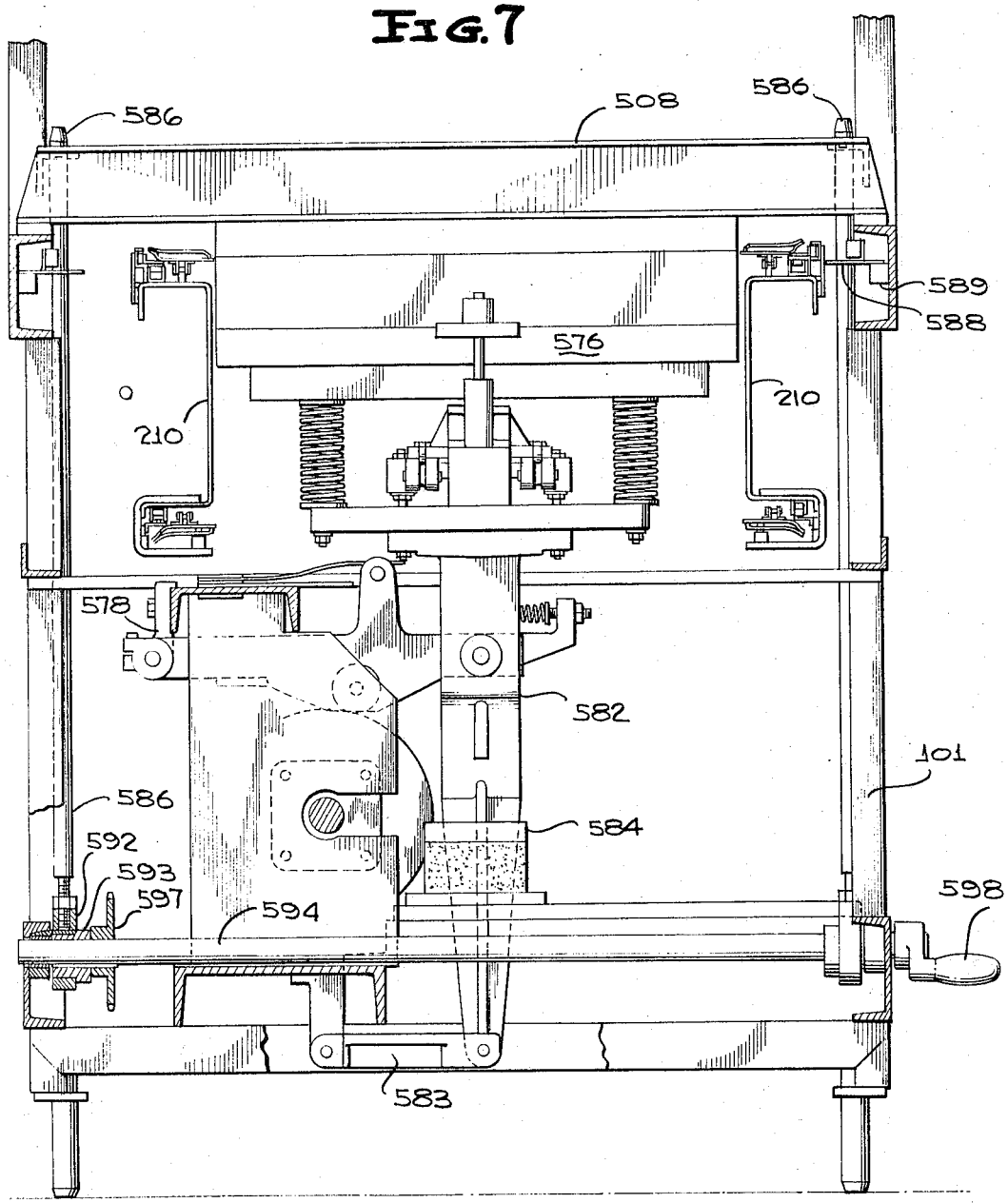

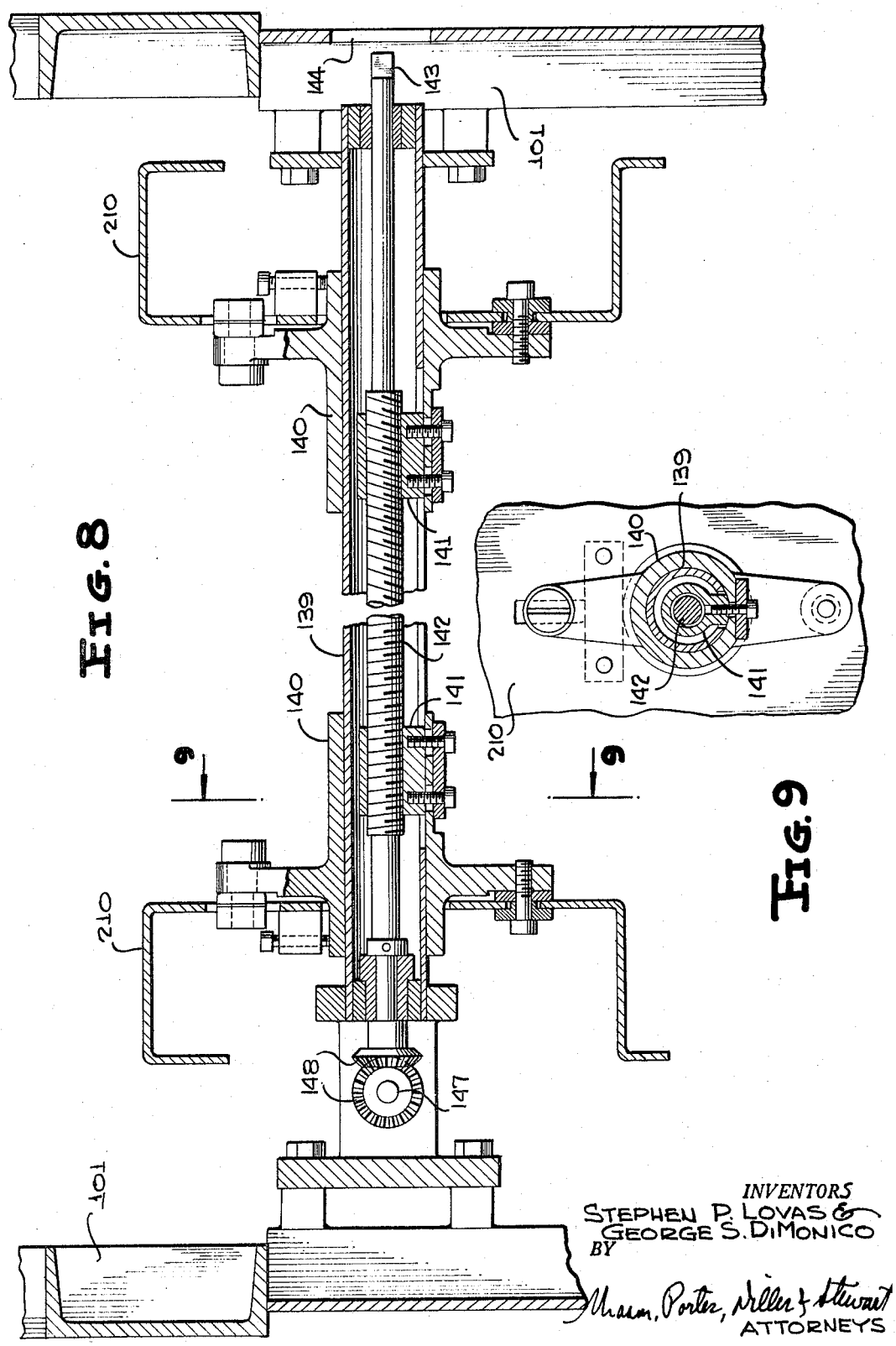

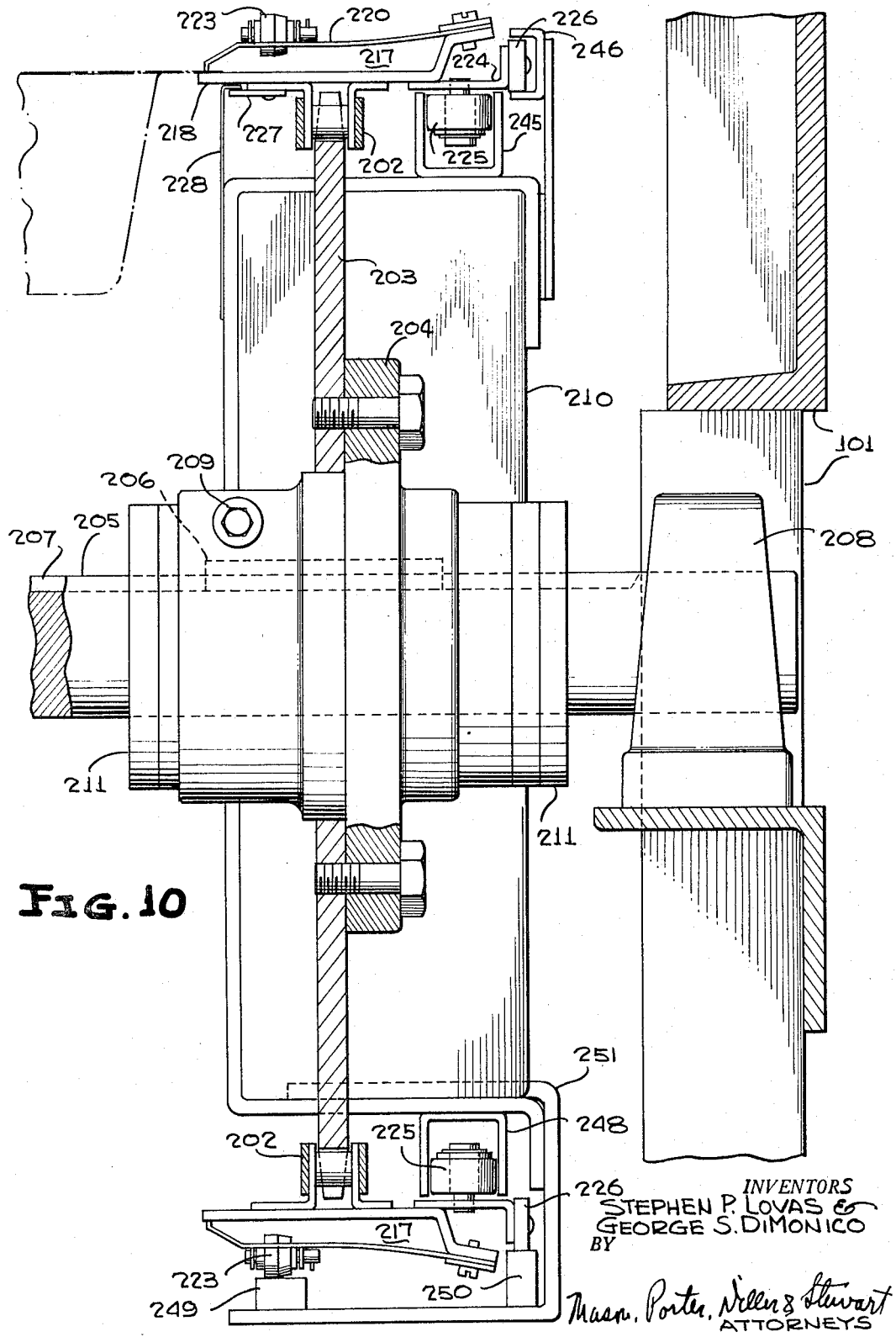

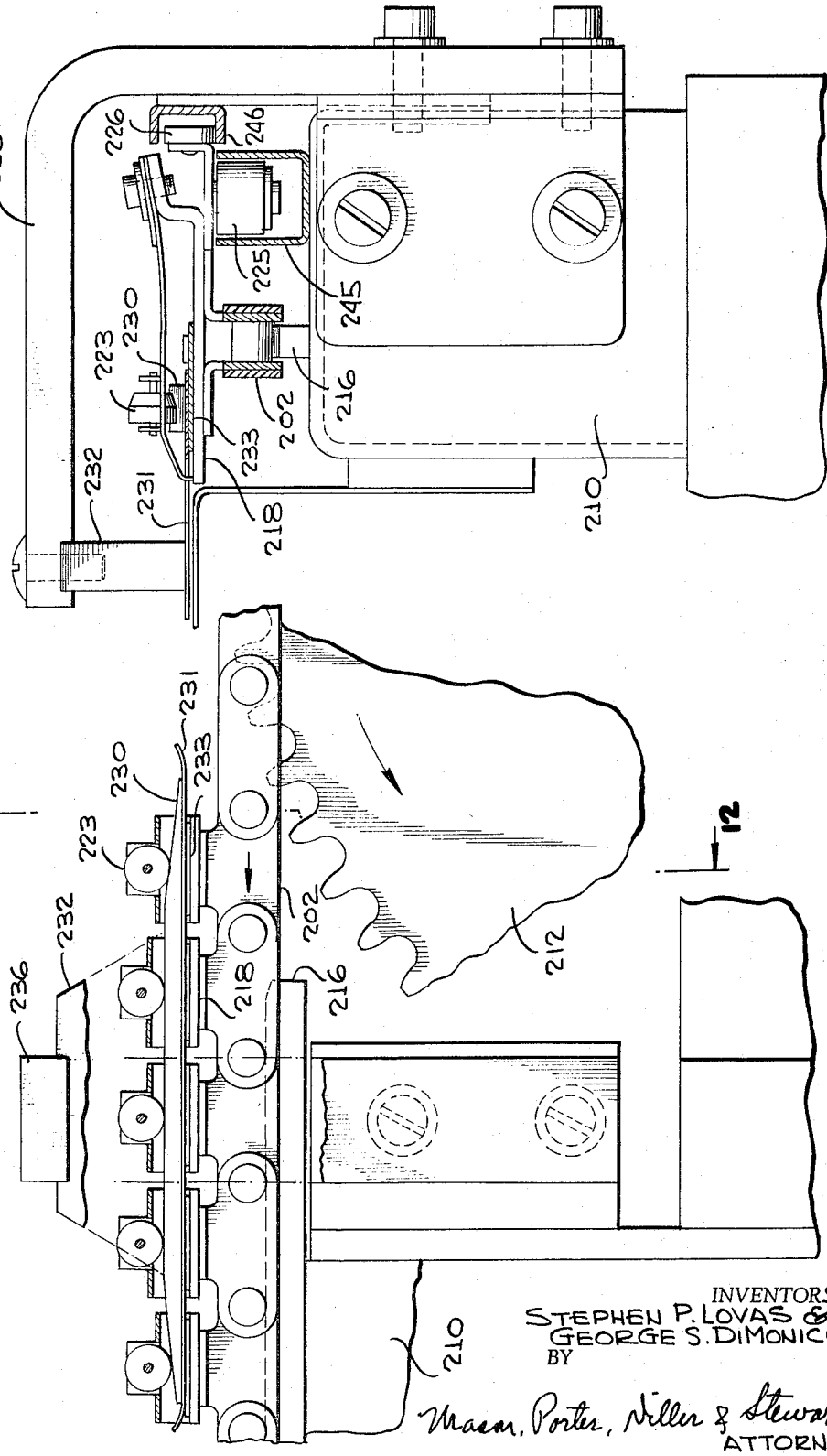

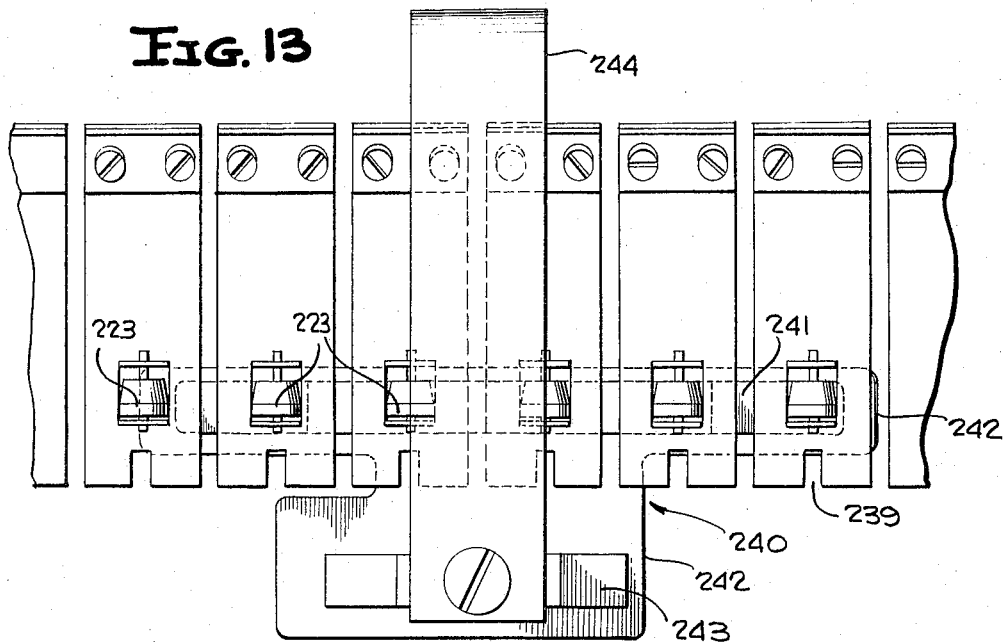
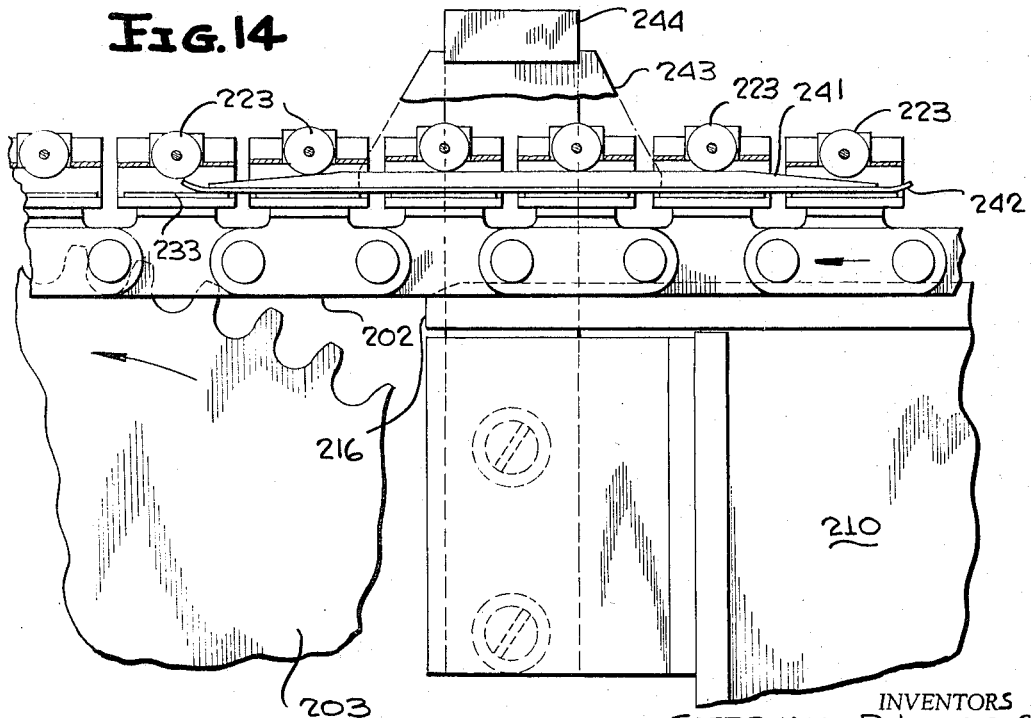

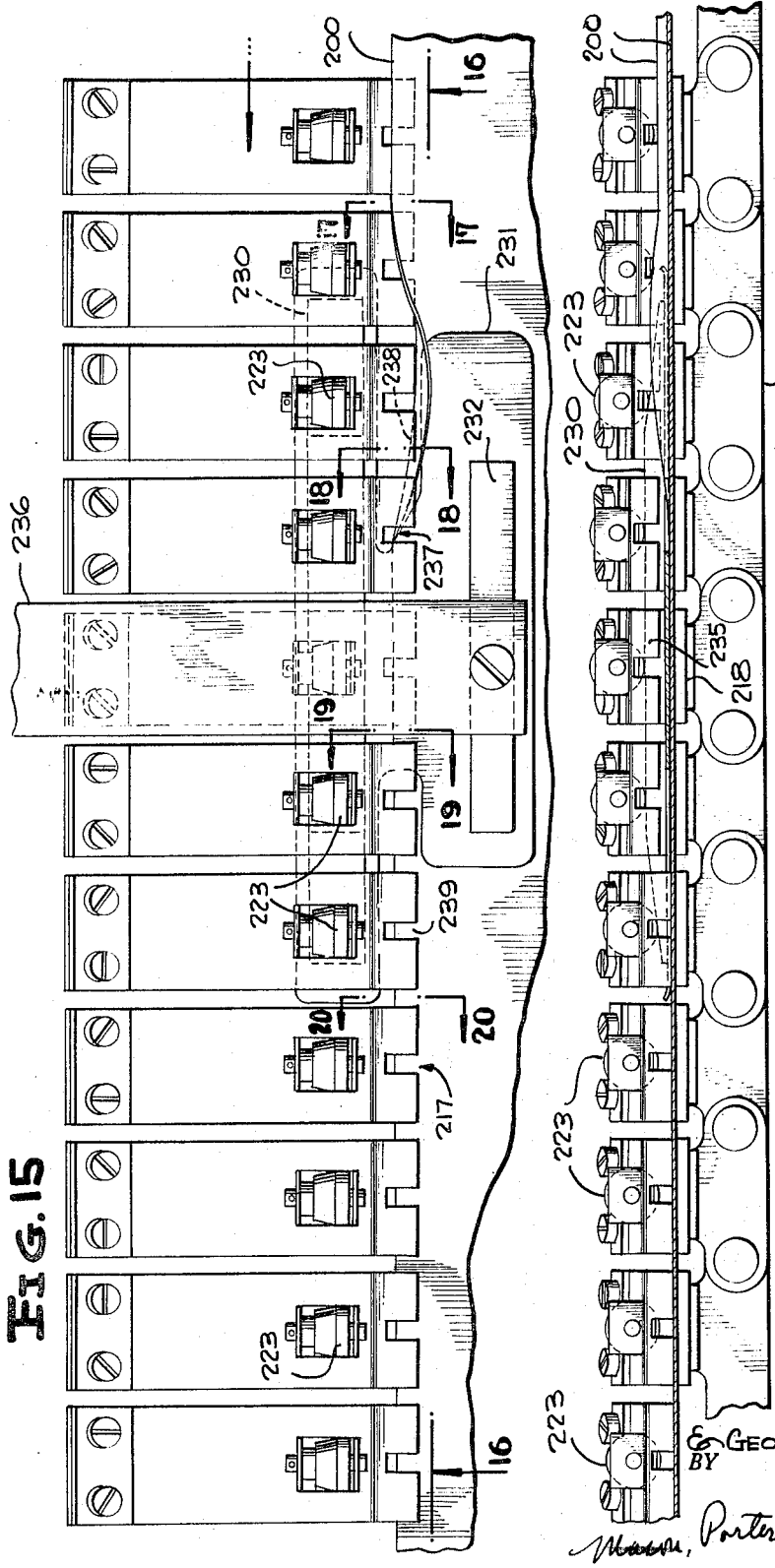

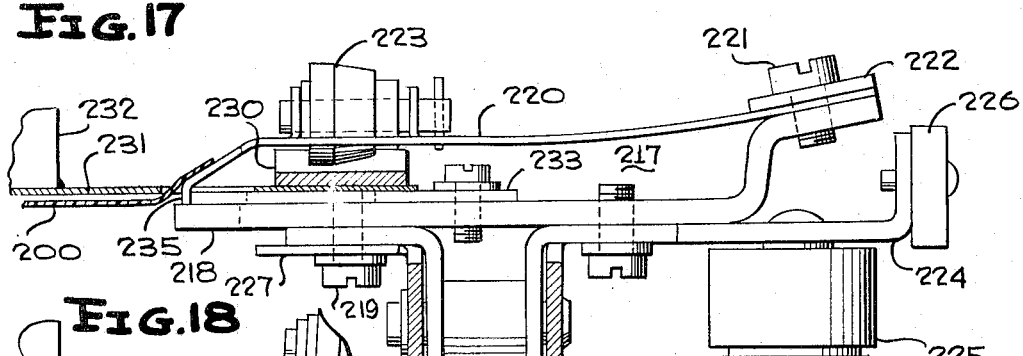
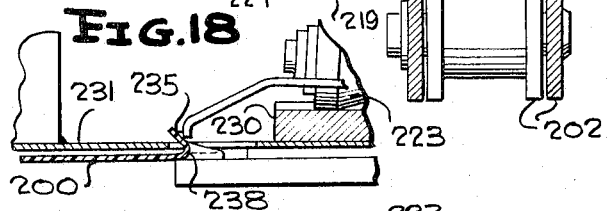
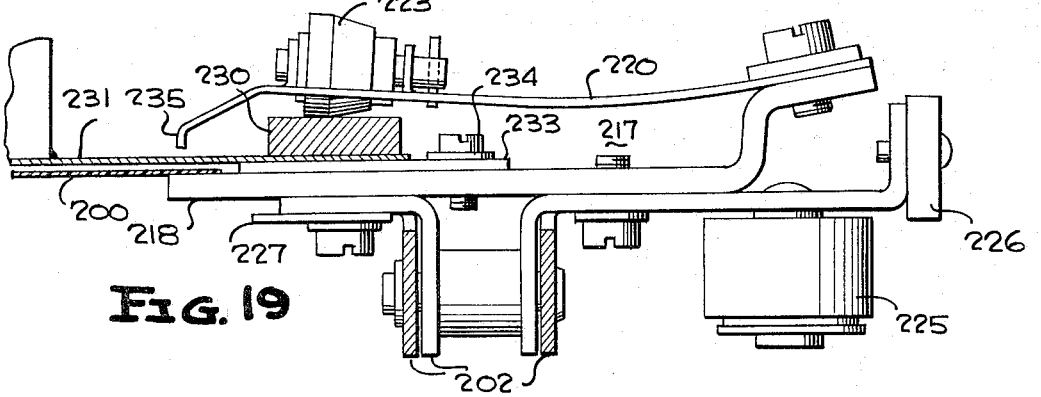
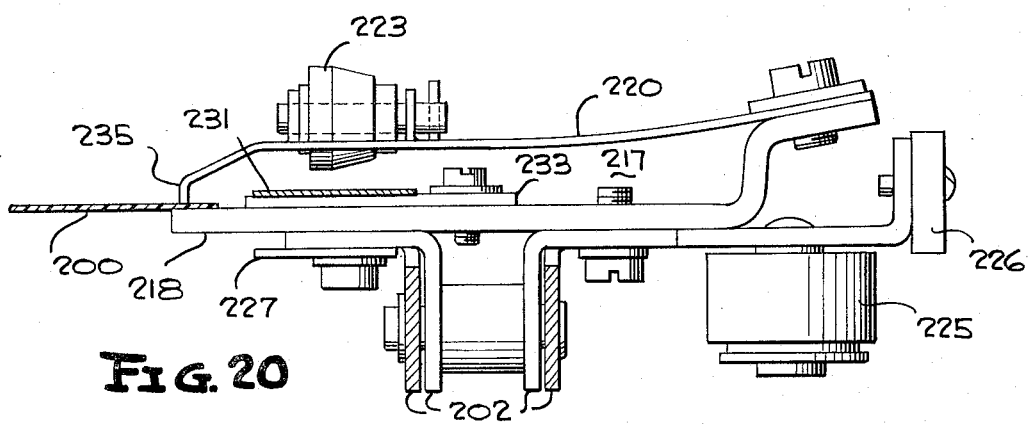

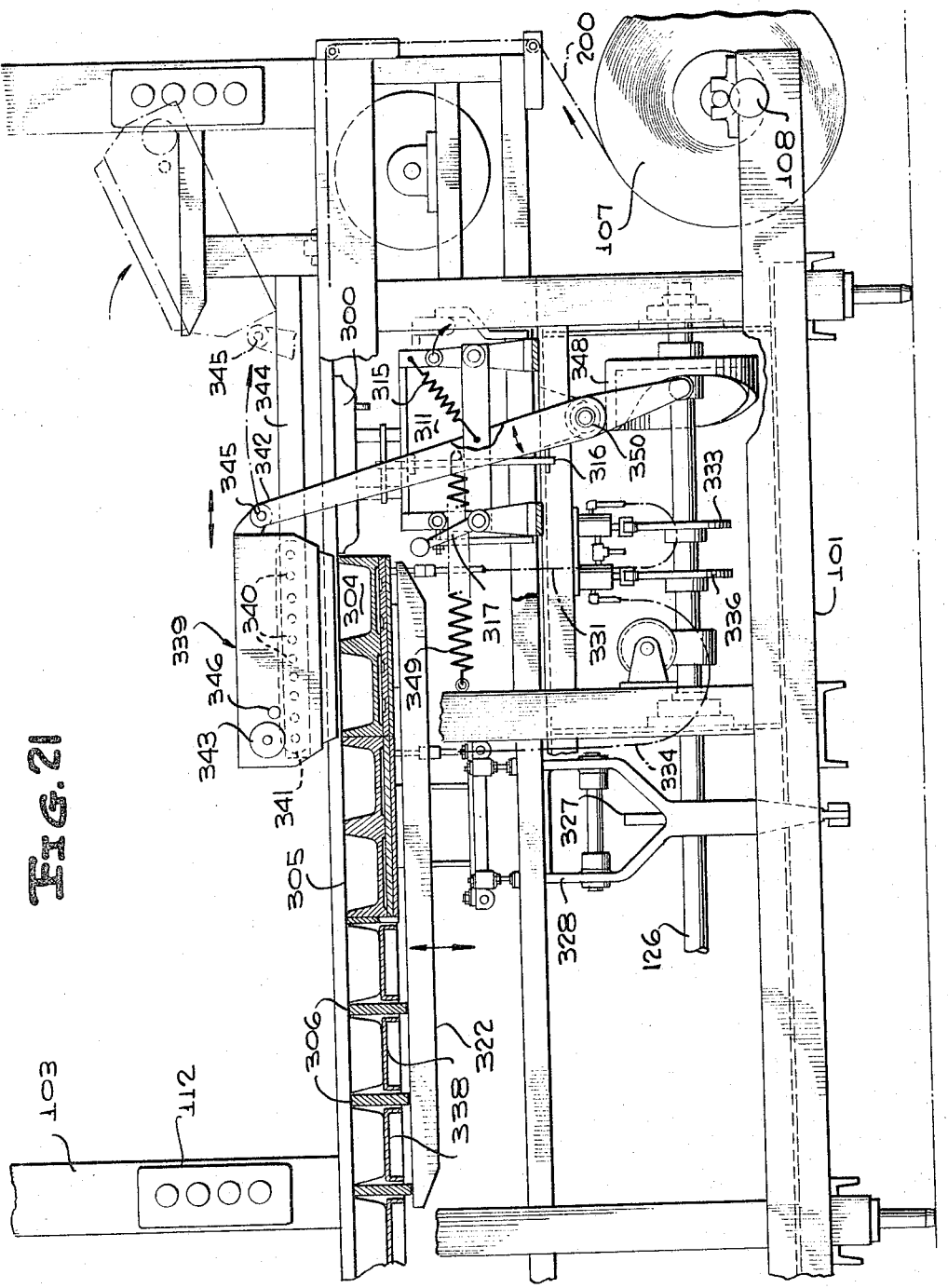

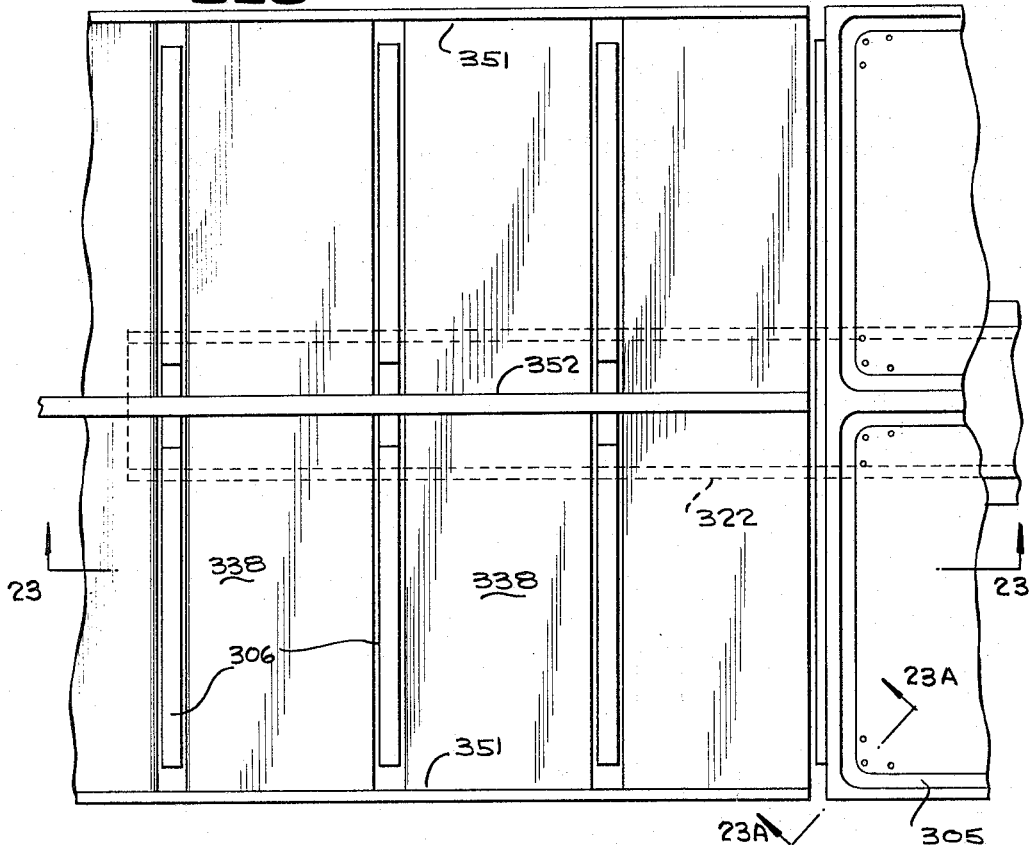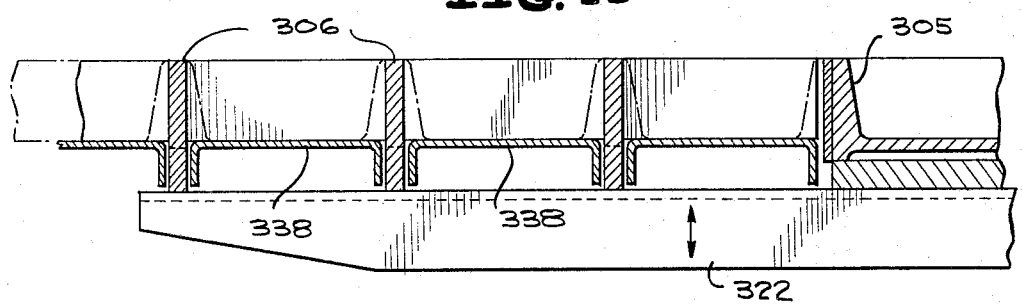

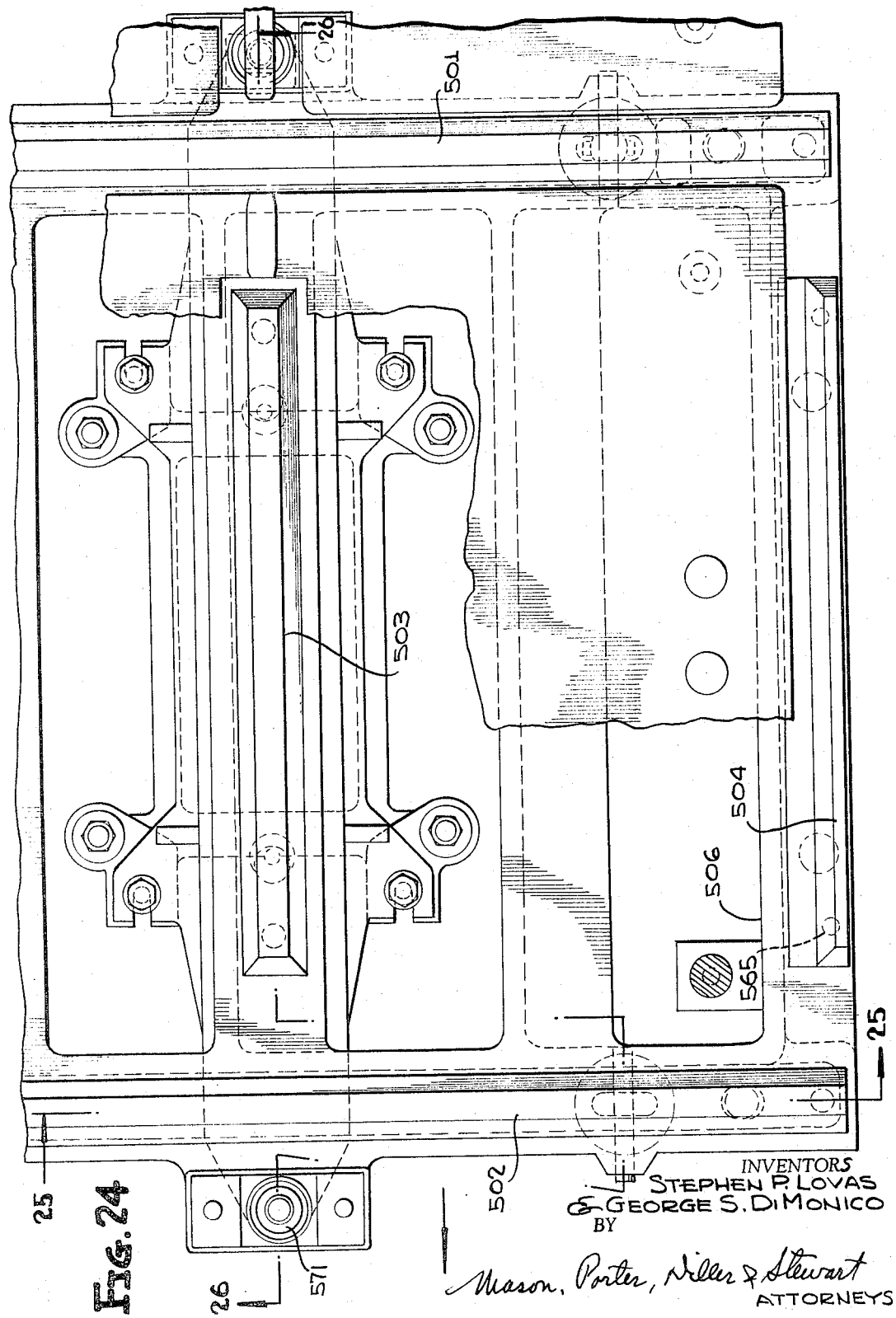

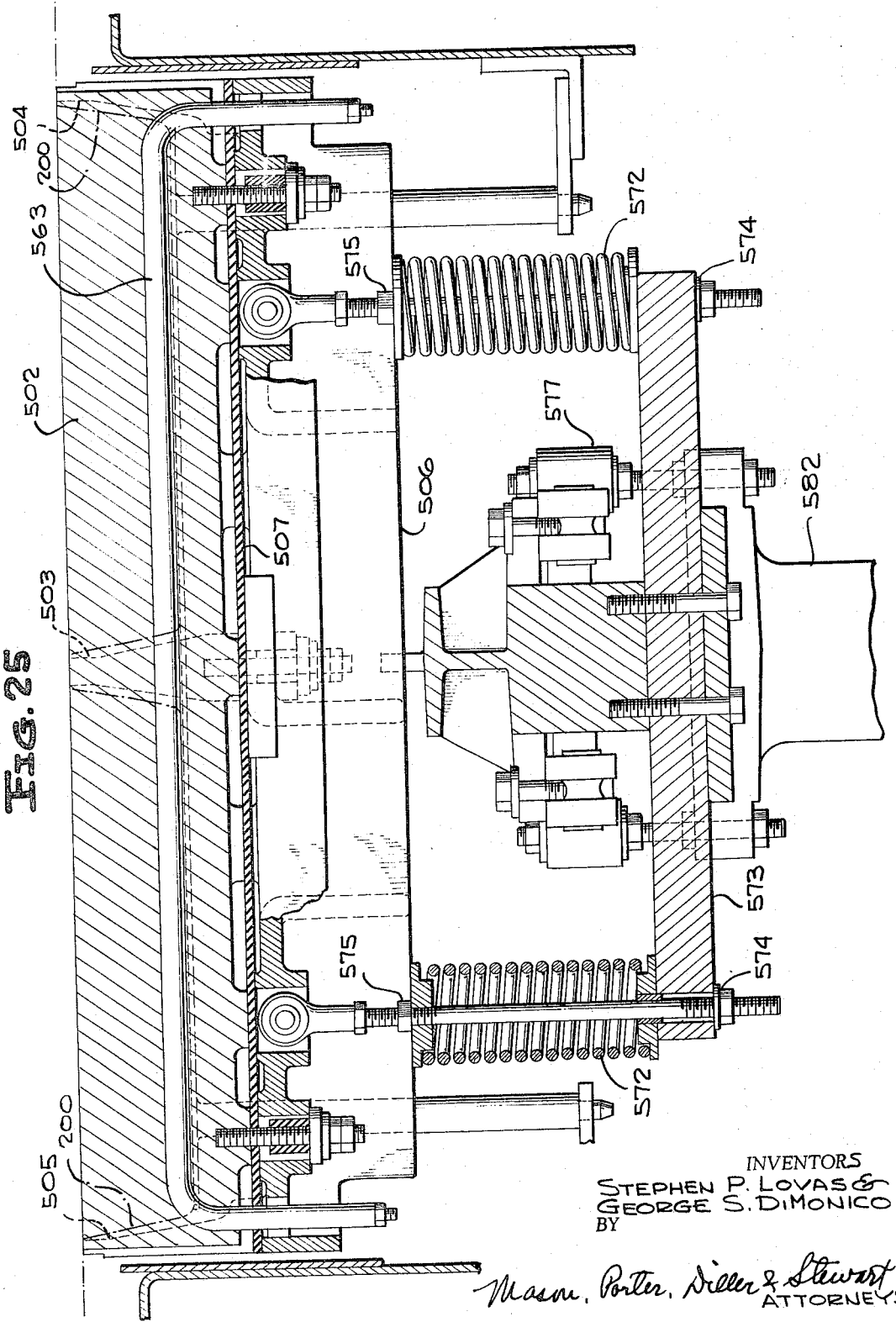

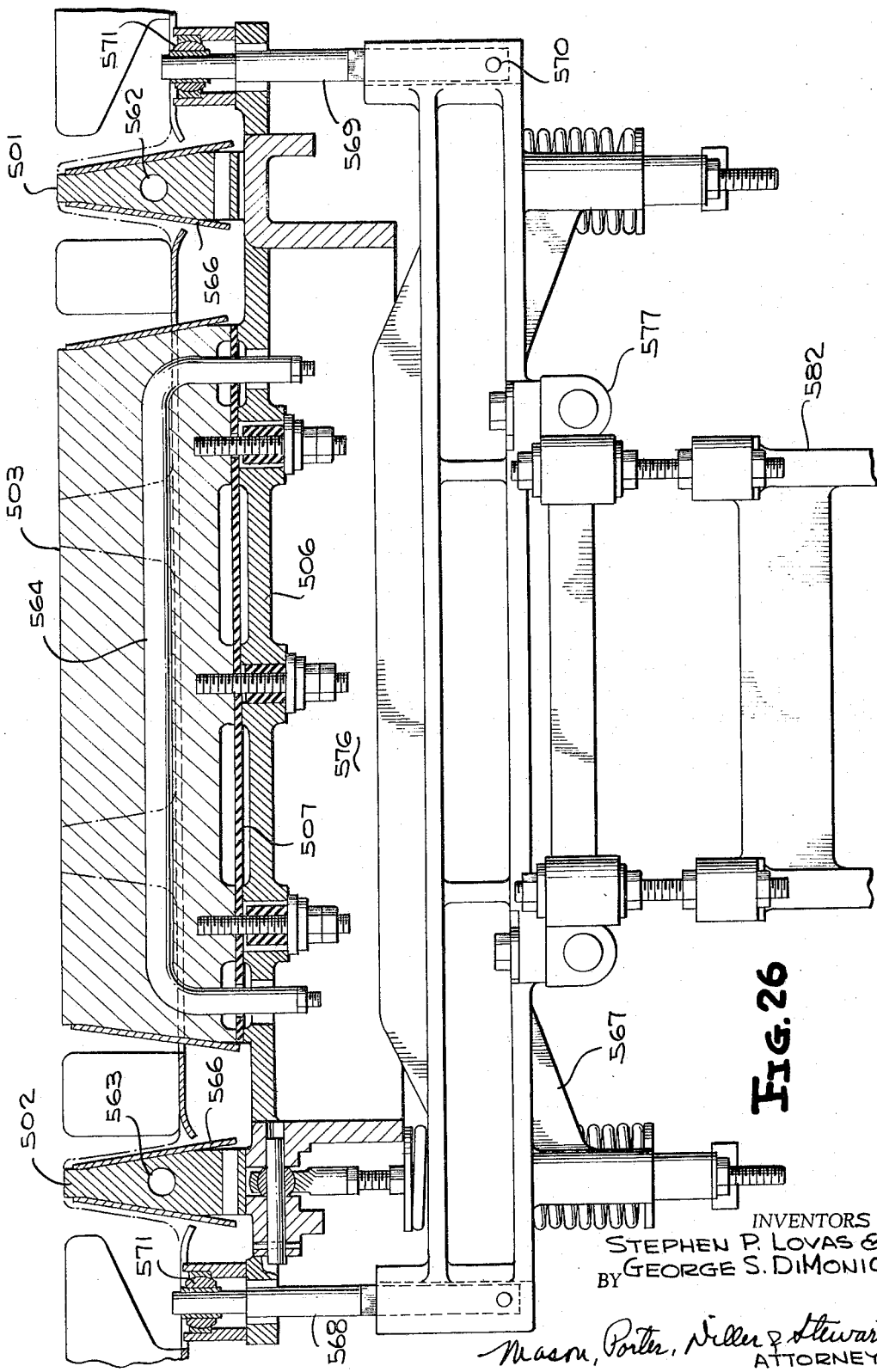

Feb. 14, 1967  S. P. LOVAS ET AL  3,303,628
PACKAGING MACHINE AND METHOD OF FORMING PACKAGES
Filed Dec. 17, 1962  33 Sheets-Sheet 19
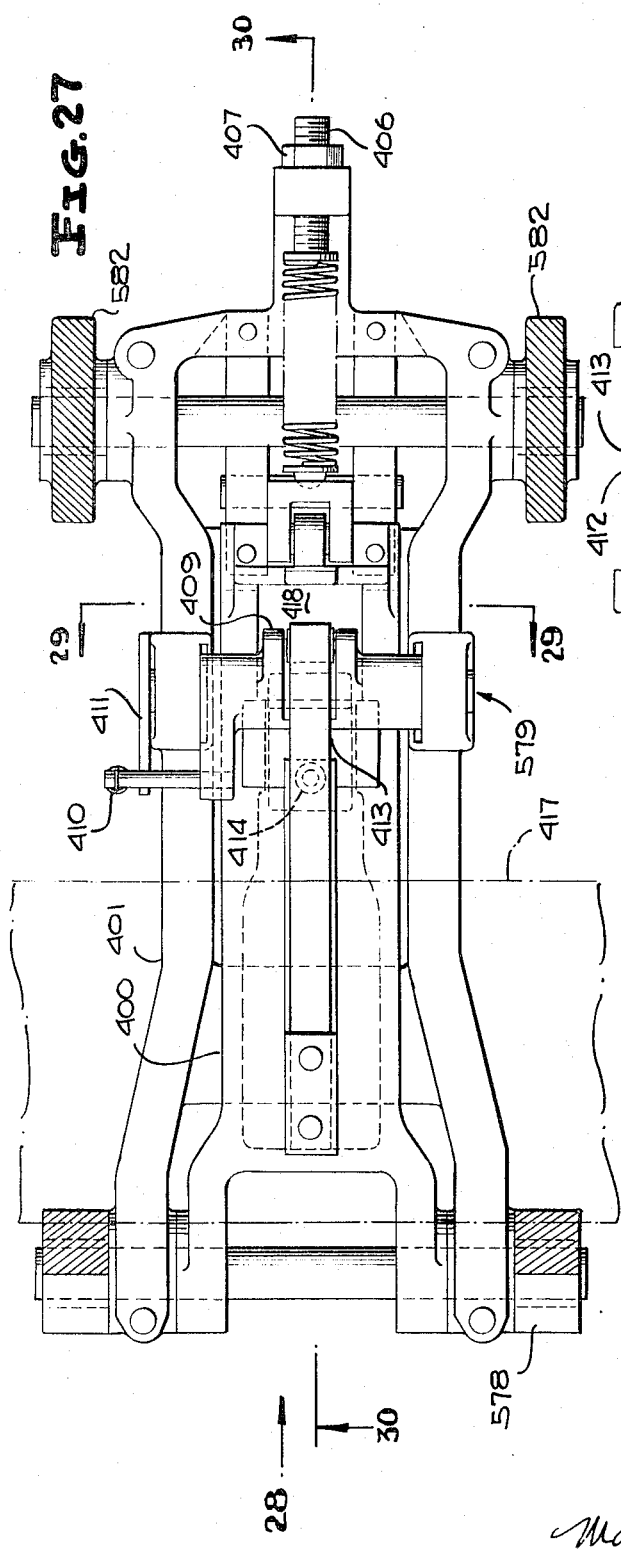
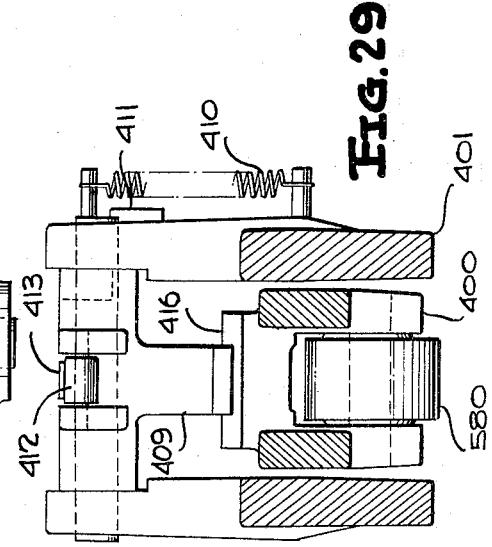
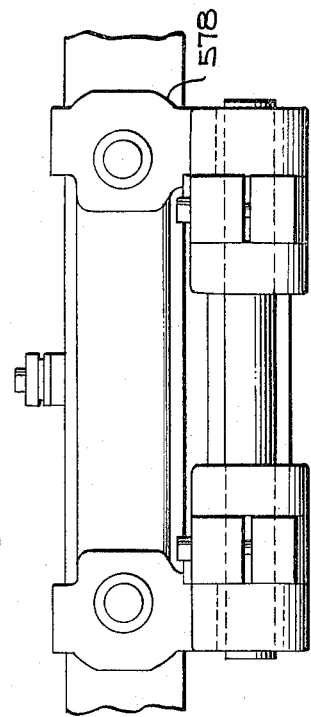
INVENTORS
STEPHEN P. LOVAS &
GEORGE S. DIMONICO
BY
Mason, Porter, Diller & Stewart
ATTORNEYS Feb. 14, 1967 S. P. LOVAS ET AL 3,303,628
PACKAGING MACHINE AND METHOD OF FORMING PACKAGES
Filed Dec. 17, 1962 33 Sheets-Sheet 20
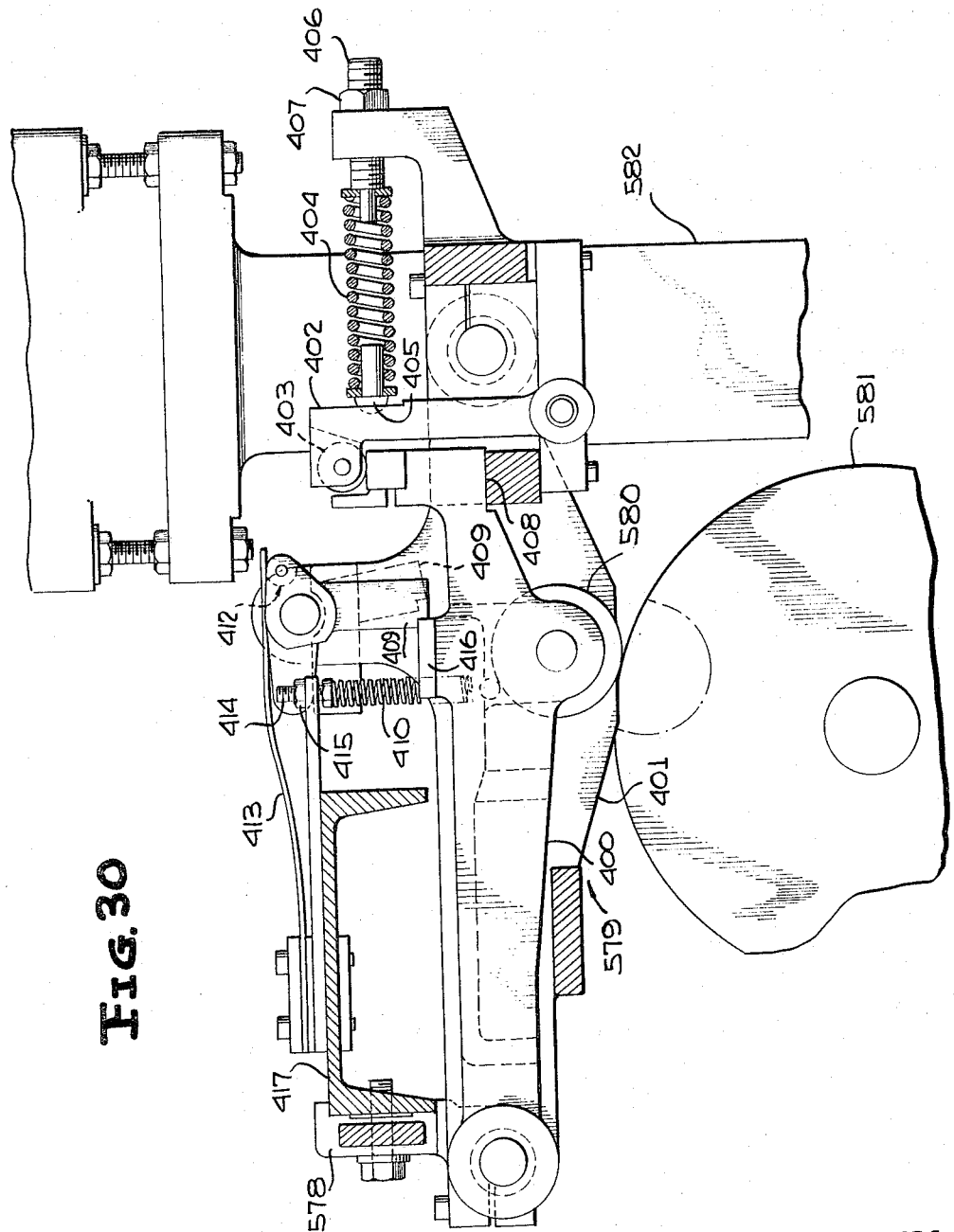
INVENTORS
STEPHEN P. LOVAS &
GEORGE S. DiMONICO
BY
Mason, Porter, Diller & Stewart
ATTORNEYS Feb. 14, 1967  S. P. LOVAS ET AL  3,303,628
PACKAGING MACHINE AND METHOD OF FORMING PACKAGES
Filed Dec. 17, 1962  33 Sheets-Sheet 21

INVENTORS
STEPHEN P. LOVAS &
GEORGE S. DiMONICO
BY
Mason, Porter, Diller & Stewart
ATTORNEYS

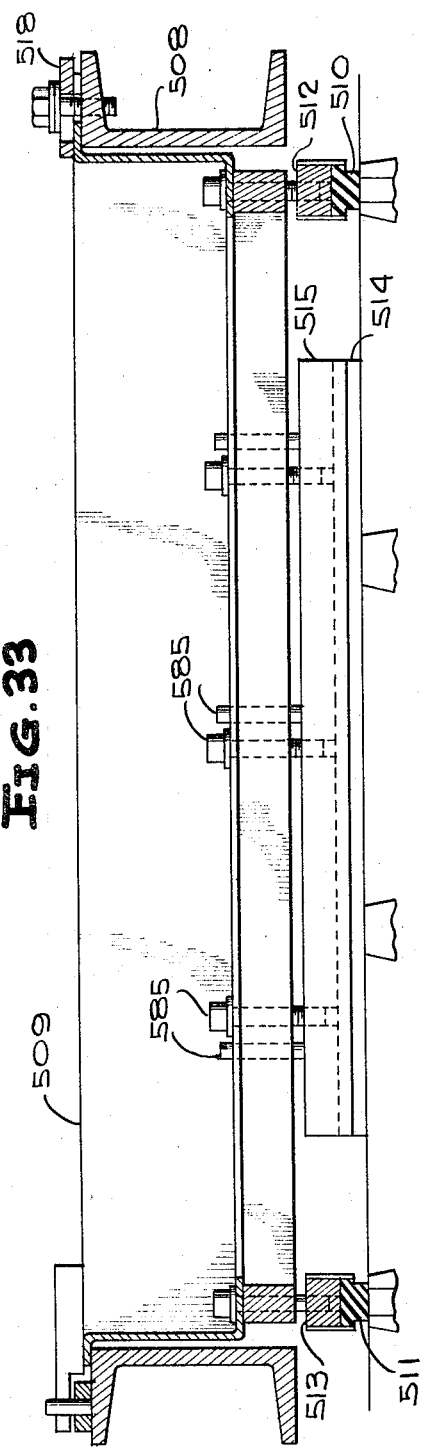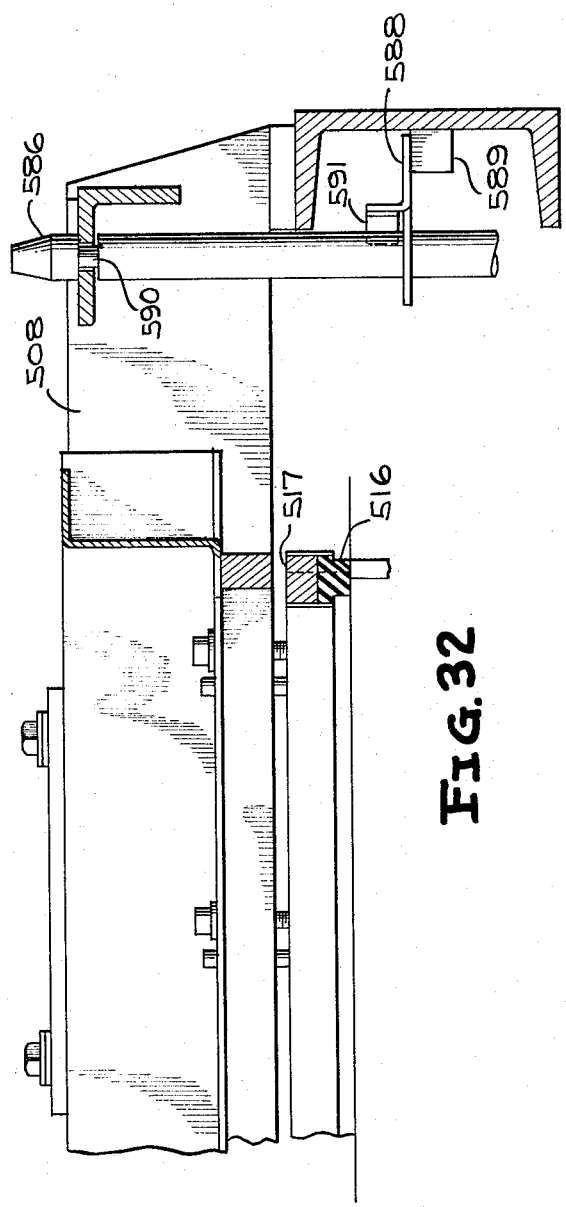

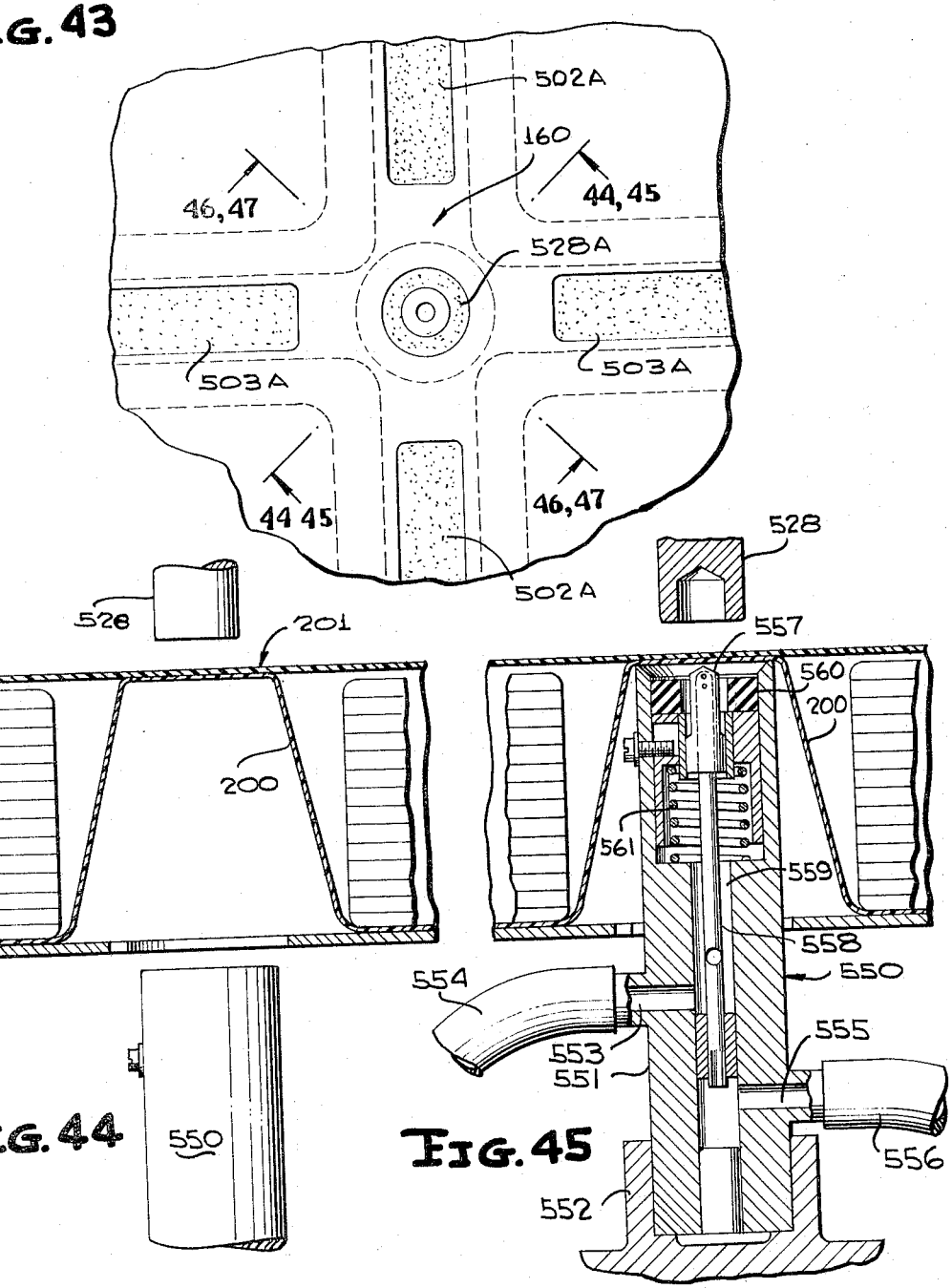

Feb. 14, 1967   S. P. LOVAS ET AL   3,303,628
PACKAGING MACHINE AND METHOD OF FORMING PACKAGES
Filed Dec. 17, 1962   33 Sheets-Sheet 26
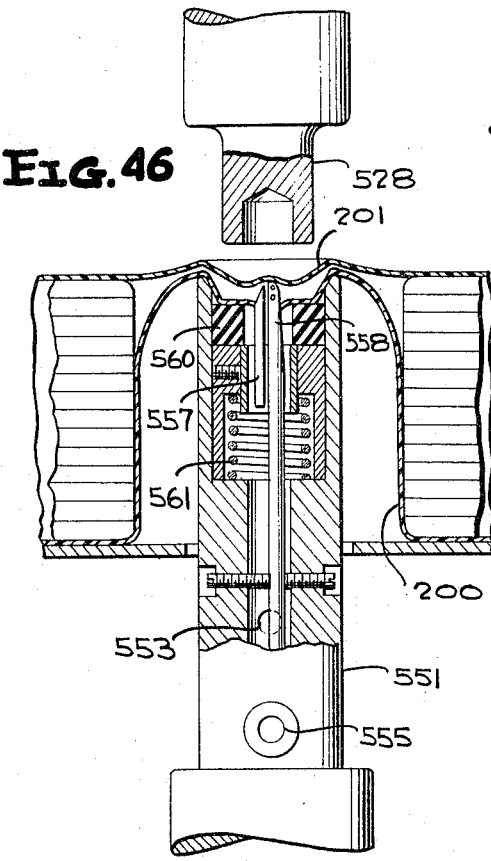
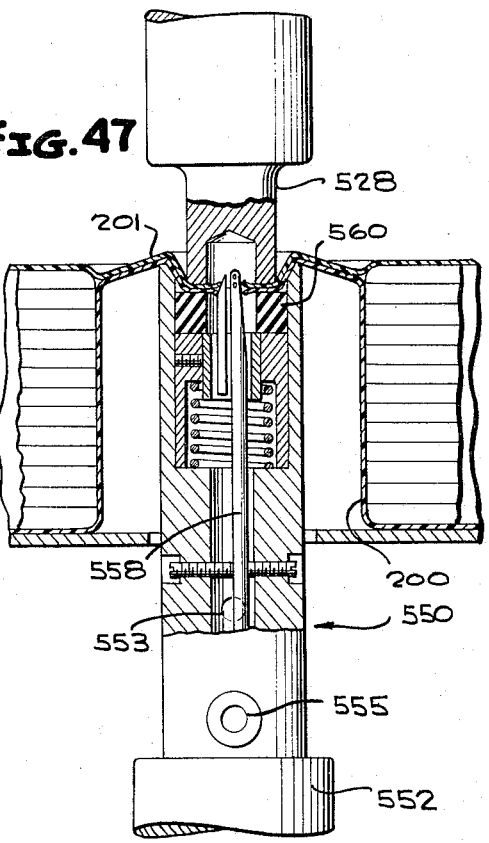
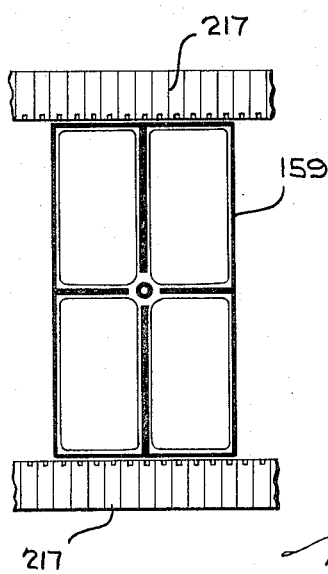
INVENTORS
STEPHEN P. LOVAS &
BY GEORGE S. DiMONICO
Mason, Porter, Diller & Stewart
ATTORNEYS INVENTORS
STEPHEN P. LOVAS &
GEORGE S. DiMONICO Feb. 14, 1967  S. P. LOVAS ET AL  3,303,628
PACKAGING MACHINE AND METHOD OF FORMING PACKAGES
Filed Dec. 17, 1962  33 Sheets-Sheet 28
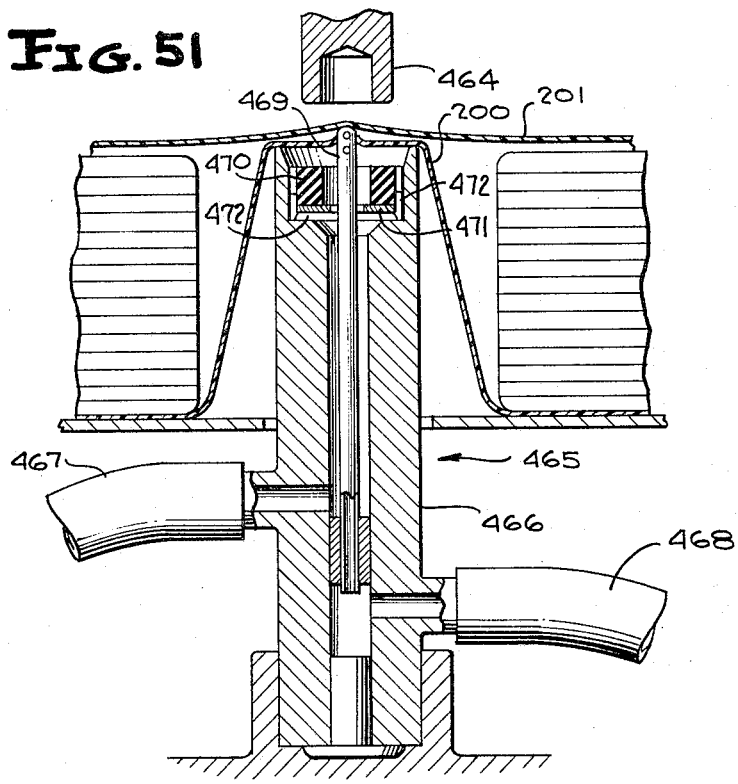
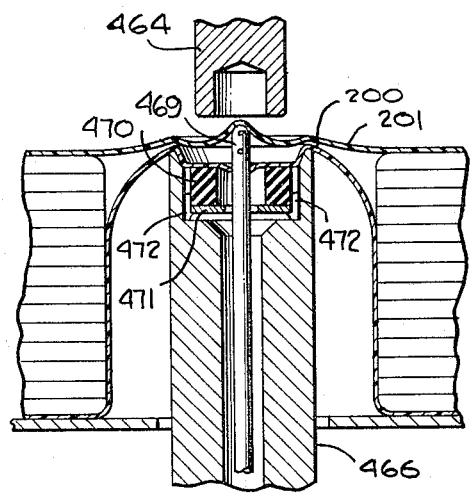
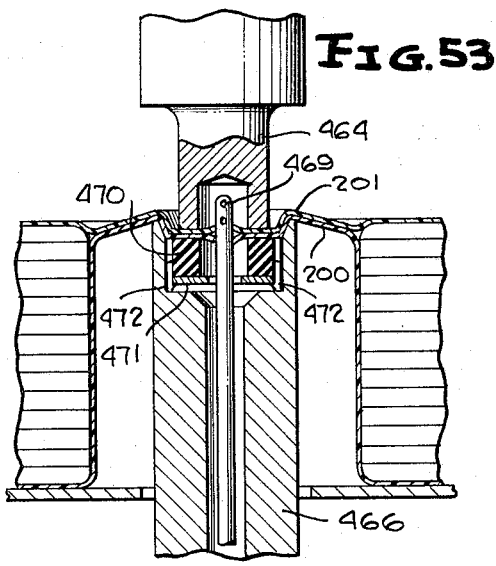
INVENTORS
STEPHEN P. LOVAS &
GEORGE S. DiMONICO
BY
Mason, Porter, Diller & Stewart
ATTORNEYS Feb. 14, 1967  S. P. LOVAS ET AL  3,303,628
PACKAGING MACHINE AND METHOD OF FORMING PACKAGES
Filed Dec. 17, 1962  33 Sheets-Sheet 29

INVENTORS
STEPHEN P. LOVAS &
GEORGE S. DiMONICO
BY
Mason, Porter, Diller & Stewart
ATTORNEYS

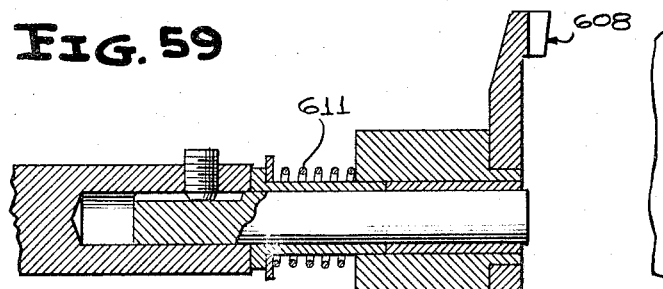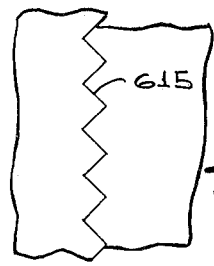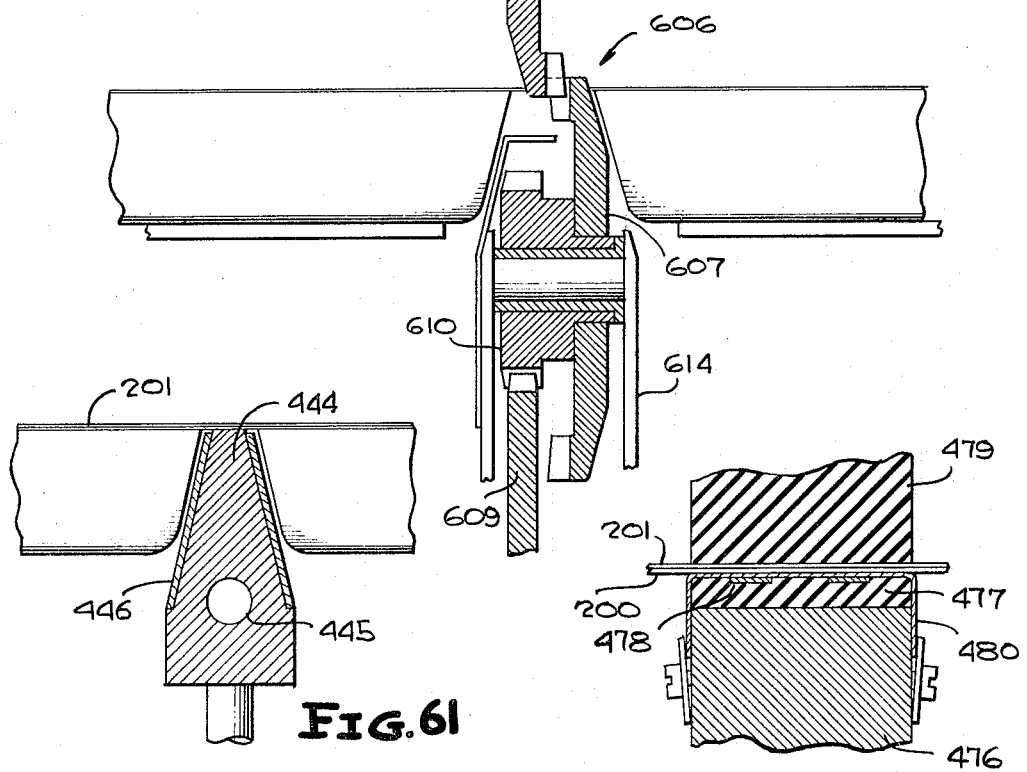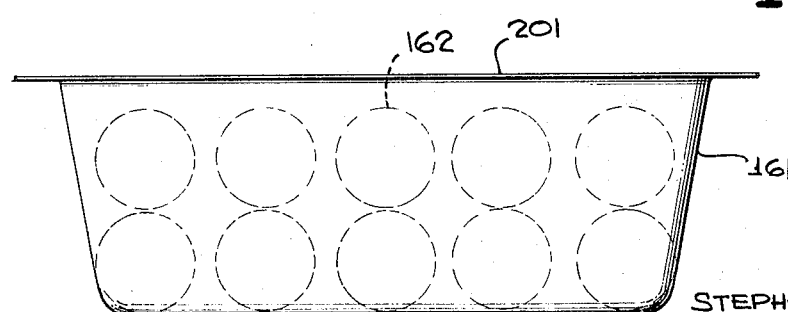

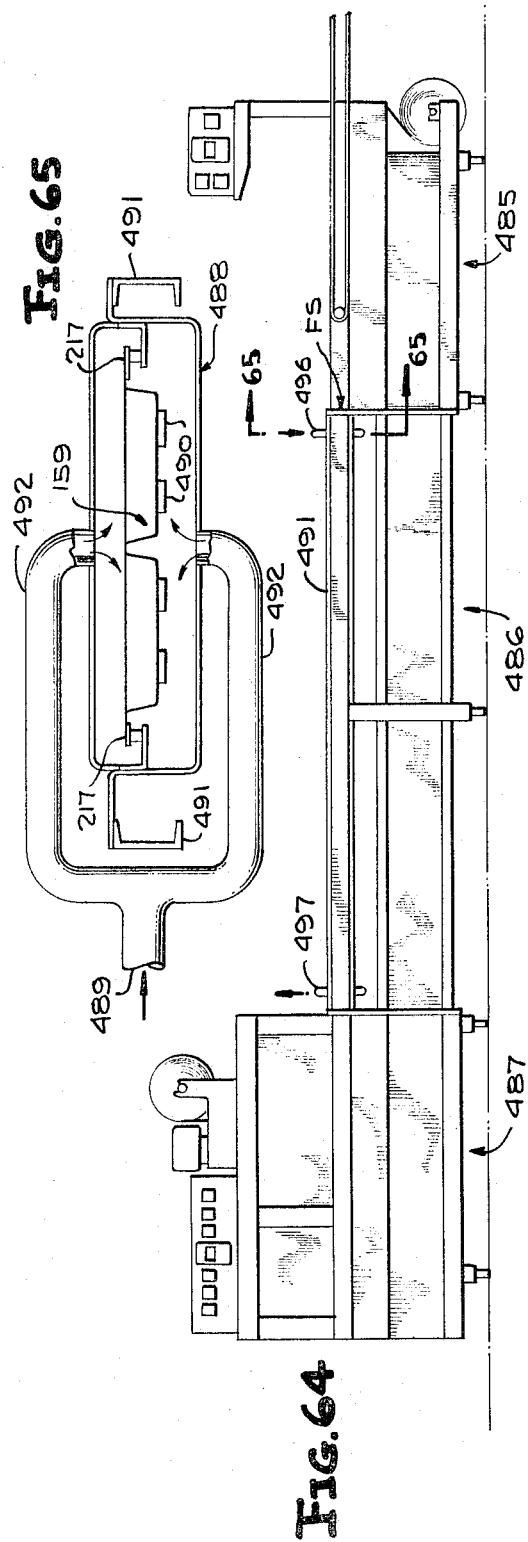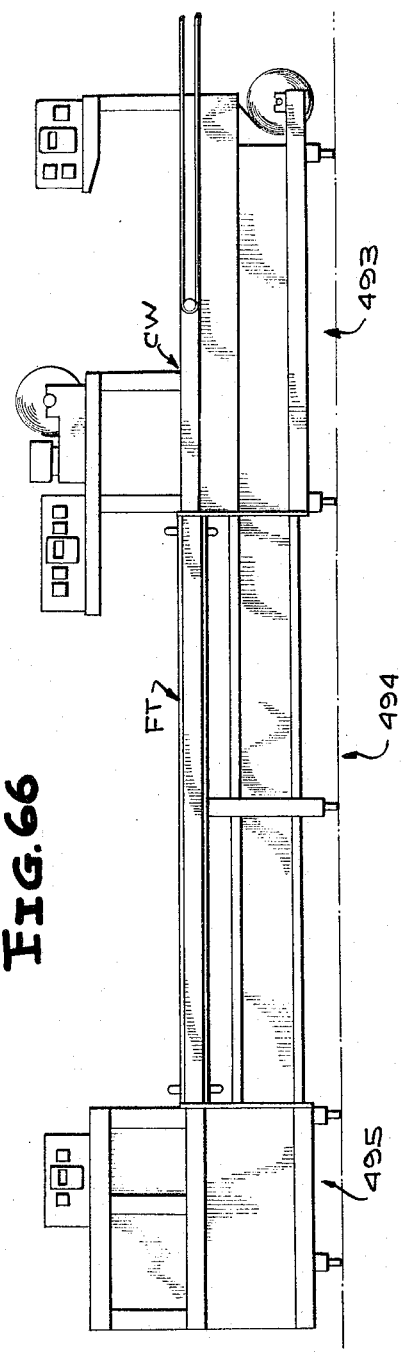

3,303,628
PACKAGING MACHINE AND METHOD OF FORMING PACKAGES
Stephen P. Lovas, West Hempstead, N.Y., and George S. Di Monico, Waldwick, N.J., assignors to Royal Packaging Equipment, Inc., Fort Lee, N.J., a corporation of New Jersey
Filed Dec. 17, 1962, Ser. No. 245,288
89 Claims. (Cl. 53—22)

The invention disclosed herein relates to packaging machines which are used for the vacuum packaging of products in flexible plastic pockets formed from continuous rolls of heat sealable plastic film.

In the known prior art, vacuum packaging machines designed to employ flexible packaging material have been developed but such machines have not been entirely satisfactory because of structural or operational disadvantages. For example, of two known types of machines, one has required the employment of a rather elaborate vacuum forming drum having thereon individual package supporting and moving cavities, and the other has required the manufacture of bags or other containers, and both manual insertion of the product into the package and manual placement of the unsealed package into vacuumizing and heat sealing equipment.

Thus far, it has not been possible to obtain entirely satisfactory results from either of the prior art machines referred to above. As a consequence, workers in the art still are endeavoring to develop commercially successful continuously or intermittently operable vacuum packaging machines. Certain fundamental difficulties have been encountered by prior workers in the art because they, among other things, have been unable to solve the problem of supporting the packaging material web or film at its longitudinally travelling marginal edges only, rather than substantially throughout the full width thereof in travelling cavities or pockets. It can readily be seen that if the web can be supported at its marginal edges only during its travel in the machine, the machine may be considerably simplified since devices such as the before mentioned forming drum and travelling package supporting and forming cavities may be eliminated. This simplification brings about great reduction in machine manufacturing costs, less expensive packaging costs and lower prices to the consumer.

Flexible and heat sealable vacuum packaging films are in common use today and are sometimes made in combinations or laminae of transparent plastics which are impervious to air, gas, liquids and moisture. These materials are available in webs coiled into large rolls of the desired width.

It has been found advantageous to be able to mold or evacuate a cluster of four pockets or packages simultaneously rather than to be required to form or vacuumize each pocket or package individually or in pairs. Also, commercial uses of vacuum packaging machines may be considerably expanded if the product can be deep frozen during the packaging process. In some instances it may be desirable to gas the packages with nitrogen or other inert gases after they have been evacuated.

Accordingly, it is a purpose of the invention to provide a packaging machine wherein a lower web in which the package pockets or cavities are vacuum formed is supported at its marginal edges only, substantially throughout its travel.

A further object of the invention is to provide a packaging machine wherein the travel of the lower web is substantially horizontal and intermittent.

It is another object of the invention to provide in the machine an initial heater plate over which the lower web engages and is advanced, thereby to condition the web for the vacuum forming of pockets or cavities therein, means being included for displacing the plate downward away from the web whenever the machine operation is stopped.

Another object of the invention is to provide in the machine a web overlying heater means which is movable along with the web as it is moving to the pocket or cavity forming position, thereby to apply the desired web conditioning heat to the web right up to the last moment before the vacuum forming of pockets or cavities therein, said heater means being displaceable from its normal position over the web when its heat applying purpose no longer is desired.

Another object of the invention is to provide a packaging machine wherein means are provided for intermittently advancing the lower web and for vacuum forming package pockets or cavities therein in clusters of four at each stop step in the intermittent advancement.

Yet another object of the invention is to provide a packaging machine of the character stated wherein each vacuum formed cluster of package pockets is advanced to a holding station after initial formation thereof and is held there while being subjected to a pocket shape holding vacuum action.

A further object of the invention is to provide a machine of the character stated wherein the vacuum formed clusters of package pockets are advanced to a loading station whereat bottom and intermediate supporting means are provided to resist deformation of the pockets incidental to the placement of product or fill therein.

Still another object of the invention is to provide a packaging machine of the character stated wherein vacuum pocket forming and holding molds are provided at the cluster forming and holding stations, and said molds and certain of the supporting means at the loading station are carried on vertically reciprocable carrier means so as to be movable together downward out of the way of the intermittently feeding web and then be again moved upward into cooperative relation with the web at each stop step in the web advancement.

A still further object of the invention is to provide a machine of the character stated wherein the lower web feeding means and the forming and holding mold means are so cooperatively arranged that the web is held taut over and in contact with the molds during the vacuum forming of the pockets and the holding of the formed shapes.

Still another object of the invention is to provide a packaging machine wherein provision is made for simultaneously evacuating packages in clusters of four packages to a cluster.

It is a still further object of the invention to provide a packaging machine which is adjustable in its transverse dimension so as to enable a setting up of the machine for the processing of packages of various sizes.

Yet another object of the invention is to provide a machine of the character stated having provision for forming packaging web pockets in clusters of four, each such cluster of pockets being defined in part by an outlining peripheral wall, and also by longitudinal and transverse walls intersecting centrally to define four adjacent pocket corners, means being provided to form an evacuating orifice in the pocketed web at the intersection of the pocket corner defining walls.

Another object of the invention is to provide a machine of the character stated wherein are included means for laying a covering web over the pockets of each cluster, and wherein the means for providing the evacuating orifice also includes means for holding the covering web spaced above the orifice at the intersecting pocket corner defining walls.

A further object of the invention is to provide a machine of the character stated wherein the means for forming the evacuating orifice is disposed to function prior to the laying on of the covering web, and the means for holding the covering web spaced above the orifice is disposed to function at a point remote from the orifice forming means.

A still further object of the invention is to provide a machine of the character stated wherein means are provided for first sealing the pocketed web and the covering web together over the peripheral wall portions and over the intersecting wall portions short of the locale of the evacuating orifice, and there being included means for simultaneously evacuating the four pockets of the cluster through the orifice and between the adjacent unsealed and opposing web portions, means for forming a ring seal about the orifice, and means for thereafter sealing the opposing web portions remaining unsealed after said ring sealing to complete the evacuation and sealing of the cluster of package pockets.

Yet another object of the invention is to provide a machine of the character stated wherein the evacuation of the pockets is effected through a vertically reciprocable vacuumizing head with which the cover web spacing means and the lower web evacuating orifice means are movable.

Still another object of the invention is to provide a machine of the character stated wherein the vertically reciprocable vacuumizing head includes means for opposing and cooperating with the ring seal forming means in forming the ring seal about the evacuating orifice.

A further object of the invention is to provide a machine of the character stated wherein the wall portion sealing means are formed and disposed to accomplish the sealing of the peripheral and partial intersecting wall portion sealing in plural stages and at successive web feed stop positions.

A still further object of the invention is to provide a machine of the character stated wherein the means for effecting the final sealing of each pocket cluster comprises a vertically reciprocable cruciform sealer engageable with the intersecting corner defining wall portions.

It is a further object of the invention to provide transverse cutter means effective to cut the pocket clusters into side-by-side pocket pairs, and longitudinal cutter means for dividing each pocket pair into individual package pockets.

A still further object of the invention is to provide a novel lower web supporting and advancing means of the character stated including endless chain means at each side of the machine and having thereon novel clamping means which will grip and support the web in taut condition, said clamping means being slotted or bifurcated to permit transverse web cutting means to pass therethrough.

It is a still further object of the invention to provide an opening cam means for bringing about an insertion of the lower web in the clamping means at the start of the web's travel through the packaging machine, and to provide an opening cam means for releasing the finished packages from the clamping means after the vacuumizing and sealing of the packages and the transverse cutting of the sealed webs into package pairs.

Another object of the invention is to provide means in the form of coacting pinking shear-edged disks for cutting longitudinally between a transversely aligned pair of packages prior to release of the web marginal edge portions thereof from the feeder chain and clamping means so that upon release of the said packages from said clamping means they may be delivered from the machine as individual packages.

Still another object of the invention is to provide means for installing various elements of the proper size in the machine in order to accommodate the particular package size being processed.

It is a still further object of the invention to provide an overload release means effective to prevent damage to the web sealing means when a pressure resistant foreign object or material may be interposed between opposing and moving parts in the sealing area.

It is a still further object of the invention to provide a packaging machine wherein the contents may be deep frozen in the packaging pockets.

Another object of the invention is to provide a novel method of forming packages, the method comprising feeding a heat sealable web step-by-step and horizontally while gripping the same at its marginal edges only, heating the web to prepare it for the formation of pockets therein, successively forming clusters of pockets in the web during one of the rest positions, each cluster of pockets being defined in part by an outlining peripheral wall portion and also by longitudinal and transverse wall portions intersecting centrally to provide four adjacent pocket corners, depositing fill in the pockets of each cluster, laying a heat sealable cover web over the filled pocket clusters, heat sealing the cover web over each pocket cluster about the peripheral wall portion thereof and over the intersecting walls except adjacent the intersection thereof, evacuating the pockets of each cluster simultaneously through an orifice formed at the wall portion intersection thereof, and then completing the heat sealing at the wall intersection.

A further object of the invention is to provide a method of the character stated wherein the heat sealing together of the pocketed and cover webs is performed in successive stages.

A still further object of the invention is to provide a method of the character stated wherein the cluster pocket evacuation takes place through an orifice formed by piercing the pocketed web at the intersection of the wall portions and the cover web is moved into spaced relation over the intersecting wall portions coincidentally with said piercing.

Yet another object of the invention is to provide a method of the character stated wherein the completion of the heat sealing at each pocket cluster wall portion intersection is performed in two stages, first a ring seal about the orifice, and second by application of a cruciform heat sealer.

Still another object of the invention is to provide a method of the character stated wherein the sealed pocketed and cover webs are transversely and longitudinally cut to separate the packages of each cluster into four individual packages.

A still further object of the invention is to provide a method of the character stated wherein separation of the package clusters into individual packages is accomplished prior to releasing of the web feed gripping at the marginal edges.

Still another object of the invention is to provide a method of the character stated wherein the web cutting effective to separate the package clusters into individual packages is accomplished by a first cut transversely between clusters, a second cut transversely through transverse wall portions and the wall portion intersection, and a third or longitudinal cut through the longitudinal wall portions and the wall portion intersection, followed by a releasing of the web feed marginal edge gripping.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic perspective view illustrating packaging machine part arrangement embodying the invention.

FIGURE 2 is a left side elevational view illustrating a preferred embodiments of a packaging machine of the invention.

FIGURE 3 is a somewhat schematic top plan view of the packaging machine shown in FIGURE 2.

FIGURE 4 is a fragmentary plan view illustrating a portion of a transverse adjusting means employed in the packaging machine of FIGURE 2.

Figure 31:
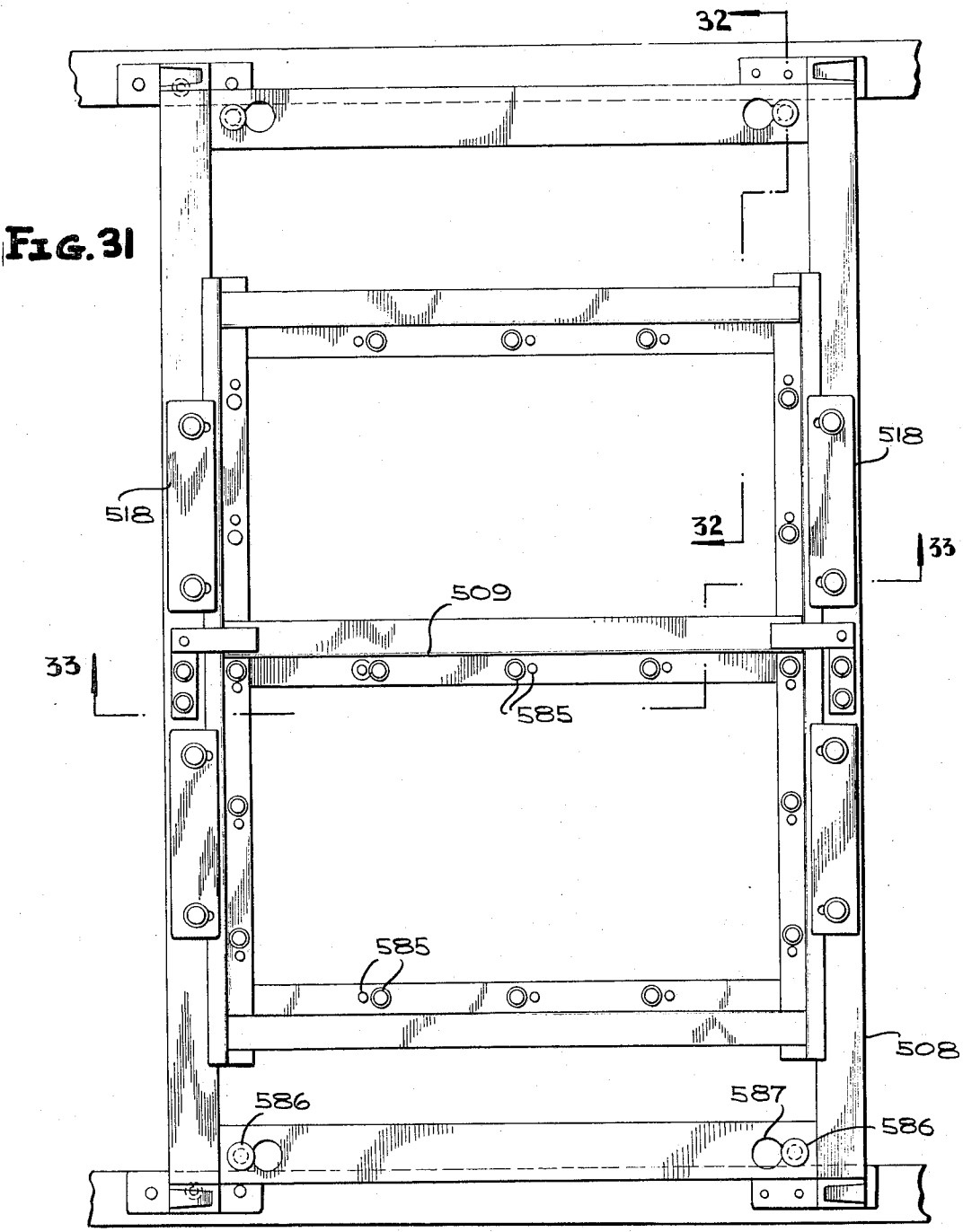

FIGURES 5 and 5A, when joined at the lines A—A together comprise a left side elevational view of the packaging machine of FIGURE 2 with the cover plates removed and with some elements broken away and in vertical longitudinal section.

FIGURE 6 is an enlarged fragmentary plan view showing the cam shaft, drive motor and associated elements used in the packaging machine of FIGURE 2, parts being shown in horizontal cross section.

FIGURE 7 is a vertical transverse sectional view taken on the line 7—7 of FIGURE 5A.

FIGURE 8 is an enlarged fragmentary vertical transverse sectional view taken on the line 8—8 of FIGURE 2.

FIGURE 9 is a detail vertical cross sectional view taken on the line 9—9 of FIGURE 8.

FIGURE 10 is an enlarged fragmentary vertical transverse sectional view taken on line 10—10 of FIGURE 5A, and showing the drive sprocket, chain and web clamping means, parts being shown in elevation.

FIGURE 11 is an enlarged fragmentary vertical longitudinal sectional view of the web clamp opening cam means and associated parts at the entrance end of the packaging machine shown in FIGURE 2.

FIGURE 12 is an enlarged fragmentary vertical cross sectional view taken on the line 12—12 of FIGURE 11.

FIGURE 13 is an enlarged fragmentary plan view of the web clamping means and the opening cam for the clamps at the discharge end of the packaging machine shown in FIGURE 2.

FIGURE 14 is an enlarged fragmentary vertical longitudinal sectional view looking at the web clamp opening cam means at the discharge end of the packaging machine shown in FIGURE 2.

FIGURE 15 is an enlarged fragmentary plan view of the web clamping means and the clamp opening cam means at the entrance end of the packaging machine shown in FIGURE 2 and showing the web being inserted or turned into the clamps.

FIGURE 16 is a vertical longitudinal sectional view taken substantially on the line 16—16 of FIGURE 15.

FIGURES 17, 18, 19 and 20 are enlarged vertical cross sectional views respectively taken on the lines 17—17, 18—18, 19—19 and 20—20 on FIGURE 15.

FIGURE 21 is a view similar to that of FIGURE 5 and showing a radiant heater means disposed over the station at which the cavities of pockets are vacuum formed in the lower web, the heater means being shown as displaced from its effective position in dot and dash lines.

FIGURE 22 is an enlarged fragmentary plan view of the web supporting devices which are effective at the formed pocket loading station shown in FIGURES 3 and 21 to support the formed pockets or cavities in the web from deformation during deposition of the fill.

FIGURE 23 is an enlarged vertical longitudinal sectional view taken on the line 23—23 on FIGURE 22.

FIGURE 23A is a fragmentary vertical sectional view taken on the line 23A—23A on FIGURE 22 and showing one of the group of three holes placed at each corner of each mold cavity of a given forming or holding mold.

FIGURE 24 is an enlarged fragmentary plan view of the sealing means supporting frame structure for supporting the sealing bars and associated parts on the packaging machine of FIGURE 2.

FIGURE 25 is a vertical cross sectional view taken on the line 25—25 of FIGURE 24.

FIGURE 26 is an enlarged fragmentary vertical cross sectional view taken on the line 26—26 on FIGURE 24.

FIGURE 27 is an enlarged fragmentary plan view, partly in horizontal section, of the trip type sealing means actuating bar.

FIGURE 28 is a left end view of the parts shown in FIGURE 27, the same being viewed in the direction of arrow 28 on FIGURE 27.

FIGURE 29 is a vertical sectional view taken on the line 29—29 on FIGURE 27.

FIGURE 30 is a fragmentary vertical sectional view taken on the line 30—30 of FIGURE 27.

FIGURE 31 is a top plan view, looking down on the cushioning devices employed in the packaging machine of FIGURE 2 and effective in backing up the upwardly operable heat sealer means.

FIGURE 32 is a fragmentary vertical sectional view taken on the line 32—32 of FIGURE 31.

FIGURE 33 is a vertical sectional view taken on the line 33—33 of FIGURE 31.

Figure 34:
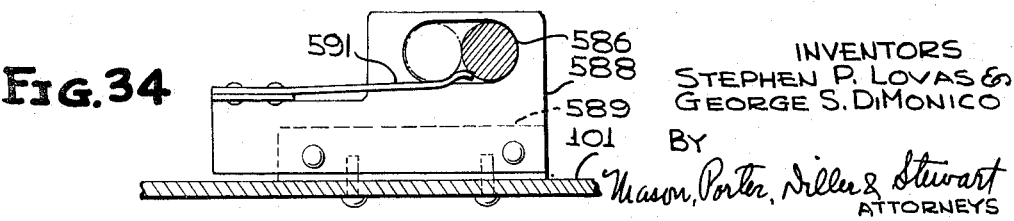

FIGURE 34 is an enlarged horizontal sectional view of the latch means shown at the lower right hand corner of FIG. 31, the same being shown in the unlatched position.

FIGURES 35, 36, 37 and 38 are diagrammatic plan views illustrating the sealing, vacuumizing and gas insertion, and cutting sequence followed in the packaging machine of FIGURE 2.

FIGURES 39, 40, 41 and 42 are views similar to those of FIGURES 35 through 38 and illustrating an alternative sealing, vacuumizing and gas insertion, and cutting sequence which may be followed in the packaging machine of FIGURE 2.

FIGURE 43 is a fragmentary plan view of the center of a package cluster at the evacuation station of the packaging machine of FIGURE 2.

FIGURES 44, 45, 46 and 47 are fragmentary vertical sectional views respectively taken on the lines 44—44, 45—45, 46—46 and 47—47 on FIGURE 43 and showing the steps in treating the package cluster at the evacuation station.

FIGURE 48 is a somewhat diagrammatic plan view illustrating a package cluster at the evacuation station of the packaging machine of FIGURE 2.

Figure 49:
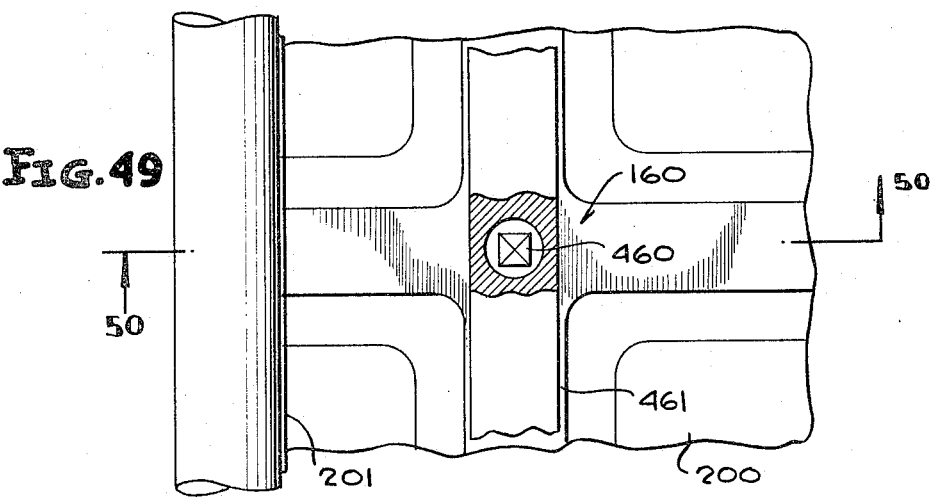

FIGURE 49 is a fragmentary plan view of the center of the lower web of a package cluster located at the piercing station which may be used as an alternative embodiment in the packaging machine of FIGURE 2.

Figure 50:
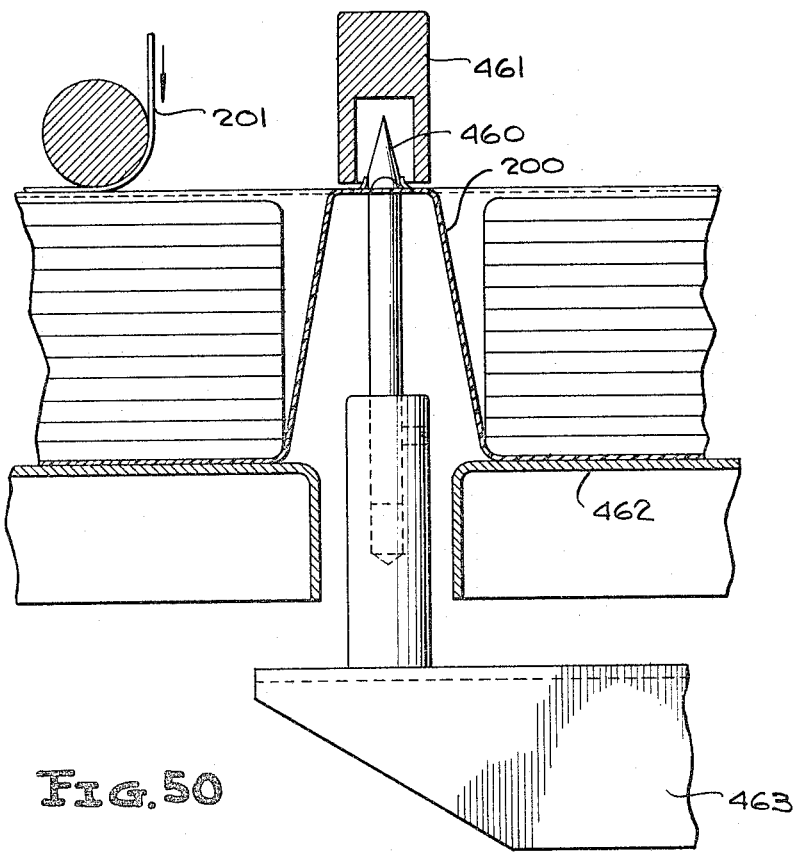

FIGURE 50 is a vertical longitudinal sectional view taken on the line 50—50 of FIGURE 49.

FIGURES 51, 52 and 53 are fragmentary vertical sectional views similar to those of FIGURES 44 through 47, and showing the alternative steps of treating the package cluster at the evacuation station to be employed in conjunction with the piercing station disclosed in FIGURES 49 and 50.

Figure 54:
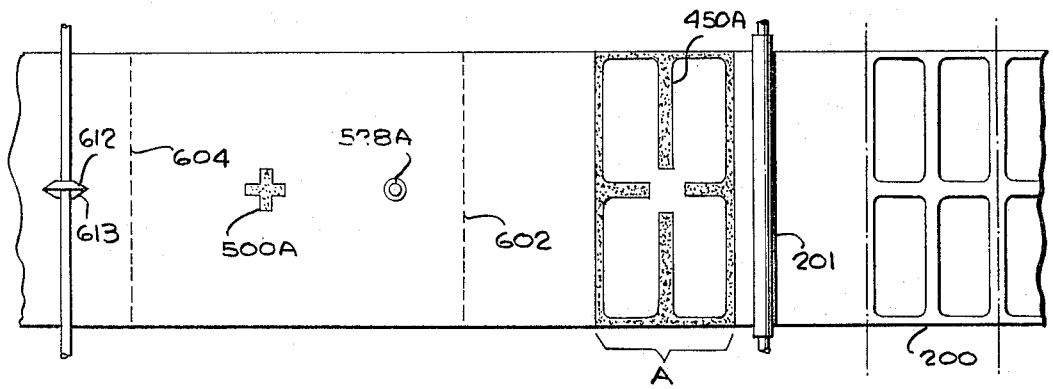

FIGURE 54 is a diagrammatic plan view illustrating still another sealing, vacuumizing and gas insertion, and cross sealing sequence which may be followed in the packaging machine of FIGURE 2.

Figure 55:
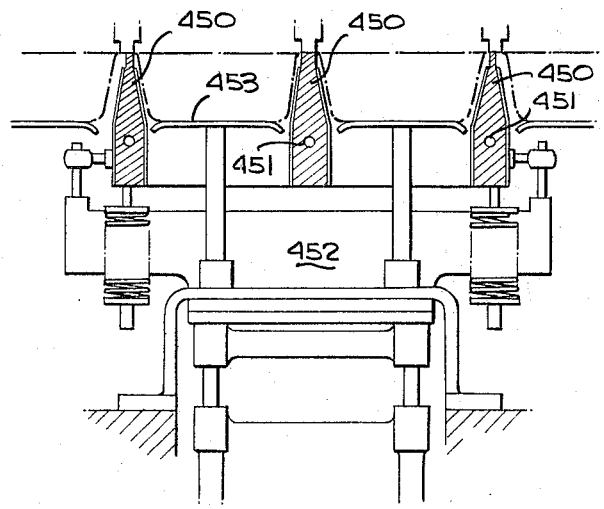

FIGURE 55 is a vertical sectional view taken at area A of FIGURE 54 showing the main sealing means used in obtaining the sequence illustrated in FIGURE 54.

Figure 56:
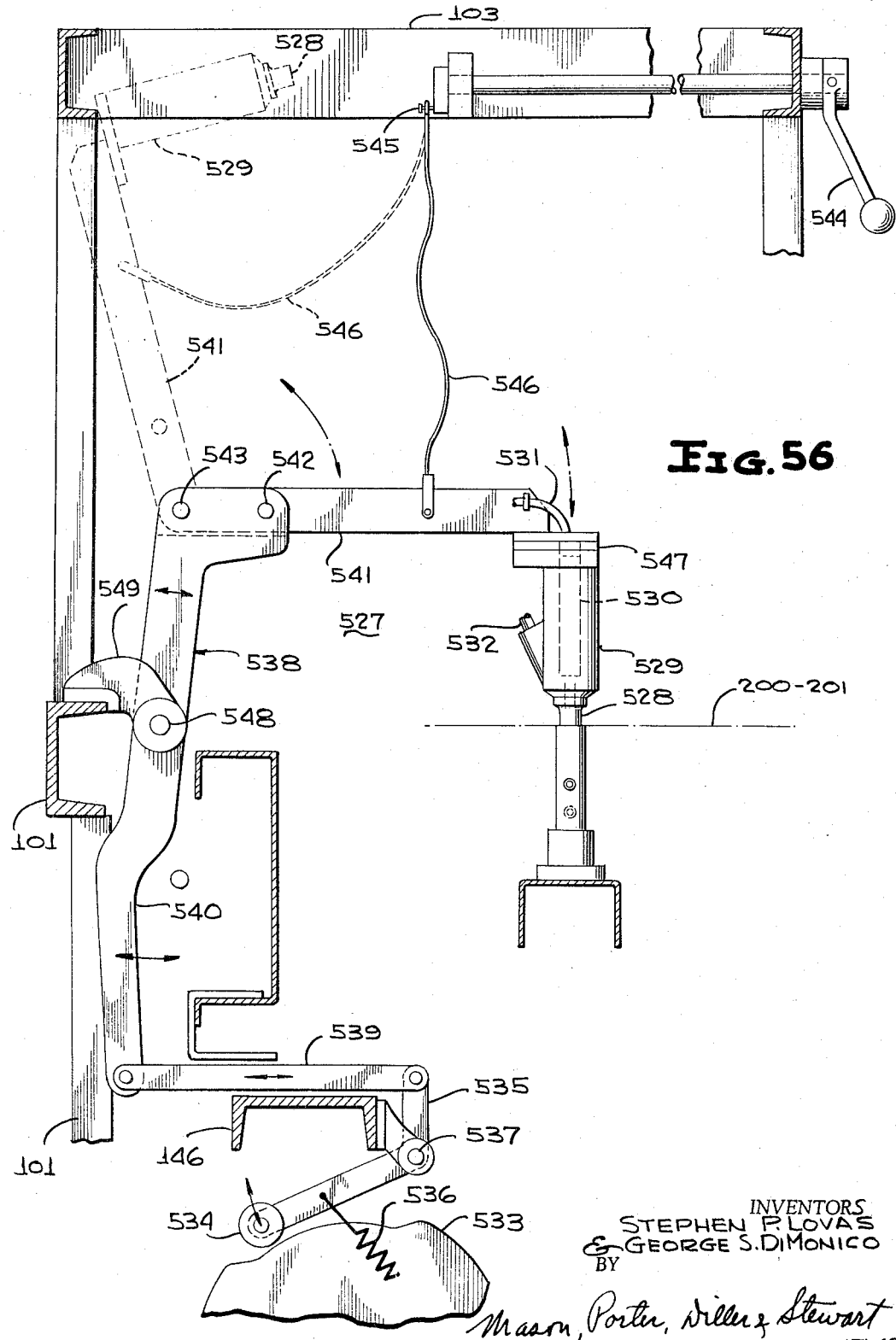

FIGURE 56 is a fragmentary vertical sectional view illustrating the means for actuating and disengaging the center sealing mechanism employed in the packaging machine of FIGURE 2.

Figure 57:
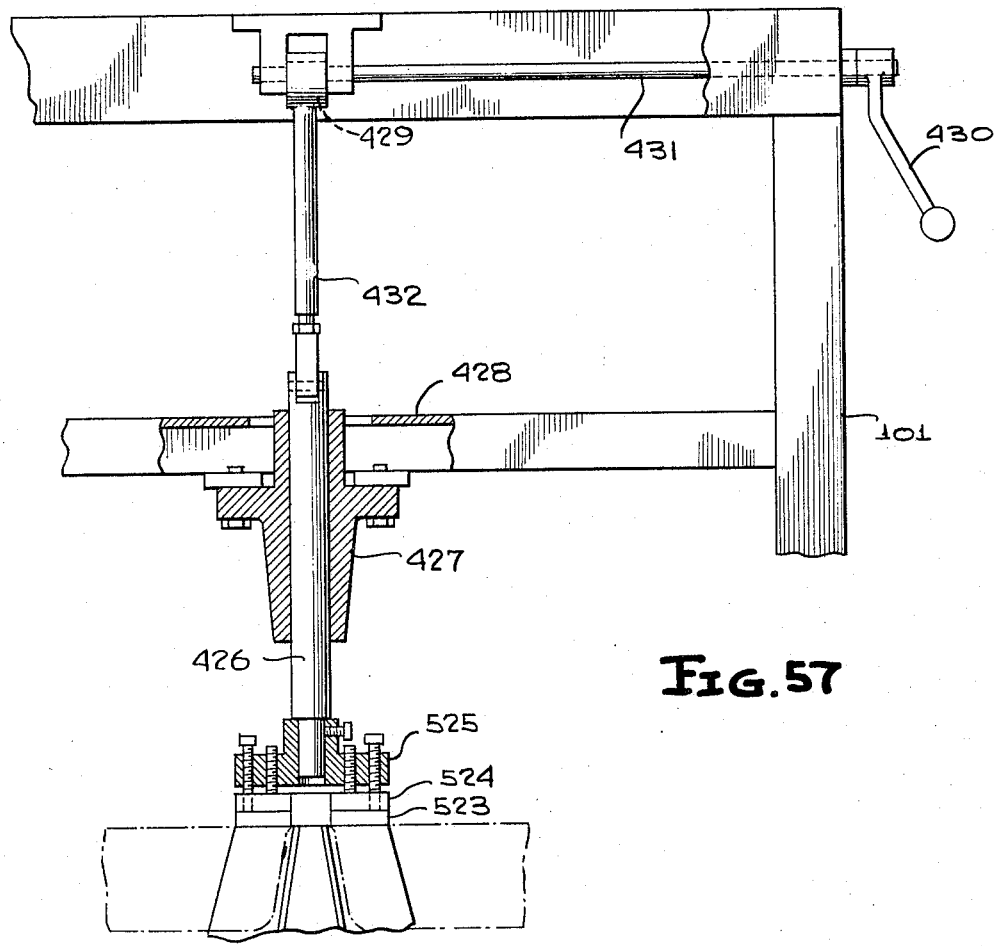

FIGURE 57 is a fragmentary vertical sectional view of the cross-shaped seal bar and cushion and showing the means for disengaging the cushion employed in the packaging machine of FIGURE 2.

Figure 58:
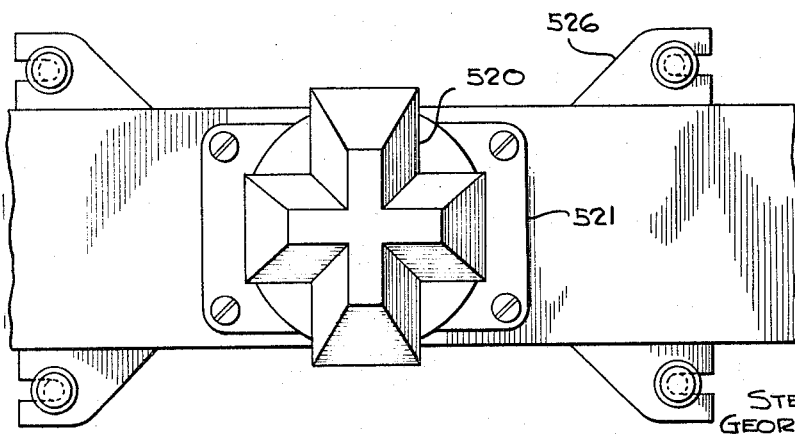

FIGURE 58 is a plan view illustrating the cross-shaped sealer mechanism employed in the packaging machine of FIGURE 2.

FIGURE 59 is a fragmentary vertical sectional view of the serrated edged or pinking disk-type, longitudinal slitter employed in the packaging machine of FIGURE 2.

FIGURE 60 is a fragmentary plan view of a portion of the longitudinally severed web showing the serrated or pinked edges.

FIGURE 61 is a fragmentary vertical sectional view of an alternative form of sealing element having insulated sides and which may be used in the packaging machine of FIGURE 2.

FIGURE 62 is an elevational view of a product-filled package formed by the packaging machine of FIGURE 2, the condition of the package prior to vacuumizing being shown.

FIGURE 63 is a fragmentary vertical sectional view of an impulse type sealer which may be used in the packaging machine of FIGURE 2.

FIGURE 64 is a left side elevational view of a packaging machine embodying the invention and wherein the food contents in the packages are frozen before the upper web is applied.

FIGURE 65 is an enlarged fragmentary vertical cross sectional view taken on the line 65—65 on FIGURE 64.

FIGURE 66 is a view similar to that of FIGURE 64 and wherein the food contents in the packages are frozen after application of the top web and peripheral sealing but prior to vacuumizing and gas insertion, cruciform sealing and the cutting apart of the packages.

*General introductory description*

In the drawings wherein for the purpose of illustration are shown several embodiments of packaging machines embodying the invention, the numeral 100 generally designates one such machine, the same being schematically shown in FIGURE 1 and in greater detail in FIGURE 2. The machine 100 of FIGURES 1 and 2 is seen to include a frame 101, a lower web roll 107 from which a lower web 200 which is to have package pockets or cavities formed therein is fed, and an upper web roll 113 from which an upper or package pocket or cavity covering web 201 is fed. The webs 200 and 201 are of indeterminate length and are stored on their respective web rolls 107 and 113.

The webs are made of thermoplastic material and are preferably formed of polyethylene which is laminated to Mylar film. The Mylar film is placed in each web so as to comprise the outside layer of the finished package, and the polyethylene is placed in each web so as to comprise the inside surface in each package which is in contact with the packaged product. The polyethylene layers of the upper and lower webs opposed one to the other in the manner stated present the heat sealing elements or surfaces. The polyethylene is relatively impervious to moisture but transmits gas relatively easily. On the other hand, the Mylar film is relatively impervious to gas, especially oxygen, but presents a relatively poor moisture barrier. Together the Mylar-polyethylene laminate is relatively impervious to both gas and moisture.

The lower web 200 is fed from the roll 107 onto the entry end of machine 100 and is gripped along both its edges by clamping means (not shown in FIGURE 1) which are opened to receive the web edges or margins by means of clamp opening assemblies generally designated 229. The lower web 200 first passes over the heater means generally designated 300 and is next acted upon over the forming mold cluster 304 which it engages and in which the desired cluster of package pockets or cavities is vacuum-formed. The mold cluster 304 is movable into and away from its web contacting position as shown in FIGURE 1 in a manner to be described hereinafter. It is preferred that one or more small openings be placed in each corner of each pocket forming mold cavity to facilitate the vacuum forming. See, for example, FIGURES 22, 23 and 23A.

After the web 200 leaves the forming mold, it is held in a holding mold cluster (not shown in FIGURE 1). Intercavity supporting means generally designated 306 serves to support the formed cluster along the ridges between and defining the formed pockets of each cluster. The fill or product is next placed in the pockets. This may be accomplished in any approved manner, as by any automatic mechanical feeder, by hand or by any other convenient method. To facilitate hand feeding the product may be fed to the machine on conveyors 106 as shown in FIGURES 2 and 3. Next, an upper web 201 is placed so as to overlay the formed and filled pockets of lower web 200. The two webs 200 and 201 are sealed together around the periphery of the clusters and between the pockets of each cluster except at the central point at which the cluster is to be vacuumized, this partial sealing taking place at the sealing station generally designated 500.

The partially sealed package clusters are separated from each other by transverse cutter means generally designated 600 in FIGURE 5A and of which the intercluster blade 602 is shown in FIGURE 1. Each package cluster is vacuumized at the vacuumizing station schematically indicated at 527 and the final cross-shaped seal is applied at the cross-seal station schematically indicated at 519. The separate cluster now completely sealed, is again cut in the transverse direction by the intracluster transverse cutter means generally designated 601 in FIGURE 5A and of which the intracluster blade 604 is shown in FIGURE 1. The side-by-side package pairs are finally separated into individual packages by means of longitudinal slitter means such as the coacting cutter wheels or disks 607 and 608 as schematically shown in FIGURE 1. The clamping means are now opened by means of clamp opening assemblies schematically shown at 240 and the individual packages are released from the machine at its discharge end. Takeaway conveyors may be added for straight-line removal of packages from the machine, if desired.

In FIGURE 2 there is shown a left side elevational view of a preferred embodiment of packaging machine embodying the invention. The forming control superstructure 102 supports the heat forming controls generally designated 109, the machine jog controls 110 (for lower web initial clamping) and the line voltmeter 111. The sealing control superstructure 103 supports heat sealing controls generally designated 117, the machine on-off and jog controls generally designated 112, the upper web roll 113 and a registration detector generally designated 116. In place of the registration detector 116 which may be of any approved form and is intended to keep a preprinted upper or cover web 201 in registration with the cavities formed by the machine in the lower web 200, a printing unit may be employed for printing on the upper web 201 as it is fed down to overlie the lower web and cover the filled pockets therein.

The frame 101 is supported on legs 104, and panels 105 serve to cover the lower part of the machine over the operating structures, thereby to enhance the appearance of the machine and prevent injury to personnel using the machine in production. The sidewise tracking of the lower web roll 107 is accomplished by means of a suitable lower web roll adjustment at 108, and that of upper web roll 113 is accomplished by means of a suitable upper web roll adjustment at 114. The upper web roll 113 is supported by an upper web roll supporting means 115 which is mounted on the superstructure 103.

Switch control means is provided at 118 for effecting emergency stops whenever an inspector, or the operator, is at the discharge end of the machine and finds it necessary or desirable to stop the machine. Sliding doors 119 are provided to make the working elements of the machine within the superstructure accessible and yet normally conceal them and prevent accident to the operator as a result of part contacts from without, as well as damage to the machine by reasons of ingress of dirt or objects from without.

The initial forming heater 300 (FIGURE 5) is equipped with a cover 302 and the final forming heater 301 (FIGURE 5) is equipped with a cover 303 which is hinged to be readily swingable away, as shown in dot and dash lines in FIGURE 5. It has been found advisable to hinge the final forming heater cover to prevent overheating of the web in the event that it is necessary to stop its movement through the machine and also to facilitate emergency cleaning of the final forming heater in case of web breakdown.

Handles 317, 598, 544 and 599 are provided for use during the starting and stopping procedures and their operation will be described in detail hereinafter. An opening 144 is provided to receive a crank which may be used to adjust the transverse spacings between the machine's longitudinal rails when the web and package sizes are changed as described hereinafter. See FIGURE 8.

It is to be understood that the jogging controls 110 and 112 are interlocked so that it is only possible for the operator to jog the machine from either of the positions, but not from both at the same time. This prevents damage to the machine and possible serious injury to personnel which may be caused should either of two operators be able to start the machine at will, from remote and different positions.

*Driving the machine*

All of the moving elements of the machine are operated from a main drive motor 120 (FIGURE 6) and its integral brake. The motor 120 is mounted on a base 121. A variable drive pulley 122 is affixed to the shaft of the motor 120 and drives the pulley 123 through the belt 124. A speed reducer 125 is operated by the pulley 123 to drive the cam shafts. The speed reducer 125 is coupled to the right cam shaft 126 through the coupling 128 and to the left cam shaft 127 through the coupling 129. The cam shafts rotate continuously in bearings 130, 131, 132, 133 and 134, as shown in FIGURES 5 and 5A.

The chains 202 (FIGURES 11 to 20) on which the web clamps are mounted are driven from the left cam shaft 127 through the coupling 145 (FIGURE 5A) and through the indexing unit 135. The drive sprocket 136 drives the driven sprocket 137 by means of the drive chain 138. The driven sprocket 137 is mounted on the shaft 205 on which is also mounted a chain drive sprocket 203. Cam shafts 126 and 127 are contained within housing 146.

The operation of the machine is intermittent, the purpose of which will be evident as the specification proceeds. This intermittent operation is attained by means of the abovementioned indexing unit 135, a commercially available unit which delivers a specified intermittent rotary output when the input shaft is rotated continuously. These units usually employ a barrel type cam internally, and being well known in the art, more detailed disclosure herein is deemed unnecessary.

Various cams for driving the several elements of the machine are mounted on the cam shafts. Proceeding from the entrance end of the machine (right side of FIGURE 5) to the discharge end of the machine (left side of FIGURE 5A): the cam 336 is the holding vacuum valve cam which actuates the holding vacuum valve 335; cam 333 is the forming vacuum valve cam which actuates the forming vacuum valve 332. A right angle gear drive 152 is employed to drive the product delivery conveyors 106—106. Both conveyors 106 are driven from the one right angle gear drive 152, as shown in FIGURE 5. A cam 327 is employed to bring about the vertical reciprocation of the forming and holding molds. A cam 581 serves to bring about the vertical reciprocation of the peripheral and intra-cluster sealer bars. The cam 436 serves to actuate the gas injection valve cam and the cam 435 serves to actuate the vacuumizing valve.

The cam 533 operates the circular heat sealing mechanism (see FIGURES 5A and 56). The cross seal bars are operated vertically by the cam 437 which also operates the vacuumizing and gassing unit 550 (FIGURES 44 to 47) and both transverse cutters 600 and 601.

*Product or fill delivery*

The product delivery conveyors 106, best shown in FIGURE 3, are loaded with the product or fill 165 at weighing and quality control stations (not shown). A product conveyor 106 preferably is provided on each side of the machine as shown in FIGURE 3, but a single conveyor may also be employed. The right angle gear drive 152 (FIGURE 5) turns the shaft 153 which is equipped with a clutch (not shown), and chains 154 are utilized to drive the conveyor pulleys 155 at each side of the machine. Trip levers 157 serve to disengage the driver clutch control to stop movement of a given product conveyor if the particular lever is pushed by product which for some reason has not been removed from the conveyor at the proper transfer loading time.

*Transverse adjustment*

One of the important features of the invention is the provision of means for adjusting the machine to accommodate formation of packages of various sizes and dimensions. While as herein shown the packages are formed in clusters of four, it is possible to form single packages, or clusters of from two to approximately eight packages. In the attainment of this end the transverse spacing between the endless chains 202 is adjusted by means of a removable crank which can be affixed to shaft end 143 through the hole 144 (FIGURES 8 and 10).

A slotted slide tube 139 is mounted on the machine frame 101 and within slide hubs 140 as best shown in FIGURE 8. Nuts 141 are mounted on the hubs 140 to project interiorly thereof and slide tube 139 as shown, and said nuts threadably receive the track frame adjusting screw 142. It will be apparent that the screw 142 has right and left hand threads, and that by applying a crank to the non-circular screw end 143 and turning the same the hubs 140 can be made to move toward or away from each other, depending upon the direction of turning of the crank. There are two sets of hubs, slide tubes and nuts; one is at the discharge end of the machine and is turned by the crank which is inserted through hole 144 and the other is at the entrance end of the machine. As the adjusting screw 142 of FIGURE 8 is turned by the crank the meshing bevel gears 148 are caused to rotate. The bevel gears 148 are mounted so as to rotate the shaft 147 best shown in FIGURE 4 when they are rotated. The rotation of the shaft 147 causes the bevel gears 149 and the track frame adjusting screw 150 to rotate. The track frame adjusting screw 150 is similar in arrangement and function to adjusting screw 142 and is mounted in a like cooperative arrangement with a slide tube and a pair of slide hubs, as previously described It will be apparent from FIGURES 8 through 10 that the axial movement of the slide hubs 140 brought about by turning of the screws 142 and 150 causes the track support frames 210—210 to move in and out in a transverse direction within the machine frame 101. It should be noted that all locking screws on the sprocket hubs 204 (FIGURE 10) should be loosened before attempting to change the positions of the frames 210 and chains 202.

*Clamping the lower web*

In the known prior art, it has been considered desirable, and in some cases necessary, to move a series of molds through all the processing of the web material in order to support the pockets which have been formed in the web and then filled with the product. This is no longer necessary in machines embodying the present invention, the problem being solved in part by gripping the marginal edges of the lower web 200 by means of clamps which are affixed to a pair of endless conveyor chains driven longitudinally along the sides of the machine, and in part by other features of improvement.

FIGURES 10 through 20 serve to illustrate the operation of the novel clamping devices of the invention as well as the novel means for opening the clamps and tucking the web into the opened clamps. A pair of endless chains 202 are provided, these being of the roller chain type. These chains are driven by means of a pair of sprockets 203 (FIGURES 5, 10 and 14) which are located at the discharge end of the machine. The drive sprockets are driven from the motor 120 previously mentioned under the heading Driving the Machine. The clamps shown in detail in FIGURES 17 to 20 are those which are equipped with guide roller and block assemblies 224, 225, 226. In practice, it has been found that it is only necessary to equip every fifth or sixth clamp with such a guide assembly. Each sprocket 203 is mounted on a hub 204 which is positively driven by the drive shaft 205. The shaft 205 and hubs 204 are positively mated by means of keys 206 and keyways 207, and the shaft is mounted in bearings 208. A locking screw 209 is provided to lock each hub 204 in position on the shaft 205.

Each track frame 210 is provided with U-shaped extensions 211 which are used to move the sprockets 203 when the machine is adjusted for a new package cluster size. The sprockets 212 (FIGURE 11) are take-up sprockets for the endless chains 202 and there are two such sprockets, one for each chain. Each take-up sprocket 212 is mounted on a shaft 213 (FIGURE 5). The sprockets 212 are slidably adjustable by reason of being mounted in slidable bearings 214 on adjustment plate means 215. By this means it is relatively simple to take up any slack in the chains or to releieve any overtightness in them. Slide rails 216, portions of which are shown in FIGURES 11, 12 and 14, are utilized to support the weight of the chains as they ride through the machine.

Each clamp generally designated 217 is seen to comprise a base 218, mounting screws 219 for affixing the clamp to the chain, and a clamp spring 220. The clamp spring 220 is mounted on the base 218 by means of a spring presser plate 222 and mounting screws 221. A roller 223 is affixed to the spring 220 near the web gripping end of the clamp and serves to open the clamp when it is riding on opening cams 230 at the entrance end of the machine or 241 at the package delivery end. A guide block 226 is mounted on each clamp 217 by means of the guide extension 224 and serves in cooperation with a stationary guide channel 246 to guide movement of the clamp and impart vertical stability to the respective chain in its upper flight travel, said block 226 resting on the support rail 250 on its return along the lower flight travel of the chain. See FIGURE 10. The support rail 250 is suspended from the frame 210 on a support rail bracket 251 and the rollers 223 of the clamps are supported during the return travel of the chains on the similarly suspended rail 249.

The guide rollers 225 are used to obtain horizontal web tension absorption in cooperation with the upper guide channels 245 and horizontal return control in the lower guide channels 248. Chain hold down lip means 227 cooperate with the holddown bars 228 mounted on the track frames in areas where there is a tendency for the chains to lift.

There are a pair of clamp opening units 229—229 at the entrance end of the machine (one for each chain) and a second pair 240—240 at the discharge end (one for each chain). For reasons which will appear as this description proceeds, the entrance and discharge clamp opening units are not identical.

Each clamp opening assembly 229 is mounted on the respective track frame 210 by means of an overhead support 236, as shown in FIGURE 12, and holds a cam supporting block 232 in suspended position. A cam mounting plate 231 is affixed to each cam support block 232 and supports the respective clamp opening cam 230. Each clamp 217 is provided with a bearing surface 233 which is mounted thereon by means of screws 234 and which is in contact with the underside of the respective cam mounting plate 231 during the clamp opening operation. The gripping end of each clamp spring 220 is designated 235.

The web clamping operation proceeds as follows: the lower web 200 is fed from the roll 107 so that it overlies the top of the machine at the entrance end and the machine motor is started. This causes the sprockets 203 to rotate and move the endless chains 202. As the chains move the clamps 217 are moved so that each roller 223 rides up onto one of the opening cams 230 (FIGURE 11). As the clamp proceeds along its travel, the end 235 of its spring 220 is forced away from clamp base 218 because of the shape and lifting action of the cam. FIGURES 15 through 20 illustrate the action of the cams and the positions of the clamp springs at various stages as they proceed along the cams. It should be noted that the lower web 200 first overlies a cam spring 220 as shown in FIGURE 17 until it is tucked under spring end 235 by the action of tucking edge 237 of cam mounting plate 231 in the manner illustrated in FIGURE 15.

The tucking edge 237 of each cam mounting plate 231 forms a sharp acute angle with the gripping ends of the clamps. This angular tucking edge forces the web 200 under the spring end 235 of the clamp and under the mounting plate 231 after it reaches the position of FIGURE 19. Just prior to the web's being forced under the mounting plate 231 by the action of the tucking edge, the web edge folds over as shown at 238 in FIGURE 18. As each roller 223 continues to ride on the respective cam 230 the particular clamp remains open until it reaches the left downwardly inclined section of the cam (FIGURE 11). As each roller 223 proceeds down the left inclined section of the particular cam 230 the clamp starts to close. As soon as the rollers 223 leave the cams 230 the clamps are closed and the marginal edges of the web 200 are securely gripped by the action of spring ends 235 against clamp bases 218, as shown in FIGURE 20, the web thus being held horizontal and taut.

Once the leading portion of web 200 is secured by clamps along both its marginal edges, it is moved along the machine for the various processing steps which will be described further along in this specification. It can also be seen that the movement of the web in conjunction with the movement of the chains will cause the entering web to be progressively gripped by the clamps as ungripped web arrives at the location of clamp opening assemblies 229.

*Unclamping the lower web*

FIGURES 13 and 14 illustrate in detail one of the discharge end cam opening assemblies 240—240. Each assembly is mounted on the respective frame 210 by means of an overhead support 244 which is similar to the beforementioned overhead support 236. A cam support block 243, which is similar to the support block 232, is affixed to each overhead support 244. The cam mounting plate 242 of each assembly is similar to the previously mentioned mounting plate 231 except that it is not provided with the previously described tucking edge. The mounting plate 242 is attached to the support block 243. An opening cam 241 is mounted on each mounting plate 242, as shown in FIGURES 13 and 14.

The packages are removed from the clamping devices in the following manner: The formed filled packages have been vacuumized and separated as they travelled through the machine. After the clusters have been divided into individual packages, they arrive at the position of the discharge end clamp opening assemblies 240, as clearly illustrated in FIGURES 5A and 14. As each clamp roller 223 moves onto the receiving or upwardly inclined surface of the respective cam 241, the particular clamp is forced open in the manner previously described in connection with the initial clamping of the lower web 200. When each clamp reaches the plateau or horizontal portion of the particular cam 241, it is fully open. When portion of a given package are opened, the package pulls out of the clamps and slides down a discharge chute by the action of gravity and away from the opposed clamp portions. As the chain clamp rollers 223 ride down the inclined delivery surfaces of cams 241—241, the clamps are closed. However, since the packages have moved away from the clamping area the clamps close without any web between the clamp spring ends 235 and bases 218. The clamps then move about the sprockets 203 and along the underside of the machine to return to the sprockets 212 at the lower web receiving or entrance end of the machine.

*Lower web heating and pocket forming*

Prior to forming the pockets in the lower web 200 by vacuum, it is necessary to heat the web to its forming temperature. In FIGURE 5, we have illustrated one form of web heater and vacuum former. The initial forming heater 300 and the final forming heater 301 comprise a two-stage heating unit. The heaters are separated from the heater base plate 307 by means of heat insulating spacers 308. Mounting bolts (not shown) which hold the two forming heaters 300 and 301 to the assembly are disposed internally of the insulators 308. Leads 309 are provided to deliver electrical energy to the initial forming heater 300, and leads 310 deliver electrical energy to final forming heater 301 from a suitable source of supply (not shown). Heater mounting mechanism generally designated 311 supports the heating unit in FIGURE 5 and includes the mounting platform 312, pads 313, and a holddown rod 314 for fastening the base plate 307 to the mounting platform 312. The heater mounting mechanism 311 is mounted on frame cross members 151 by means of mounting brackets 319.

A handle 316 may be used to rotate the holddown rod 314. When it is loosened it is possible to remove the heaters 300 and 301 from the mounting platform 312 whenever this is desired, as when it is necessary to change the heaters because of a change in web size or for maintenance purposes. A spring 315 biases the mounting mechanism 311 in the "up" position shown in FIGURE 5 and the handle 317 may be employed to lower the heaters out of contact with lower web 200. Links 318 of a four bar or toggle linkage cause the platform to move in the direction of the arrows when the handle 317 is moved to the right to lower the heaters, and back to the "up" position when the handle is moved to the left to restore the heaters in their effective, heat applying position. A stop 320 provides the desired upper limit stop and the stop 321 provides the desired lower stop limit.

A protective cover 302 is usually fixed in position above the heater 300 and a cover 303 is placed over the heater 301 and is pivoted so that it may be raised or opened to the dot and dash line position of FIGURE 5. This pivoted cover may be raised by hand to prevent the web from becoming over-heated and melting if it is necessary to stop the forward movement of the lower web for periods of time. Obviously the other cover 302 may be subject to similar removal if desired.

A set or cluster of forming molds 304 and a set or cluster of holding molds 305 are mounted on the mold support bracket 322 which is carried on the platform 323. The platform 323 is adjustable for alignment of the molds with the balance of the machine by means of levelling screw means 330, and the arrangement is such that the complete upper mold assembly may be removed from the platform to change mold sizes or for other purposes. The platform 323 is mounted on a four bar linkage of which the hinge bracket 324 (FIGURE 6) is one member. The other members of the four bar linkage are the cam lever 325 with its cam roller 326, the lifter bracket 328 and the link 329. As the cam 327 is rotated by the cam shaft 126, the four bar linkage raises the molds 304 and 305 into the forming and holding position and later lowers them out of contact with the web 200 and to a level where they will not interfere with advancing movement of said web, according to the predetermined forming and holding cycle.

The cams 333 and 336 (FIGURE 5) serve to actuate the vacuum forming valve 332 and the vacuum holding valve 335 respectively. Depending on the position of the cams, these valves are open to connect the mold cavities with a vacuum pump (not shown) through input fitting means 337. When the vacuum forming valve 332 is open, air is evacuated from the molds 304 through line 331 by the vacuum pump. When the vacuum holding valve 335 is open, air is evacuated from the holding molds 305 through the line 334 by the vacuum pump. Thus the vacuum is applied to the lower web 200 which overlies the mold cavities through small holes which preferably are located in groups of three in the corners of the mold cavities the web contacting and sealing against the upper, pocket defining wall portions during the vacuum forming. See for example FIGURES 22, 23 and 23A.

The pockets are formed in the lower web as follows: the heated web is fed till it overlies the molds 304, in contact thereover as previously described, and vacuum is drawn in the mold cavities by the vacuum pump. This causes the web to be drawn into the cavities in the water cooled forming molds 304 and to assume the shape of the cavities, thus forming a desired cluster of pockets or cavities. Next, the vacuum is cut off by the action of the cam 333 and the molds 304 are dropped out of contact with the web 200, and to a position where the pocketed web may be moved freely thereover, by the action of the cam 327. Now, the web 200 is advanced so that the cluster which was just formed in the molds 304 is over the holding molds, and a new section of heated web is over the forming mold. The molds 304 and 305 are moved up into contact with the web 200 by the action of the cam 327, and vacuum is drawn in the molds 304 and 305 by reason of the valve controlling action of the cams 333 and 336. The vacuum drawing of the web portion overlying the forming molds 304 serves to form a new set or cluster of pockets immediately after the already formed cluster pockets which are now in the molds 305, and the pockets previously initially formed in the molds 304 and now in the holding molds 305 are held in place by the holding vacuum. If this were not done there would be a tendency for the previously formed pockets to flow back into the forming molds 304 and the desired, accurate and well defined pocket form in the individual cluster pockets would not be attained and permanently maintained.

After a finished cluster of pockets leaves the vertically reciprocable holding mold 305, it is supported on the stationary support platform members 338 and by intercavity supports 306 which fit between the formed pockets both within a single cluster and between clusters as shown in FIGURES 5 and 21 to 23. The vacuum is applied to holding mold 305 through small holes in the corners of the cavities as is done in the forming mold 304. See FIGURES 22, 23 and 23A.

In FIGURE 21 there is shown an alternative embodiment of forming station heater. The previously mentioned initial heater 300 is employed in this embodiment and, as before, is mounted on an assembly 311 and is movable up and down as required in the same manner as the heaters 300 and 301 of FIGURE 5. However, there is no fixed heater cover on initial heater 300 in this embodiment of FIGURE 21. The radiant heater assembly 339 is reciprocable back and forth so that it first lies over the heater 300 and then moves forward with web 200 into position over foaming mold 304 as shown in full lines in FIGURE 21. The radiant heater assembly 339 is shown as comprising heater elements 340 and reflector means 341 which serves to direct the heat onto the lower web 200. A bifurcated shifter lever 342 has its arms joined through torque tube 350, and the oscillating movement of lever 342 is in the directions shown by the applied arrows. Rollers 343 are mounted on the heater assembly and ride on the rail 344 in order to facilitate movement of heater assembly 339 back and forth between its two positions. A pivot pin 345 connects the heater assembly 339 to lever 342 and also supports the heater in position, as will be apparent by reference to FIGURE 21.

A handle 346 is provided to manually move the heater assembly 339 out of contact with the web into the rest position on rest rail 347 as shown in dot and dash lines in FIGURE 21. It will be apparent that the web may be feeding through the machine (for test or other purposes) while the heater assembly 339 is in its out-of-the-way position and while the heater 339 will be reciprocated back and forth it will remain supported on rest rail 347 and will roll thereon because roller 343 is in contact with said rest rail.

The heater assembly 339 is caused to reciprocate between its two positions by means of a cam 348 and a biasing spring 349. When the cam is acting on the lever in a direction to overcome the tension of biasing spring 349, the lever 342 is pushed back to position the heater assembly 339 over the initial heater 300, and when this active cam force is removed during continued rotation of the cam, the tension of biasing spring 349 becomes effective and pulls on the lever 342 so as to cause the heater assembly 339 to move into position over the forming mold 304.

The operation of this alternative embodiment is as follows: assuming that a section of the web 200 is over the heater 300 and the heater assembly 339 is also over the heater 300. At the same time the forming and holding molds 304 and 305 and the intercavity supports 306 which are mounted on the platform 322 are in the "down" or out-of-the-way position. Now, the mentioned section of the web 200 moves forward so that it is over the molds 304 and the heater 339 moves forward with said web section through the cooperative action of the cam 348 and the biasing spring 349. All of the molds and supports affixed to platform 322 then move to the "up" position shown in FIGURE 21 as a result of the action of the cam 327. Next, vacuum is applied to molds 304 from the vacuum pump by the action of valve control cam 333. This vacuum action serves to pull the heated web into the mold cavities and forms a cluster of four pockets in the web, the heater 339 being immediately returned so that it overlies the heater 300 and a new section of the web 200. Immediate removal of the radiant heater assembly aids the fast cooling required to "set" the formed pockets. It is to be understood that the forming mold is water cooled; water being passed through suitable passages therein.

The vacuum is now removed and the platform 323 moves to the "down" position and the formed cavities are thus freed to move forward. As the action previously described is repeated, the pockets which were formed in the web 200 in the forming molds 304 are moved into position over the holding molds 305 and then are received in said pockets and vacuum is applied to them through the action of the valve control cam 336. This prevents the formed pockets from deforming back into the forming mold 304, as has been explained previously. On the next operation cycle the first cluster of pockets moves over the first set of pocket supporting platforms 338 and intercavity supports 306. Loading of the product or fill into the pockets may be accomplished at this point, the supporting devices 338 and 306 serving to prevent objectionable deformation of the otherwise unsupported, web cavities or pockets, or the loading may take place in the previous holding mold.

In FIGURES 22 and 23, there are clearly illustrated the supports 338 and 306, as well as the longitudinal support side rails 351 and the longitudinal support center rail 352. All of these elements cooperate in supporting the formed pockets during and after the product loading process. The loading or filling may be accomplished mechanically, by hand, or by any other convenient method, as previously described.

*Sealing (general)*

The discussion under this heading is directed toward the production of all seals, the details of which will be covered in the description of the structure by which they are made.

Figure 35:
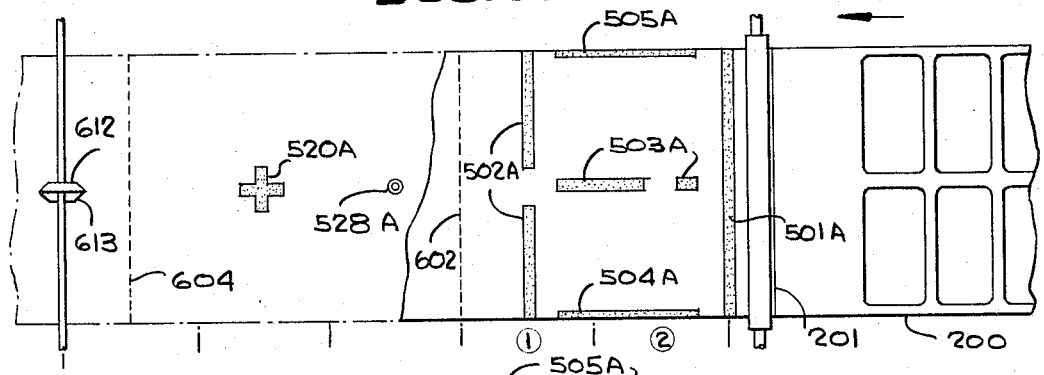

In FIGURES 35 through 38, there is illustrated the sealing procedure found to be preferable for use in the packaging machine of FIGURE 2. In this portion of the description, the operation performed on the package clusters is designated with a suffix letter A following the number of the element of the machine performing the function. Also, the operation performed at a particular station is shown by stippling the areas, the completed operation being shown in outline form. Moreover, the package cluster positions have been marked in small circled numerals below the diagrammatic illustration of the operation steps. Also, repetitious illustration of the formed cavities as shown at the right of FIGURE 35 has been eliminated between the seals for simplicity. It can be seen from the figures that the cluster 3 is the first one which is completely sealed and properly vacuumized.

Figure 36:
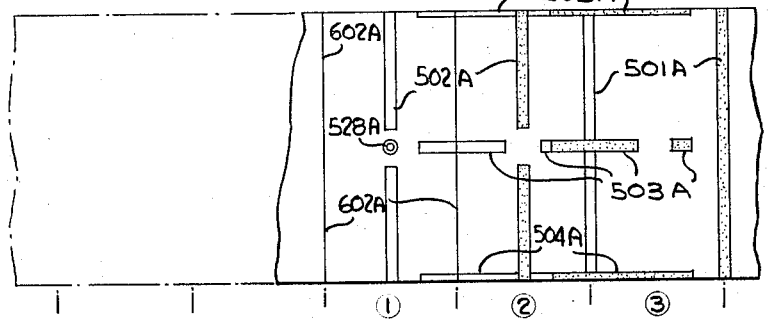

This description will now follow the pocketed and covering webs as they proceed through the sealing and vacuumizing processes. The first sealing process just to the left of the point at which upper or cover web 201 is applied so as to overlie the formed filled pockets in web 200 seals a cluster and a half, namely all of 2 and half of 1. At this station the seals 501A, 502A, 503A, 504A and 505A are applied. Now, the webs move forward for a distance of one cluster, clusters 2 and 3 are sealed, the intercluster blade 602 performs the cut as indicated at 602A between the clusters 1 and 2 and cluster 1 is evacuated and thereafter ring sealed as shown at 528A of FIGURE 36. It can be seen that the clusters 1 and 2 indicated in FIGURE 36 are not usable because there is no intercluster seal between them.

Figure 37:
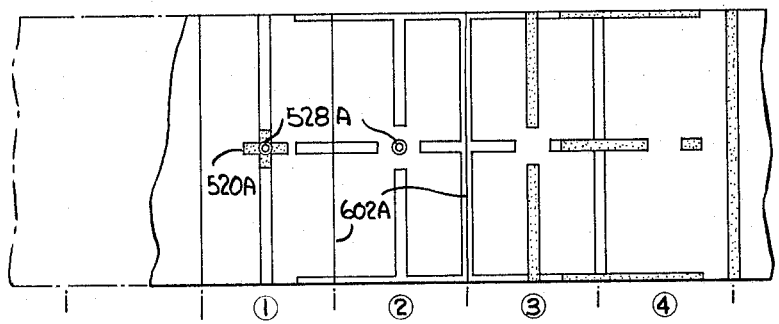

The webs are now moved one more increment or cluster spacing forward to the position illustrated in FIGURE 37. The clusters 3 and 4 are sealed as shown, a transverse cut 602A is made between clusters 2 and 3, cluster 2 is evacuated and ring sealed at 528A and the cross seal is applied to cluster 1 as shown at 520A.

Figure 38:
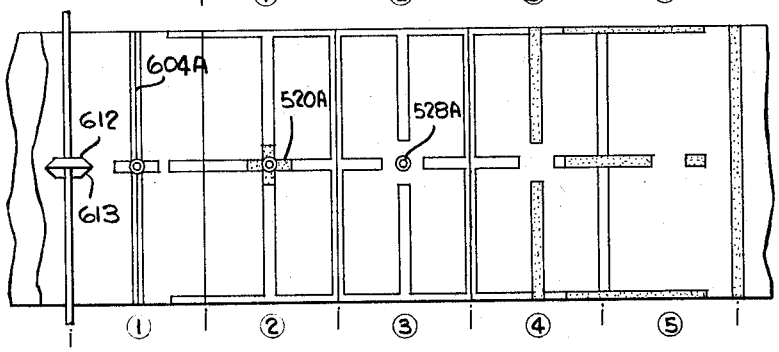

The webs 200 and 201 are now moved one more increment forward to the position illustrated in FIGURE 38. The clusters 4 and 5 are sealed as shown, the transverse cut 602A is made between clusters 3 and 4, cluster 3 is evacuated and ring sealed at 528A. Cluster 2 is cross sealed at 520A and the cut 604A is made transversely in the cluster 1. On the next forward motion of the webs, plain longitudinal slitters 612 and 613 operate to separate the pairs of packages of the cluster 1 longitudinally.

As the webs proceed through the machine the packages are sealed, evacuated through the cluster centered evacuating orifice, circle sealed about the orifice, cross sealed and cut apart as has been described above. It should be apparent that if it is desired to inject an inert gas into the packages after evacuation, this may be done at the evacuating (vacuumizing) station. It should also be borne in mind that the circular seal is placed around the area at which the evacuation was accomplished prior to the movement of the webs to the next operational station where the cross seal over-seals the circle seal and completes the peripheral sealing of the individual packages.

In FIGURES 39 through 42 there is illustrated an alternative sealing, evacuating and cross sealing procedure which may be employed. In the system of FIGURES 35 through 38 all of the seal bars and cushions employed, except the cross seal, are straight line elements which are simple to fabricate, no angular cornering being involved. In the system of FIGURES 39 through 42 the seal bars and cushions are more complex in that T-shapes and cross-shapes are employed.

Figure 39:
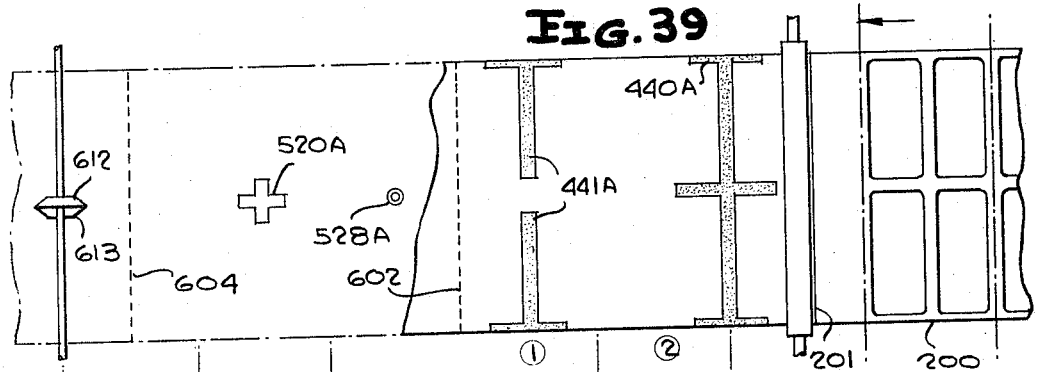
Figure 40:
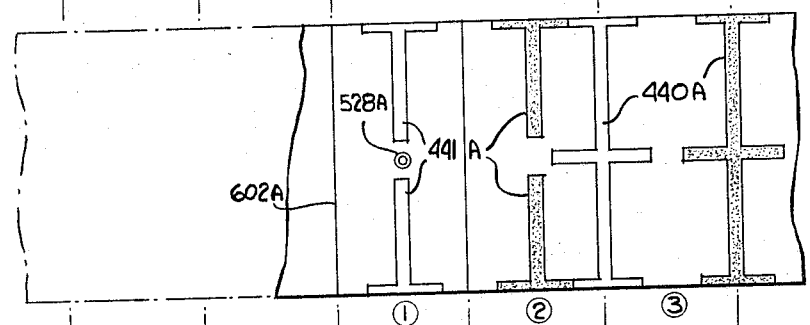
Figure 41:
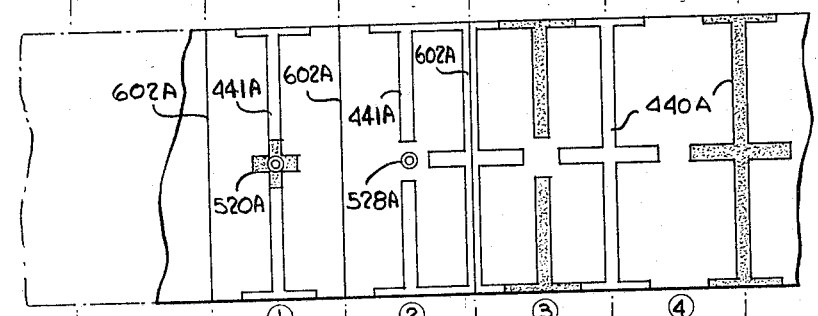
Figure 42:
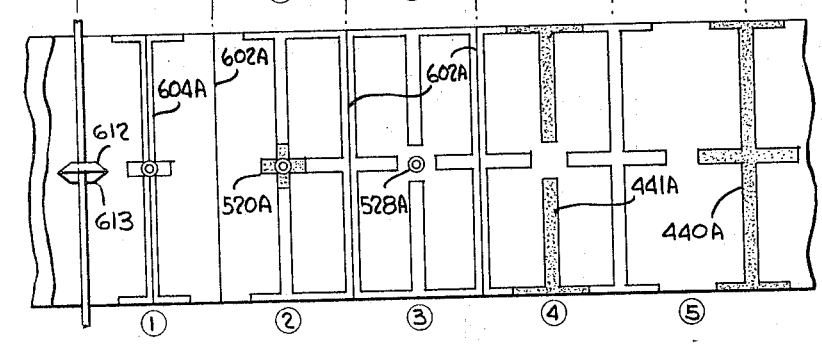

Considering the condition illustrated in schematic FIGURE 39, the seals 440A and 441A are applied to a cluster and a half (clusters 1 and 2). Next, the webs move forward one increment so that the seals 440A and 441A are applied to clusters 2 and 3, cluster 1 is evacuated and then ring sealed at 528A and then the transverse cut 602A is made between clusters 1 and 2 (FIGURE 40). The next position is illustrated in FIGURES 41 wherein the clusters 3 and 4 are sealed at 440A and 441A, clusters 2 and 3 are transversely cut at 602A, cluster 2 is evacuated and then ring sealed at 528A, and cluster 1 is cross sealed at 520A. Now the webs move to the position of FIGURE 42, at which point seals 440A and 441A are applied to clusters 4 and 5, the transverse cut 602A is made between clusters 3 and 4, cluster 3 is evacuated and then ring sealed at 528A, cluster 2 is cross sealed at 520A, and the transverse cut 604A is made in cluster 1. On the next forward movement of the webs, the longitudinal cut is made in cluster 1 by the cooperative action of plain slitters 612 and 613, thus completing the division of cluster 1 into four individual package units. However, it can be seen that the first good and completely sealed cluster is cluster 3 and that thereafter completely sealed and evacuated packages will be formed using the alternative sealing procedure just described. Thus only upon the two stage transverse cutting of such a complete package cluster, and the following longitudinal cutting will four complete packages be produced from each processed cluster.

In FIGURE 54, there is illustrated an alternative one step main sealing procedure. The seal 450A is applied to each cluster, and as the webs move forward the clusters are evacuated and ring sealed at 528A, cross sealed at 520A and cut into individual packages at 602, 604, 612–613. This method, seemingly simpler than those described above, requires a seal bar and cushion structure which is is more complex and difficult to fabricate than in the other procedures.

*Main sealing*

The main sealing steps (between clusters and within clusters) serve to seal the peripheries of the clusters and the major portion of the junctions or intersecting pocket corner defining wall portions of the package pockets within the clusters. The structures at the sealing station 500 which are used to produce the seals shown diagrammatically in FIGURES 35 through 38 will first be described. Various views of the structures at the sealing station 500 are shown in FIGURES 5A, 7 and 24 through 30.

The seal bar assembly generally designated 576 in FIGURES 7 and 26 is mounted on a platform 577 and is moved vertically against the seal cushions 511, which are mounted in the frame 509 (FIGURE 33), by the action of the cam 581 (FIGURE 7). The sealing bars 501, 502, 503, 504 and 505 are mounted on the sealing bar mount 506 (FIGURE 25) which is in turn a part of the seal bar assembly 576. Heaters 562, 563, 564 and 565 are contained within the seal bars 501, 502, 503 and 504, respectively. A similar heater (not shown) is contained within the seal bar 505. The means for making connection to the source of electrical power is conventional and is not shown. All of the seal bars are heat insulated by means of insulator sheets 566 which are affixed to the sloping sides of the seal bars, as shown in FIGURE 26. The base of the seal bar assembly 576 is designated as 567 as shown in FIGURE 26.

The seal bars are mounted as shown in FIGURES 25 and 26 with heat insulation 507 between the mount 506 and the seal bars. The mounting bolts are heat insulated and have the ability to allow for seal bar expansion. Vertical guide rods 568 and 569 are provided to guide the movement of the seal bar assembly against the seal cushions. Both of the vertical guide rods 568 and 569 slide in individual ball mounted slide bearings 571. The pin 570 is a pivot by which guide rod 569 is pivotally mounted on the base 567.

Compression springs 572 are employed to provide for adjustable sealing pressure application to the seal bar mount 506 and, consequently, thereby through all of the seal bars against the respective seal cushions. Spring stops 574 (nut and washer) are mounted on the spring tie rods as shown in FIGURE 25 so that they are seated on the spring bar 573 when the springs are relaxed and are unseated when the springs are compresed incidental to a pressing of the seal bars against the cushions 511. The nuts 575 may be utilized to vary part spacing to adjust the compression of springs 572 and consequently the sealing pressure to be applied by the assembly 576.

Referring to FIGURE 7, the seal bar assembly 576 is shown as mounted for being moved substantially vertically by means of a four bar linkage similar to that employed to move the forming and holding mold assembly except that the sealing station four bar linkage is equipped with an overload release or trip mechanism the purpose of which will be described below. The hinge bracket 578 and its attachment at 417 as shown in FIGURES 7 and 30 provide the fixed anchorage or first element of the four bar linkage, trip type cam lever assembly 579 is the second element of said linkage, the lifter bracket 582 is the third element of said linkage and the pivotally supported link 583 is the fourth element of said linkage. Shock absorbing bumpers 584 (FIGURE 7) are provided and serve to prevent damage to the seal bar mechanism when it is tripped and drops down. The roller 580 operates the inner lever 400 of cam lever assembly 579.

In the event that some product, ice or other non-compressible material, is present as an obstruction in the area in which the seal bars and cushions are to operate, it is necessary to trip the sealing assembly so that it will not act against and damage the seal cushions or other engaging parts. If this were not done, there would be danger of damage to the seal bars because of the very high forces which develop. In FIGURES 27 through 30 we have illustrated the mechanism for preventing the seal bars from making damaging high pressure contact with the seal cushions. A normal lifting force is in the order of 300 pounds and may be defined as the force that is slightly greater than that necessary to support the weight of the sealing unit and its operating linkages and supply the acceleration forces on these parts at proper machine speed.

The safety trip feature is accomplished, in general, by employing in the linkage, a double lever arrangement which acts as a single lever through the action of a latching mechanism with limited but adjustable latching or driving power, and has a locking mechanism which overrides the limitation of the latching mechanism and provides positive driving power between the levers only when the seal bars are within one-fourth inch of the seal cushions.

When locked, the levers can transmit the required sealing force which is in the order of 2,000 pounds.

If tripped, due to a jam while rising, damaging or breaking forces can be avoided.

The trip type cam lever assembly 579 comprises an inner lever 400, an outer lever 401, a pivoted latch lever 402 which joins levers 400 and 401 as shown in FIGURE 30, a latch lever roller 403, a latching or back up spring 404, and a ball pivot 405. A screw 406 may be employed to adjust the pressure of the back-up spring 404 and is locked in position by the nut 407. The surface at which inner lever 400 and the outer lever 401 are held together is designated 408 (FIGURE 30). A locking pawl 409 is pushed into locking position and held in under pressure, as shown in full lines in FIGURE 30, during the last one-fourth inch of travel of the sealing assembly by the action of abutment spring 413 and the abutment roller 412. The locking pawl 409 is held in the unlocked position (dotted lines FIGURE 30) against the stop 411 best shown in FIGURES 27 and 29 by a biasing spring 410. The spring 413 may be adjusted as to its position of contact by the roller 412 by means of the screw 414 which is locked in position by the nut 415. A latching block 416 serves to strengthen the abutment edge on the inner lever 400 and as a tolerance make-up piece in the system. Full sealing force is transmitted from lever to lever through this block and the locking pawl 409. The portion of the cam shaft housing in the vicinity of the sealing station 500 and comprising the support for the lever assembly has been designated 417 as previously stated, and 418 designates the hole or opening through which locking pawl 409 may drop or move on overload release, thereby to permit ineffective, non-damaging upward movement of the lever portion 400 without carrying with it the lever portion 401.

The operation of the sealing assembly trip mechanism is as follows: the cam 581 acts against inner lever 400 through its roller 580 and swings the coupled or releasably connected levers 400 and 401 upward. The back-up spring 404 biases the latch lever 402 so that the same is held in the position of FIGURE 30 and the levers 400 and 401 are held together as at 408, as previously described. If no obstruction to normal upward movement is encountered, the locking pawl 409 is pushed to the solid line position of FIGURE 30 by the action of abutment spring 413 against the roller 412. This serves to lock levers 400 and 401 together and the desired normal sealing operation is accomplished.

If obstruction to the normal upward movement of the levers requiring an above normal lifting force is encountered prior to the time that locking pawl 409 is locked in position by the action of spring 413 as aforesaid (full lines FIGURE 30), the overload pressure overcomes the biasing force of the back-up spring 404 and this causes the latch lever 402 to unlatch and swing away, permitting the lever 401 to drop down from lever 400. The locking pawl 409 drops or moves down through the hole 418 under these conditions and the rest of the sealing unit also is thus freed from its driving force and no sealing takes place. A suitable alarm means (not shown) may be connected to the sealing assembly to alert the operator that there is faulty operation and probably an obstruction in the sealing area. It has been found best to employ a spring means as the abutment 413 against which the locking pawl 409 acts in order to avoid straining of the mechanism during final travel of the sealing assembly.

The above-described trip mechanism should be used with all three sealing procedures which have been set forth in this specification. If overload precautions similar and equivalent to those described are not taken, it is quite possible that sealing bars and cushions may be damaged or parts broken during the sealing procedure. The sealing bar assembly may be removed and suitably replaced for the processing of packages of various sizes and shapes.

The seal bars act in conjunction with seal cushions which mirror the seal bars in form and which are mounted on the seal cushion frame 509 (FIGURES 7 and 31 through 34). The seal cushion frame holder 508 holds the seal cushion frame 509 in place. Various sized frames may be used in the frame holder 508 depending on the needs for the particular packages being processed. All of the seal cushions are not shown in the figures, for purposes of simplifying this disclosure, but it is obvious that there must be a seal cushion against which each seal bar will act. The right seal cushion 510 is mounted on the frame 509 by means of mounting 512, the left seal cushion 511 is mounted on the frame by means of the mounting 513, and the center seal cushion 514 is mounted on the frame by means of the mounting 515. The front seal cushion 516 is similarly mounted on the frame by means of the mounting 517. Seal cushion frame clamps 518 serve to secure seal cushion frame 509 to frame holder 508.

Push-pull screw devices 585 are used to adjust the position of the seal cushions with respect to the frame. Rods 586 are necked down as at 590 as shown in FIGURE 32 and serve to hold the frame holder 508 in position. The rods 586 are shown in the holding or raising position in the T-hole slots 587. Rod guide plates 588 which are mounted on mounting blocks 589 are used to aid in the positioning of rods 586 in the removing position when the frame is removed to change seal cushion sizes or configurations. Holding rods 586 are held in either of the two positions by spring means 591 (FIGURES 32 and 34). There are four rod end bearings 592 (FIGURE 7) which are adjustable and which are connected to the rods 586. The rods 586 are pulled down tight by the eccentrics 593 during normal operation of the machine and take the full sealing load.

If it becomes necessary or desirable to raise the seals cushions to prevent sealing in the event of machine change over adjustments, or otherwise, the handle 598 may be turned to accomplish the desired raising of the assembly. The handle 598 turns a shaft 594 which in turn rotates the shaft 595 through the action of the sprockets 597 and the chain 596 (see FIGURES 7 and 5A). Both shafts turn the eccentrics 593 under each of the four rods 586 and raise the rods which in turn raise the frame 509.

The seal bars and cushions required to produce the main sealing procedure illustrated in FIGURES 39 through 42 are not shown in the figures. However, except for the difference in shape of the bars and cushions from those described for use in producing the main sealing procedure of FIGURES 35 through 38, the structure of the sealing assemblies are identical with those described above.

In FIGURE 55 there is illustrated a heating sealing mounting generally designated 452 and which is similar to that previously described. It will be seen to support a once piece or integrally fabricated sealing bar 450 in which is contained a heater element 451. The heater element 451 may be a single continuous element or it may comprise several heater elements. Rest platforms 453 are provided to support the filled package pockets during the sealing process and give substantial sliding support when the sealing unit is lowered and the packages are moved along and thereover.

In FIGURE 61 there is illustrated a modified form of seal bar in which insulation 446 is inset in the sides of the seal bar 444. A heater element 445 is contained in the seal bar 444 in the manner described heretofore. It should be noted that there is no change in the operation of the main sealing steps of the invention whether the seal bars shown in the earlier figures are used or those of FIGURE 61 are used. The insulation is applied to the seal bar by means of a suitable material which is relatively insensitive to heat such as a high temperature epoxy resin adhesive. Since the sides of the package may touch the insulation, the only requirement of the insulation is that its outside surface temperature is sufficiently lower than the temperature of the heat seal bar that no heat damage is done to the package. A drop of 50° F. can easily be attained and is satisfactory.

FIGURE 63 serves to illustrate an impulse type seal bar 476 which is seen to comprise an insulator 477, heating elements 478 and Teflon-coated Fiberglas cloth 480. The heating elements are of the timed impulse type which heat and cool quickly. The cloth 480 serves to keep the web from sticking to the seal bar assembly by preventing direct contact with the heating element. The seal bar assembly acts against the seal cushion 479 during operation.

Vacuumizing and ring sealing

FIGURES 43 through 48 and 56 illustrate the preferred structure for vacuumizing (evacuating) package clusters in packaging machines of the invention along with views of the package cluster at the evacuation station. The package cluster is designated as 159 and its central area is designated as 160. A circular or ring seal member 528 is employed to seal around the pierced opening or evacuating orifice in the web and the seal produced thereby is designated 528A (FIGURE 43.) The circular seal 528 is used in conjunction with the heater housing 529 in which is contained a heater 530 of the high resistance type (FIGURE 56).

After the partially sealed package clusters leave the main sealing station they arrive at the vacuumizing station 527 (FIGURE 56). At this station the lower web 200 is pierced, the package cluster is evacuated (vacuumized), an inert gas is injected into the cluster (if desired), and a circular or ring seal is applied around the pierced opening in the lower web. The circular heater 530 is contained in the housing 529 as before stated, and is supplied with power from a source (not shown) through leads 531. A temperature sensor 532 is provided and the same may comprise a thermistor or similar device. This is used to detect the temperature of housing 529 and the circular seal 528 and to keep them within the proper limits. Controls of this type are well-known in the art and it is believed the details of the structure and operation of these devices need not be enlarged upon herein.

A cam 533 controls the positioning of the circular seal 528 on and off the web 201 covering the filled pockets in the lower web 200. The cam follower 534 follows the cam 533 and is biased by spring 536, as shown in FIGURE 56. A bell crank arm 535 is pivotally supported at 537 on a support carried by the housing 146. Linkage generally designated 538 is connected to cam follower arm or bell crank 535 and comprises the link 539, and arms 540 and 541. Heat insulating 547 is provided to keep arm 541 from becoming overheated due to the action of heater 530. A pin 543 pivotally connects the arm 541 with the arm or lever 540, and a lock pin 542, when mounted as shown in FIGURE 56 serves to rigidly connect said arms in generally right angular relation as shown in said figure. By releasing the pin 542 and arm 541 and the ring sealer carried thereon can be swung up to the inactive or out-of-the-way position shown in dot and dash lines. The linkage pivot 548 and its support 549 are affixed to the frame 101, as shown.

In FIGURES 44 and 47 the vacuumizing unit 550 is seen to comprise a housing 551 which is mounted on mount or support 552. A vacuumizing input passage 553 is connected externally to a vacuum pump (not shown) by means of a hose 554, and internally of housing 551, to a passage 559. A gas inlet 555 is connected externally to a source of gas (not shown) by means of hose 556, and internally of housing 551, to a gas tube 558. A knife 557 is mounted in the housing 551 and is used to pierce the lower web 200 centrally of the package cluster in line with the ring sealer 528 to permit the package cluster to be vacuumized and gassed in the manner desired, and the circular seal cushion 560 also mounted in the housing 551 cooperates with the circular seal member 528 to seal around the pierced opening in said web. A spring 561 is used in connection with circular sealing assembly and constantly tends to hold the cushion ring 560 in its elevated position shown in FIGURE 45.

The operation at the vacuumizing station is as follows: the package cluster arrives at the station (FIGURE 45); vacuum is turned on by the action of the cam 435 and the web 200 is pulled down so that it is pierced by knife 557 (see FIGURE 46). It will be noted also by reference to FIGURE 46 that the vacuum action serves to draw the ring cushion 560 down against the action of the spring 561 and with it the knife 557 so as to avoid piercing of the cover web 201, and the projection of the gassing tube 558 through the just formed evacuating orifice serves to engage the cover web 201 and hold it away from the underlying central juncture of the package pockets to facilitate the desired evacuation of the pockets. Vacuum continues to be applied until the desired degree of vacuum is present in the pockets of the package cluster. Now, if desired, gas is injected into the package cluster under the control of cam 436 through hose 556 and gas tube 558. When the gas injection desired has been obtained, the circular seal member 528 is lowered into contact with the web 201 and acts in opposition to the seal cushion 560 to form a circular or ring seal 528A around the pierced opening or evacuating and gassing orifice.

It should be noted that all operations of the machine are controlled by cams which are mounted on a continuously running cam shaft so that the operations take place in the desired sequence.

In FIGURE 56, there is illustrated in detail the structure employed to apply the circular or ring seal around the pierced evacuating and gassing opening in lower web 200. In the event that it is necessary to deactuate the circular sealing assembly (for example, during test or starting procedures), the release handle 544 is raised. This causes the offset pin 545 to move to the top of its travel. This places tension on the release wire 546 and raises the heater assembly 529 sufficiently so that it cannot make contact with the webs regardless of the position of cam 533. If it is desired to lift the heater assembly 529 away from the webs entirely, to the dotted position of FIGURE 56, the pin 542 is removed and the assembly is swung about the pivot pin 543, as previously described.

The normal operation of the circular sealing step proceeds as follows: the cam follower 534 is biased by the spring 536 as shown in FIGURE 56, but when the cam low point or recess is opposite the roller 534 as shown, the roller does not quite contact said cam low point because the seal member 528 is in contact with the web 201 and applies sufficient pressure to the seal cushion 560 to produce solid seals around the pierced hole in web 200, as shown in FIGURE 47. When the cam 533 presents its high point to the roller 534, the cam follower 534 is pushed upward, the link 539 is moved to the right, and the arm 540 pivots about the pivot 548 so that the arm 541 is moved upwardly and to the left to lift the heater assembly 529 out of contact with the web.

It is important that the cam follower roller 534 does not rest on cam 533 when it is opposite the cam low point, for otherwise the heater assembly and the circular sealing member would have questionable sealing contact with the web. The spring 536 thus determines the sealing pressure in addition to biasing the linkage. The results of inadequate contact would be the making of poor ring seals.

In FIGURE 50 there is illustrated a modified arrangement wherein the lower web 200 is pierced to provide the desired vacuumizing and gassing hole or orifice prior to overlaying of the web 201 on the filled pockets formed in web 200. FIGURE 49 illustrates a package cluster center area 160 at this piercing station. The piercing station is shown to include a vertically reciprocable piercing tool 460, a web striking bar 461 and package supports 462. A vertically reciprocating member 463 is provided to support and move the piercing tool 460 up end down as required. This piercing station and the related vacuumizing, gas inserting and circular sealing station next to be described may be used in place of the single station arrangement previously described. If desired, the piercing tool carrier 463 can be a common carrier for the forming mold, the holding mold and the pocket form holding devices at the filling station.

As the package cluster leaves the piercing station, the cover web 201 is overlaid on the filled pockets as shown in FIGURE 50. Next, the main seals are applied to the package clusters and the clusters arrive at said related vacuumizing and circular sealing station. The sequence of operation at this station is illustrated in FIGURES 51 through 53. A vacuumizing unit generally designated 465 is provided and comprises a housing 466, a vacuum line 467, a gas line 468, web separator 469 and a seal cushion 470. It is noted that the seal cushion 470 is supported on a centrally apertured and externally grooved washer or ring 471 so as to provide flow passages 472 about the seal cushion, as shown in FIGURES 51 to 53. It is to be understood also that when the lower web is fully drawn into the upper or cup end of the housing 466, wrinkles are formed over the high rim of the cup. By these means desired air and gas flow between webs is assured during vacuumizing and gassing of the package pocket clusters through the then unsealed central portions thereof. The web separator 469 also serves the purpose of injecting gas into the evacuated package cluster through the holes in the web separator, when this is planned. The circular seal element 464 is heated in the usual manner and is similar in structure and function to that previously described.

Operation at this alternative vacuumizing station proceeds as follows: Vacuum is introduced into vacuum housing 466 through the vacuum line 467 and lower web 200 is drawn away from the cover web 201 in the area of the pierced hole in web 200, as shown in FIGURE 52. As vacuum pumping continues, the air is exhausted from the package pockets and the webs collapse around the product. If gas injection is desired, an inert gas is next introduced into the cluster. After the vacuumizing and the required amount of gas has been injected into the cluster, the circular seal 464 is applied around the pierced opening in lower web 200, as shown in FIGURE 53 so as to seal off all of the package pockets of the cluster from the pierced orifice.

Cross sealing

After the package cluster has been evacuated and the circular seal has been applied, the center of the cluster must be cross-sealed to complete the final sealing of all pockets of the package cluster. This is accomplished at the cross seal station 519 (FIGURE 5A).

Referring to FIGURES 5A, 57 and 58, the cross seal station 519 is seen to comprise a cruciform heat seal bar 520, a seal bar mounting 521, heat insulator means 522, a cross seal cushion 523, a cushion mount 524, a cushion mount holder 525, and mounting frame means 526. The seal bar assembly is mounted on a cam operated platform which is similar in operation to that previously described and used for moving the forming and holding molds vertically. When it is necessary to release the cross seal cushion 523 in order to prevent cross sealing, the handle 430 is raised to rotate the shaft 431. This causes the eccentric 429 to move the connecting rod 432 vertically upward. Since the connecting rod 432 is affixed to the rod 426 which supports the cushion holder 525, the upward movement of connecting rod 432 raises the seal cushion 523. The rod 426 is confined in a vertical position by a bearing 427 which is contained in a cross member 428 of the frame 101.

The operation at the cross seal station is as follows: when the center of the package cluster arrives at the station, the heated seal bar 520 (heating elements and details not shown) is raised by the action of the cam 437 to effectively oppose the seal cushion 523. This applies the cross seal to the center of the package cluster to complete the sealing of all pockets of the cluster.

Lateral or transverse cutting

There are two lateral cutters. The first is used to separate adjacent clusters and is known as the intercluster cutter, and the second is used to laterally separate adjacent sections of a single cluster and is known as the intracluster cutter. The intercluster transverse cutter 600 is seen to comprise the blade 602 and the grooved strike bar 603 (FIGURE 5A). The intracluster transverse cutter 601 is seen to comprise the blade 604 and the grooved strike bar 605.

Both of these blades are mounted on the platform 526 and are moved vertically upward by the action of cam 437. When this occurs the blades cut the clusters transversely at the required locations. The intercluster cutting takes place in the preferred form of the invention prior to evacuation, circular sealing and cross sealing, and the intracluster cutting takes place after completely closed evacuated and sealed packages have been produced.

Longitudinal slitting

Longitudinal slitting of the package clusters is accomplished by slitter means generally designated 606. The slitter means 606 (FIGURE 59) is seen to comprise a lower slitter disk 607, an upper slitter disk 608, a drive gear 609 and a driven gear 610. The lower longitudinal slitter assembly is mounted on the frame of the machine by means of a mount 614. The lower slitter disk 607 is driven synchronously with the motion of the web by a chain drive (not shown) from the same shaft 205 which drives the web clamp chain 202. The upper slitter disk 608 follows the motion of the lower slitter disk. A spring 611 is provided to obtain a positive following of the lower slitter disk by the upper slitter disk. It is preferred to employ longitudinal slitter disks which will produce a serrated or pinking cut such as is illustrated at 615 in FIGURE 60, but slitters which produce straight cuts may also be employed. These types of cutters have been referred to in the section under Sealing (general).

Freezing

It is often desirable to freeze the contents of packages produced from flexible plastic webs. Packaging machines embodying the invention readily lend themselves to such a packaging practice. In FIGURES 64 and 65 there is illustrated one novel form of packaging machine wherein the food contents which have been placed in the pockets formed in the lower web are frozen before the upper web is applied. The machine of FIGURE 64 is schematically shown to comprise a forming and loading section 485, a freezing section 486 and a finishing station 487. The sealing, vacuumizing, circular sealing, cross sealing, cutting and slitting processes all take place in the finishing station.

The character FS generally designates the freezing section at its inlet. The package clusters 159 enter the freezing tunnel 488 of the freezing section and rest on rails 490 which support the filled formed pockets, as shown in FIGURE 65. The product is frozen due to the action of the freezing agent which enters the freezing section at the inlet manifold 496 and leaves at the outlet manifold 497. The freezing agent enters the inlet manifold 496 at 489, is diverted above and below the packages through conduits 492 and proceeds through the freezing tunnel 488 to the outlet manifold 497. The freezing section is mounted on the machine frame 491.

Operation of the machine of FIGURE 64 proceeds as follows: the lower web is fed to the machine as described heretofore, the clamps grip the lower web, pockets are formed therein and then are filled. The contents of the pockets are frozen in the freezing section and the upper web is applied after the lower web leaves the freezing section. Then sealing, vacuumizing, circular sealing, cross sealing and division of the package clusters is carried on in the same manner as has already been described.

The packaging machine of FIGURE 66 is seen to comprise an input section 493, a freezing section 494 and output section 495. The processes of forming, filling and peripheral sealing take place in the input section and the processes of vacuumizing, circular sealing, cross sealing, cutting and slitting take place in the output section. In this embodiment of the invention the upper web is applied at CW to the filled lower web before the contents are frozen. Main sealing (around the periphery of the cluster and between pockets of the cluster except where it must be pierced for vacuumizing) is also done before the package contents are frozen. The freezing tunnel FT and its operation are the same as have been described in connection with the discussion of FIGURES 64 and 65.

*Starting procedure*

During the warm-up period, in which time the initial and final forming heaters, the main seal bars, the circular seal and cross seal bars come up to temperature, and the forming mold is water cooled, the lower web should be fed into the clamps and through the machine, at least past the main sealing unit after the following preliminary settings: The initial and final heaters are lowered by the lever 317; the forming and holding vacuum pump is not operating and is also valved off at the machine; the main sealing cushions are raised by the lever 598; the circle seal is lifted by the lever 544; the main vacuum pump is not operating and is also valved off at the machine; and the cross seal cushion is raised by the lever 599. The upper web can be pre-threaded under the raised main seal cushions, and held in readiness by lightly taping the loose end to the seal cushion support frame.

Operation is begun by first starting all pumps and then starting the machine and manually lifting the forming heaters into contact with the underside of the lower web. The forming and holding vacuum is switched on after at least two machine cycles to guarantee that a heated web is over the molds.

One or two additional cycles should prove that forming is under control, and then the main seal cushions are lowered. This seals and attaches the upper web to the lower web, causing the upper web to feed.

As formed and peripherally sealed empty cavities advance past the later stations, high vacuum and gas is switched on and the circular seal release is lowered. The cross seal cushion lowering completes the manual starting, and then the operator proceeds with the loading of product which should be available and waiting to be transferred at the loading station.

*Operation (FIGURES 1-5-5A)*

The web 200 is now being fed from the web roll 107 into the entry end of the machine and the edges of the web are gripped by the clamps 217 which are opened by the clamp opening assembly 229 and then close on the web margins. The opening of the clamps and the tucking of the web into the clamps have been described under Clamping the Lower Web. All of the clamps are provided with slots 239 in the end of the clamp spring. This is done in the event it is necessary or desirable to program the transverse cutting of the webs at a place midway between the spaces adjacent clamps.

The clamped web is heated by the heaters 300 and 301 and the heated web is formed into pockets in the forming molds 304. The most recently formed pockets are held in place in the holding molds 305 after they leave forming mold 304. The formed pockets are now filled (either automatically or manually) as the web proceeds along the machine. Next, the upper or cover web 201 is applied over the filled pockets in lower web 200 and the main peripheral sealing takes place at station 500. This sealing may be accomplished by any of the seal bar structures described under Sealing (general). The seals are applied around the periphery of the package cluster and between the packages of the cluster except at the central intersection or center area in which the vacuumizing will take place.

The next operation performed is that of intercluster transverse cutting at station 600, this being effective to cut each successively presented package cluster from the remainder of the web. Now, the cluster is vacuumized, injected with an inert gas and circular sealed at station 527. The cross seal is then applied at station 519 and the cluster package pairs are separated or divided transversely at station 601. Longitudinal slitting then takes place (either plain or serrated) as as 607-608 thus cutting each connected pair of packages into two individual packages. Finally, the clamps are opened by the opening assemblies 240 and the finished, now individual packages drop out of the machine into cartons or onto a conveyor (not shown).

In FIGURE 62 there is illustrated a package 161 containing product 162 such as frankfurters. This figure shows the condition of the package before vacuumizing. After vacuumizing, the webs are pulled into intimate contact with the product and no open spaces are left in the portions of the package between the container and the product.

While reference is made at this point to a packaged fill in the form of frankfurters, it is to be understood that the term "fill" is used herein in a generic sense, the particular nature of the fill having no part in the invention. It is a general purpose to package food products, but this is in no sense a requirement of the invention, and the part arrangements and structures and the method steps disclosed and claimed herein may be employed in the packaging of various kinds of food products, as well as articles or parts other than food products, within the ambit of the invention.

While preferred method steps and machine part structure and arrangement have been described in detail herein in exemplification of the invention, it is to be understood that variations in these steps and part arrangements may be made without departing from the spirit and scope of the invention as defined in the appended claims.

We claim:
1. The herein described method of forming packages which comprises, feeding a heat sealable web step-by-step and horizontally while gripping the same at its marginal edges only, heating the web to prepare it for the formation of pockets therein, successively forming clusters of pockets in the web during one of the rest positions, each cluster of pockets being defined in part by an outlining peripheral wall portion and also by longitudinal and transverse wall portions intersecting centrally to provide four adjacent pockets corners, depositing fill in the pockets of each cluster, laying a heat sealable cover web over the filled pocket clusters, heat sealing the cover web over each pocket cluster about the peripheral wall portion thereof and over the intersecting wall portions except adjacent the intersection thereof, evacuating the pockets of each cluster simultaneously through an orifice formed at the wall portion intersection thereof, and then completing the heat sealing at the wall portion intersection.

2. A method of forming packages as defined in claim 1 wherein the heat sealing over the peripheral and other wall portions except adjacent the intersection is performed in successive stages and different rest positions.

3. A method of forming packages as defined in claim 1 wherein the cluster pocket evacuation takes place through an orifice formed by piercing the pocketed web at the intersection of the wall portions and moving the cover web away into spaced relation over the intersecting wall portions coincidentally with said piercing.

4. A method as defined in claim 1 wherein completion of the sealing at each pocket cluster wall portion intersection is performed in two stages, first by a ring seal about the orifice, and second by application of a heat sealer over the wall intersecting portions still remaining unsealed.

5. A method as defined in claim 1 wherein completion of the sealing at each pocket cluster wall portion intersection is performed in two stages, first by a ring seal about the orifice, and second by application of a cruciform heater sealer over the ring seal and the wall intersecting portions still remaining unsealed.

6. A method of forming packages as defined in claim 1 wherein the cluster pocket evacuation takes place through an orifice formed by piercing the pocketed web at the intersection of the wall portions, the piercing being performed at a web rest position prior to the laying on of the cover web and the evacuation takes place at a web rest position following the laying on of the cover web, the cover web being held away in spaced relation over the intersecting wall portions during the evacuation by pressure applied through the evacuating orifice and against the cover web.

7. A method of forming packages as defined in claim 1 wherein the heat sealing over the peripheral and other wall portions except adjacent the intersection is performed simultaneously at a single rest station.

8. A method of forming packages as defined in claim 1 wherein the heat sealing over the peripheral and other wall portions except adjacent the intersection is performed simultaneously at a single rest station and is followed by the evacuation through the orifice at another rest position whereat a ring seal is formed about the orifice, and wherein there follows a final sealing over the ring seal and the wall intersecting portions still remaining unsealed at yet another rest station.

9. A method as defined in claim 1 wherein the sealed pocketed and cover webs are transversely and longitudinally cut to separate the packages of each cluster into four individual packages.

10. A method as defined in claim 1 wherein the sealed pocketed and cover webs are transversely and longitudinally cut to separate the packages of each cluster into four individual packages by first made transverse cutting dividing the cluster into two pairs of packages, and by second cutting longitudinally and dividing the package pairs into individual packages.

11. A method as defined in claim 1 wherein the sealed pocketed and cover webs are transversely and longitudinally cut to separate the packages of each cluster into four individual packages, this cutting being performed prior to releasing of the gripping action at the marginal edges of the webs.

12. A method as defined in claim 1 wherein the sealed pocketed and cover webs are transversely and longitudinally cut to separate the packages of each cluster into four individual packages by first made transverse cutting dividing the cluster into two pairs of packages, and by second cutting longitudinally and dividing the package pairs into individual packages, this cutting being performed prior to a releasing of the gripping action at the marginal edges of the webs.

13. A method as defined in claim 1 wherein the sealed pocketed and cover webs are transversely and longitudinally cut to separate the packages of each cluster into four individual packages by a first transverse cut separating a cluster from a following cluster, a second transverse cut dividing a separated cluster into two pairs of packages, and by a third cutting longitudinally and dividing the package pairs into individual packages.

14. A method as defined in claim 1 wherein the sealed pocketed and cover webs are transversely and longitudinally cut to separate the packages of each cluster into four individual packages by a first transverse cut separating a cluster from a following cluster, a second transverse cut dividing a separated cluster into two pairs of packages, and by a third cutting longitudinally and dividing the package pairs into individual packages, said first and second transverse cuts being made simultaneously.

15. A method as defined in claim 1 wherein the sealed pocketed and cover webs are transversely and longitudinally cut to separate the packages of each cluster into four individual packages by a first transverse cut separating a cluster from a following cluster, a second transverse cut dividing a separated cluster into two pairs of packages, and by a third cutting longitudinally and dividing the package pairs into individual packages, said first and second transverse cuts being made simultaneously, and all of said cutting being performed prior to releasing of the gripping action at the marginal edges of the webs.

16. In a package forming machine, the combination of means including marginal edge gripping devices for feeding a heat sealable web step-by-step horizontally and in taut condition, means providing a pocket forming station, means in advance of said station for heating the web to prepare it for the formation of pockets therein, means at said station and effective at each stop step of the web for forming a cluster of pockets in the web each cluster being defined in part by an outlining peripheral wall portion and also by wall portions intersecting centrally to provide four adjacent pocket corners, a filling station beyond the forming station and at which fill is received in the pockets, means for applying a heat sealable cover web over filled pocket clusters, means for heat sealing said cover web over each pocket cluster about the peripheral wall portion thereof and over the intersecting wall portions thereof except at and adjacent the intersection of said intersecting wall portions, means for forming a pocket evacuating orifice at the intersection of wall portions of each pocket cluster, means for evacuating all pockets of each cluster simultaneously through its evacuating orifice and said unsealed portions at the adjacent pocket corners, and means for completing the heat sealing of the cluster of pockets at its wall portion intersection and said adjacent wall portions.

17. Package forming machine structure as defined in claim 16 wherein the means for heat sealing the cover web includes devices operable in successive stages at different rest positions in the step-by-step web feed.

18. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation.

19. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice.

20. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice, there also being included means supporting the piercing element for movement relative to the pressure applying element upon initiation of the vacuum drawing action.

21. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice and said pressure applying element being hollow and having outlet means adjacent its cover web engaging portion through which a gas may be introduced into the cluster pockets while the cover web is being held away.

22. Package forming machine structure as defined in claim 16 wherein the means for heat sealing the cover web includes individual sets of sealer bars operable in successive stages at different rest positions in the step-by-step web feed, each said bar set being devoid angularly connected corners.

23. Package forming machine structure as defined in claim 16 wherein the means for completing the heat sealing of the cluster of pockets includes a first operable ring seal engageable about the evacuating orifice, and a second operable sealer means engageable with the wall intersecting portions then remaining unsealed.

24. A package forming machine structure as defined in claim 16 wherein the means for completing the heat sealing of the cluster of pockets includes a first operable ring seal engageable about the evacuating orifice, and a second operable cruciform sealer engageable with the ring seal effected seal and the wall intersecting portions still remaining unsealed.

25. Package forming machine structure as defined in claim 16 wherein the means for heat sealing over the peripheral and other wall portions except at and adjacent the intersection of the intersecting wall portions comprises heat sealer bar means mounted for presentation at a single rest position in the step-by-step web feed.

26. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice, there also being included means supporting the piercing element for movement relative to the pressure applying element upon initiation of the vacuum drawing action and including a cushion member surrounding the piercing element, the means for completing the heat sealing of the cluster of pockets including a ring seal engageable about the evacuating orifice and in opposition to said cushion member.

27. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice, there also being included means supporting the piercing element for movement relative to the pressure applying element upon initiation of the vacuum drawing action, and there also being included means for vertically reciprocating the ring seal in timed relation to the step-by-step web feed.

28. Package forming machine structure as defined in claim 16 wherein the evacuating orifice formation and the cluster pocket evacuation take place at the same station and there is included means at said same station for moving the cover web away into spaced relation over the intersecting wall portions coincidentally with the orifice formation, said orifice forming means comprising a piercing element over which the pocketed web is vacuum drawn to pierce the web and form the orifice and said means for moving the cover web away comprising a pressure applying element disposed beside the piercing element and engageable with the cover web through the formed orifice, there also being included means supporting the piercing element for movement relative to the pressure applying element upon initiation of the vacuum drawing action, and there also being included means for vertically reciprocating the ring seal in timed relation to the step-by-step web feed, and means effective in the mounting of the ring seal for permitting movement thereof to an out-of-the-way position away from its operative position of vertical reciprocation.

29. Package forming machine structure as defined in claim 16 wherein the pocket cluster forming means are disposed to place the intersecting pocket defining wall portions longitudinally and transversely with relation to the direction of web feed, and there being included means for longitudinally and transversely cutting each filled and sealed package cluster into four individual packages.

30. Package forming machine structure as defined in claim 16 wherein the pocket cluster forming means are disposed to place the intersecting pocket defining wall portions longitudinally and transversely with relation to the direction of web feed, and there being included first effective transverse cutter means for cutting each filled and sealed package cluster into two pairs of packages, and next effective longitudinal cutter means for cutting each pair of packages into individual packages.

31. Package forming machine structure as defined in claim 16 wherein the pocket cluster forming means are disposed to place the intersecting pocket defining wall portions longitudinally and transversely with relation to the direction of web feed, and there being included a simultaneously operable pair of transverse cutters effective to cut a package cluster from the webs and to divide a package cluster into package pairs, and a longitudinal cutter means for cutting each package pair into individual packages.

32. Package forming machine structure as defined in claim 16 wherein the pocket cluster forming means are disposed to place the intersecting pocket defining wall portions longitudinally and transversely with relation to the direction of web feed, and there being included first effective transverse cutter means for cutting each filled and sealed package cluster into two pairs of packages, and next effective longitudinal cutter means for cutting each pair of packages into individual packages, and means for releasing the web marginal edge gripping devices only after the cutting of the package clusters into individual packages has been completed.

33. Package forming machine structure as defined in claim 16 wherein the pocket cluster forming means are disposed to place the intersecting pocket defining wall portions longitudinally and transversely with relation to the direction of web feed, and there being included a simultaneously operable pair of transverse cutters effective to cut a package cluster from the webs and to divide a package cluster into package pairs, and a longitudinal cutter means for cutting each package pair into individual packages, and there also being included means for releasing the web marginal edge gripping devices only after the cutting of the package clusters into individual packages has been completed.

34. Package forming machine structure as defined in claim 16 wherein the means for completing the heat sealing of the cluster of pockets includes a first operable ring seal engageable about the evacuating orifice, and a second operable cruciform sealer engageable with the ring seal effected seal and the wall intersecting portions still remaining unsealed, the pocket cluster forming means being disposed to place the intersecting pocket defining wall portions longitudinally and transversely with relation to the direction of web feed, and there being included a simultaneously operable pair of transverse cutters effective to cut a package cluster from the webs and to divide a package cluster into package pairs, and a longitudinal cutter means for cutting each packaged pair into individual packages, and there also being included a common vertically reciprocable carrier on which said pair of transverse cutters and the cruciform sealer are mounted.

35. Package forming machine structure as defined in claim 16 where the means for completing the heat sealing of the cluster of pockets includes a first operable ring seal engageable about the evacuating orifice, and a second operable cruciform sealer engageable with the ring seal effected seal and the wall intersecting portions still remaining unsealed, the pocket cluster forming means being disposed to place the intersecting pocket defining wall portions longitudinally and transversely with relation to the direction of web feed, and there being included a simultaneously operable pair of transverse cutters effective to cut a package cluster from the webs and to divide a package cluster into package pairs, and a longitudinal cutter means for cutting each package pair into individual packages, and there also being included a common vertically reciprocable carrier on which said pair of transverse cutters and the cruciform sealer are mounted, the pocket evacuating means including a vertically reciprocable head also mounted on said common carrier.

36. Package forming machine structure as defined in claim 16 wherein the pocket cluster forming means are disposed to place the intersecting pocket defining wall portions longitudinally and transversely with relation to the direction of web feed, and there being included first effective transverse cutter means for cutting each filled and sealed package cluster into two pairs of packages, and next effective longitudinal cutter means for cutting each pair of packages into individual packages and comprising opposed cutting disks having meshing serrated cutting edges.

37. Package forming machine structure as defined in claim 16 wherein the pocket cluster forming means are disposed to place the intersecting pocket defining wall portions longitudinally and transversely with relation to the direction of web feed, and there being included first effective transverse cutter means for cutting each filled and sealed package cluster into two pairs of packages, and next effective longitudinal cutter means for cutting each pair of packages into individual packages and comprising opposed cutting disks having meshing serrated cutting edges, one said disk being spring pressed against the other disk, and there being included means for imparting rotation to said other disk.

38. Package forming machine structure as defined in claim 16 wherein the web heating means comprises heated plate means over which the web is drawn, means being included for yieldably holding the heater plate means in a web contacting and heating position, and manually operable toggle support means for displacing the heater plate means to an ineffective position.

39. Package forming machine structure as defined in claim 16 wherein the web heating means comprises heater plate means over which the web is drawn, a supporting platform on which the heater plate means is mounted through insulator devices, platform supporting toggle links, spring means normally holding the links erect for effectively placing the heater plate means, and manually operable means for breaking the toggle link support and displacing the heater plate means from its effective position.

40. Package forming machine structure as defined in claim 16 wherein the web heating means includes a heater paralleling and overlying the web, rail and roller means supporting the heater for movement along the path of the web, and means for moving the heater along with the web from a position in advance of the pocket forming station to and over said station and then back to the first mentioned position.

41. Package forming machine structure as defined in claim 16 wherein the web heating means includes a heater paralleling and overlying the web, rail and roller means supporting the heater for movement along the path of the web, and means for moving the heater along with the web from a position in advance of the pocket forming station to and over said station and then back to the first mentioned position, there also being included other supporting rail means, and said heater being swingable from its position paralleling the web to an out-of-the-way position supported on said other rail means so that it can move back and forth ineffectively on said other rail means.

42. Package forming machine structure as defined in claim 16 wherein the pocket cluster forming means comprises a forming mold having therein a cluster of four forming cavities defined by floors and cooperating upstanding longitudinal and transverse peripheral walls and longitudinal and transverse centrally intersecting walls defining four adjacent corners, the cavity pockets having evacuating orifices formed in bottom corners thereof in communication with a vacuum source through cam actuated valve means, and there being included vertically reciprocable forming mold carrying platform means effective to alternately lift the mold to present its walls in contact with the overlying web during a pocket forming web stop interval and then lower the mold out of the way to permit step feeding of the web after the formation of a pocket cluster therein.

43. Package forming machine structure as defined in claim 16 wherein the pocket cluster forming means comprises a forming mold having therein a cluster of four forming cavities defined by floors and cooperating upstanding longitudinal and transverse peripheral walls and longitudinal and transverse centrally intersecting walls defining four adjacent corners, the cavity pockets having evacuating orifices formed in bottom corners thereof in communication with a vacuum source through cam actuated valve means, and there being included vertically reciprocable forming mold carrying platform means effective to alternately lift the mold to present its walls in contact with the overlying web during a pocket forming web stop interval and then lower the mold out of the way to permit step feeding of the web after the formation of a pocket cluster therein, and there being included also a pocket holding mold like the forming mold and in like manner platform supported and connected with a vacuum source through cam actuated valve means and in the pockets in which each pocket cluster formed in the forming mold will be received to be restored to initially formed shape if necessary and held in said initially formed shape by a drawn vacuum.

44. Machine structure as defined in claim 43 wherein the forming mold and the holding mold are carried by and movable with the same platform means.

45. Machine structure as defined in claim 42 wherein there is also included means for holding the formed pockets against deformation while fill is being placed therein at the filling station.

46. Machine structure as defined in claim 43 wherein there is also included means for holding the formed pockets against deformation while fill is being placed therein at the filling station.

47. Machine structure as defined in claim 43 wherein there is also included means for holding the formed pockets against deformation while fill is being placed therein at the filing station, and wherein the forming mold, the holding mold and at least in part the means for holding the formed pockets against deformation are carried by and movable with the same platform.

48. Machine structure as defined in claim 42 wherein there is also included means for holding the formed pockets against deformation while fill is being placed therein at the filling station, said last named means including stationary bottom supports and upright support rails rising thereabove and vertically reciprocable transverse support rails.

49. Machine structure as defined in claim 42 wherein there is also included means for holding the formed pockets against deformation while fill is being placed therein at the filling station, said last named means including stationary bottom supports and upright support rails rising thereabove and vertically reciprocable transverse support rails, and wherein the forming mold, the holding mold and said transverse support rails are carried by and movable with the same platform.

50. Machine structure as defined in claim 42 wherein there is also included means for holding the formed pockets against deformation while fill is being placed therein at the filling station, said last named means including stationary bottom supports and upright support rails rising thereabove and vertically reciprocable transverse support rails, and wherein the forming mold, the holding mold and said transverse support rails are carried by and movable with the same platform, said platform also serving as a support and actuator for the means for forming the pocket evacuating orifice at the intersection of wall portions of each pocket cluster.

51. Package forming machine structure as defined in claim 16 wherein the evacuating means includes a vertically reciprocable head engageable about the evacuating orifice, the means for forming the orifice being carried by said head.

52. Package forming machine structure as defined in claim 16 wherein the evacuating means includes a vertically reciprocable head engageable about the evacuating orifice, the means for forming the orifice being carried by said head, and there also being included on said head means operable through the orifice to lift the cover web away to provide an evacuating space over the wall portion intersection.

53. Package forming machine structure as defined in claim 16 wherein the evacuating means includes a vertically reciprocable head engageable about the evacuating orifice, the means for forming the orifice being carried by said head, and there also being included on said head means operable through the orifice to lift the cover web away to provide an evacuating space over the wall portion intersection, said cover lifting means being hollow and there also being provided means for directing a gas through the lifting means into the space under the cover web provided by said lifting thereof.

54. In a package forming machine, means for feeding a web step-by-step horizontally and in taut condition, means providing a pocket forming station, means in advance of said station for heating the web to prepare it for formation of pockets therein, a forming mold at said station having therein a plurality of cavities defined by floors and cooperating upstanding and transverse walls defining the cavities, said cavities having evacuating orifices in bottom corners thereof in communication with a vacuum source through cam actuated valve means, vertically reciprocable means supporting the mold and effective to alternately lift the mold to present its walls in contact with the overlying web during a pocket forming web stop interval and then lower the mold out of the way to permit step feeding of the web after formation of pockets in the mold cavities, said feeding means including a pair of parallel spaced endless chains with clamps thereon positioned to grip the web at marginal edge portions, wherein each chain clamp comprises a rigid base member forming one jaw of the clamp on which to receive a marginal edge portion of the web, an opposing leaf spring jaw having a free clamping end and a remote portion anchored on the base member so that the free clamping end constantly will tend to close against the base jaw, and a roller carried on the leaf spring jaw adjacent its free end, and there also being included cam means engageable with the clamp rollers to first separate the jaws of each clamp to open the clamp and then permit the respective leaf spring jaws to move to their clamp closed positions, and means for placing web marginal edge portions between the jaws of opened clamps.

55. In a package forming machine, means for feeding a web step-by-step horizontally and in taut condition, means providing a pocket forming station, means in advance of said station for heating the web to prepare it for formation of pockets therein, a forming mold at said station having therein a plurality of cavities defined by floors and cooperating upstanding and transverse walls defining the cavities, said cavities having evacuating orifices in bottom corners thereof in communication with a vacuum source through cam actuated valve means, vertically reciprocable means supporting the mold and effective to alternately lift the mold to present its walls in contact with the overlying web during a pocket forming web stop interval and then lower the mold out of the way to permit step feeding of the web after formation of pockets in the mold cavities, said feeding means including a pair of parallel spaced endless chains with clamps thereon positioned to grip the web at marginal edge portions, wherein each chain clamp comprises a rigid base member forming one jaw of the clamp on which to receive a marginal edge portion of the web, an opposing leaf spring jaw having a free clamping end and a remote portion anchored on the base member so that the free clamping end constantly will tend to close against the base jaw, and a roller carried on the leaf spring jaw adjacent its free end, and there also being included in association with each chain a stationarily mounted cam receivable between the jaws of each oncoming clamp and engageable by the clamp rollers so as to first move the leaf spring jaws to their clamp open positions and then permit the leaf spring jaws to move to closed position as the rollers move out of engagement therewith, and means for placing web marginal edge portions between the jaws of opened clamps.

56. In a package forming machine, means for feeding a web step-by-step horizontally and in taut condition, means providing a pocket forming station, means in advance of said station for heating the web to prepare it for formation of pockets therein, a forming mold at said station having therein a plurality of cavities defined by floors and cooperating upstanding and transverse walls defining the cavities, said cavities having evacuating orifices in bottom corners thereof in communication with a vacuum source through cam actuated valve means, vertically reciprocable means supporting the mold and effective to alternately lift the mold to present its walls in contact with the overlying web during a pocket forming web stop interval and then lower the mold out of the way to permit step feeding of the web after formation of pockets in the mold cavities, said feeding means including a pair of parallel spaced endless chains with clamps thereon positioned to grip the web at marginal edge portions, wherein each chain clamp comprises a rigid base member forming one jaw of the clamp on which to receive a marginal edge portion of the web, an opposing leaf spring jaw having a free clamping end and a remote portion anchored on the base member so that the free clamping end constantly will tend to close against the base jaw, and a roller carried on the leaf spring jaw adjacent its free end, and there also being included in association with each chain a stationarily mounted cam receivable between the jaws of each oncoming clamp and engageable by the clamp rollers so as to first move the leaf spring jaws to their clamp open positions and then permit the leaf spring jaws to move to closed position as the rollers move out of engagement therewith, and stationary edge tucker means for guiding marginal edge portions of the moving web into position between the clamp jaws after opening of the clamps and before closing thereof.

57. In a package forming machine, means for feeding a web step-by-step horizontally and in taut condition, means providing a pocket forming station, means in advance of said station for heating the web to prepare it for formation of pockets therein, a forming mold at said station having therein a plurality of cavities defined by floors and cooperating upstanding and transverse walls defining the cavities, said cavities having evacuating orifices in bottom corners thereof in communication with a vacuum source through cam actuated valve means, vertically reciprocable means supporting the mold and effective to alternately lift the mold to present its walls in contact with the overlying web during a pocket forming web stop interval and then lower the mold out of the way to permit step feeding of the web after formation of pockets in the mold cavities, said feeding means including a pair of parallel spaced endless chains with clamps thereon positioned to grip the web at marginal edge portions, wherein each clamp on each chain has a slot through free inwardly directed jaw portions opposing and transversely aligned with a like slot on a clamp on the other chain, the clamps on each chain being closely spaced to provide slots therebetween corresponding to and equidistantly spaced with said clamp slots, and there being included reciprocable cutter means for transversely cutting the web between pockets and receivable through the clamp slots or the clamp spacing slots depending upon relative positioning of the chains and cutter means at a particular operational set up of the machine.

58. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means and including adjustable spring devices for applying a variably yielding force in the movement of the sealer bars against the cushion opposed web portions, wherein the carrier reciprocating means includes an actuater arm having two arm portions, there also being included means releasably latching said arm portions to move in unison in a direction for moving the sealer bars toward the cushion opposed webs and releasable upon imposition of an overload to permit one arm portion to move ineffectively relative to the other arm portion.

59. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means and including overload release devices for discontinuing movement of the sealer bars toward the cushion opposed web portions upon the meeting of some obstruction imposing a predetermined overload incidental to movement of the carrier and means for positively locking the reciprocating means against overload release after the sealer bars have reached a predetermined spaced relation to the overlying cushion means.

60. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means and including adjustable spring devices for applying a variably yielding force in the movement of the sealer bars against the cushion opposed web portions, and there also being included means for positively locking the arm portions for movement together without overload release after the sealer bars have reached a predetermined spaced relation to the overlying cushion means.

61. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means and including adjustable spring devices for applying a variably yielding force in the movement of the sealer bars against the cushion opposed web portions, wherein the carrier reciprocating means includes a generally horizontally disposed actuater arm means pivotally mounted at one end and having its other end connected with the carrier, said arm means including an inner arm portion and an outer arm portion, and a spring pressed swingably mounted latch carried by one arm portion and engageable with a part of the other arm portion to releasably latch the arm portions to move in unison in a direction for moving the sealer bars toward the cushion opposed webs and releasable upon imposition of an overload to permit one arm portion to move ineffectively relative to the other arm portion.

62. Machine structure as defined in claim 61 wherein there also are included means for positively locking the arm portions for movement together after the sealer bars have reached a predetermined spaced relation to the overlying cushion means in movement theretoward.

63. Machine structure as defined in claim 61 wherein there also are included means for positively locking the arm portions for movement together after the sealer bars have reached a predetermined spaced relation to the overlying cushion means in movement theretoward, said last named means comprising a locking pawl carried by one arm portion and engageable in locking contact with a part of the other arm portion, said pawl including a projecting crank portion, and there being included a stationarily mounted actuater engageable by said crank portion for effecting an arm portion locking positioning of the pawl during movement of the arm portions while releasably latched together.

64. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means, there also being included means for lifting and lowering the cushion carrying frame to displace it from and return it to the effective cushion and heat sealer bar opposing position.

65. Machine structure as defined in claim 64 wherein the means for lifting and lowering the cushion carrying frame includes frame supporting standards and crank and eccentric actuaters for vertically reciprocating said standards.

66. In a package forming machine, means for feeding a heat sealable web step-by-step horizontally, means providing a pocket forming station, means in advance of said station for heating the web to prepare it for the formation of pockets therein, means at said station and effective at each stop step of the web for forming a cluster of depending pockets in the web, a filling station beyond the forming station and at which fill is received in the pockets, means for applying a heat sealable cover web over filled pocket clusters, and means for heat sealing said cover web over each pocket cluster and including a frame carrying cushions overlying the cover web and the pockets in the web therebeneath and vertically reciprocable heat sealer bars operable between and about the depending pockets and engageable with the webs against said cushions, carrier means for the sealer bars, and means for vertically reciprocating the carrier means, there also being included in said carrier means devices in the form of slide bearing and ball and socket means mounting the sealer bars for self aligning movement when contacting the cushion opposed webs.

67. Package forming machine structure as defined in claim 16 wherein the pocket cluster forming means are disposed to place the intersecting pocket defining wall portions longitudinally and transversely with relation to the direction of web feed, and there being included means for longitudinally and transversely cutting each filled and sealed package cluster into four individual packages, said means for transversely cutting comprising a cutting having a saw toothed cutting edge and opposed by a web striker bar having a groove in which to receive said cutting edge.

68. Package forming machine structure as defined in claim 16 wherein the pocket cluster forming means are disposed to place the intersecting pocket defining wall portions longitudinally and transversely with relation to the direction of web feed, and there being included a simultaneously operable pair of transverse cutters effective to cut a package cluster from the webs and to divide a package cluster into package pairs, and a longitudinal cutter means for cutting each package pair into individual packages, each said transverse cutter having a saw toothed cutting edge and being opposed by a web striker bar having a groove in which to receive said cutting edge.

69. Package forming machine structure as defined in claim 16 wherein the means for completing the heat sealing of the cluster of pockets includes a first operable ring seal engageable about the evacuating orifice, and a second operable sealer means engageable with the wall intersecting portions then remaining unsealed, and there also being included means for vertically reciprocating the ring seal in timed relation to the step-by-step web feed, and means effective in the mounting of the ring seal for permitting movement thereof to an out-of-the-way position away from its operative position of vertical reciprocation.

70. Package forming machine structure as defined in claim 16 wherein the means for completing the heat sealing of the cluster of pockets includes a first operable ring seal engageable about the evacuating orifice, and a second operable sealer means engageable with the wall intersecting portions then remaining unsealed, and there also being included means for vertically reciprocating the ring seal in timed relation to the step-by-step web feed, and means effective in the mounting of the ring seal for permitting movement thereof to an out-of-the-way position away from its operative position of vertical reciprocation, said ring seal reciprocating means including an upright actuater arm pivoted intermediate its ends and having a right angular upper end portion, a generally horizontal link pivoted at one end on said right angular upper end and carrying the ring sealer at its other end, there also being included a releasable connection between said link and said right angular upper end spaced from the link pivot and releasable to permit the ring sealer to be swung up about the pivot to an out-of-the-way position, a rotary cam, a bell crank and follower engaging the cam, and an actuator link connecting the bell crank and the lower end of the actuater arm.

71. The machine structure as defined in claim 70 wherein there also is included a manually operable rock shaft having thereon an eccentric crank means, and means connecting the eccentric crank means with the ring seal carrying link so that by rocking of the rock shaft the ring seal carrying link can be lifted and lowered a limited distance to displace the ring sealer from its effective position and then again replace it in said effective position.

72. The machine structure defined in claim 70 wherein the rotary cam has a peripheral edge portion effective to bring about a lifting of the ring seal out of its heat sealing contact with the webs to be sealed and a depression to receive the follower and allow the ring sealer to rest in heat sealing contact with said webs, said depression being deep enough always to assure against engagement of the follower with the cam within the recess thus to avoid interference with pressure application of the ring sealer necessary to provide a fully efficient heat seal.

73. Package forming machine structure as defined in claim 16 wherein the means for completing the heat sealing of the cluster of pockets includes a first operable ring seal engageable about the evacuating orifice, and a second operable cruciform sealer engageable with the ring seal effected seal and the wall intersecting portions still remaining unsealed, there also being included cushion means opposing the cruciform sealer, and manually operable means for lifting said cushion means away from its effective cooperative relation to the cruciform sealer and for again returning it to said cooperative relation.

74. Package forming machine structure as defined in claim 16 wherein the means for completing the heat sealing of the cluster of pockets includes a first operable ring seal engageable about the evacuating orifice, and a second operable cruciform sealer engageable with the ring seal effected seal and the wall intersecting portions still remaining unsealed, there also being included cushion means opposing the cruciform sealer, means for vertically reciprocating the cruciform heat sealer toward and from the cushion means and manually operable means for lifting said cushion means away from its effective cooperative relation to the cruciform sealer and for again returning it to said cooperative relation.

75. Package forming machine structure as defined in claim 16 wherein the means for completing the heat sealing of the cluster of pockets includes a first operable ring seal engageable about the evacuating orifice, and a second operable cruciform sealer engageable with the ring seal effected seal and the wall intersecting portions still remaining unsealed, there also being included cushion means opposing the cruciform sealer, means for vertically reciprocating the cruciform heat sealer toward and from the cushion means and manually operable means including crank and eccentric actuater devices for lifting said cushion means away from its effective cooperative relation to the cruciform sealer and for again returning it to said cooperative relation.

76. Machine structure as defined in claim 35 wherein the vertically reciprocable pocket vacuumizing head has a cup shaped upper end engageable with pocketed web and having therein a cushion ring opposed to the ring seal, and there being included means mounting the cushion ring effective in form and position to provide flow passages about the ring cushion in the cup shaped head end beneath the overlying pocketed web.

77. Machine structure as defined in claim 35 wherein the vertically reciprocable pocket vacuumizing head has a cup shaped upper end engageable with pocketed web and having therein a cushion ring opposed to the ring seal, said cushion ring having its periphery spaced inward from the interior of the cup shaped upper end of the vacuumizing head, and there being included a washer supporting cushion ring and shaped to provide flow passages thereabout and providing communication between the flow passages about the cushion ring and the vacuumizing source through said head.

78. Machine structure as defined in claim 35 wherein the vertically reciprocable pocket vacuumizing head has a cup shaped upper end engageable with pocketed web and having therein a cushion ring opposed to the ring seal, and there being included means mounting the cushion ring effective in form and position to provide flow passages about the ring cushion in the cup shaped head end beneath the overlying pocketed web, the means for forming the evacuating orifice being disposed to function prior to the application of the cover web over the filled pocket clusters, and there also being included a member carried by the vacuumizing head and operable through the evacuating orifice to move the cover web away into spaced relation over the intersecting wall portions of pocket clusters.

79. Machine structure as defined in claim 35 wherein the vertically reciprocable pocket vacuumizing head has a cup shaped upper end engageable with pocketed web and having therein a cushion ring opposed to the ring seal, and there being included means mounting the cushion ring effective in form and position to provide flow passages about the ring cushion in the cup shaped head end beneath the overlying pocketed web, the means for forming the evacuating orifice being disposed to function prior to the application of the cover web over the filled pocket clusters, and there also being included a member carried by the vacuumizing head and operable through the evacuating orifice to move the cover web away into spaced relation over the intersecting wall portions of pocket clusters, said last named member being hollow and having outlet means adjacent its cover web engaging portion through which a gas may be introduced into the cluster pockets while the cover web is being held away.

80. In a machine of the character described, means for moving a heat sealable bottom web step-by-step, means for forming groups of fill receiving pockets in the web during rest intervals in the feeding thereof, means providing a filling station for depositing fill in said pockets, conveyor means for delivering fill units to the filling station at at least one side of the machine, and a conveyor stop control means including a trip lever disposed for contact by a fill unit not removed from the conveyor means as intended and effective to bring about a stopping of the conveyor carrying the lever contacted fill unit toward said pockets, means for applying a heat sealable cover web over the formed pockets after filling thereof, and means for heat sealing the applied cover web to the pocketed bottom web to seal the fill in package form.

81. In a machine of the character described, means for feeding a web in a taut condition and including a pair of parallel spaced driven endless chains and clamps thereon disposed to grip the web at marginal edge portions, said clamps including separable jaws engageable at opposite sides of the web marginal edge portions, and there also being included stationarily mounted cam means engageable between the clamp jaws of individual clamps during movement of the chains to separate the clamp jaws and permit introduction of the web marginal edge portions therebetween.

82. Machine structure as defined in claim 81 wherein the chains are carried and guided on laterally shiftable frame members, and right and left thread screw devices are provided for simultaneously moving said frame members toward or from each other for varying the spaced relation of the chains.

83. In a machine of the character described, means for feeding a web in a taut condition and including a pair of parallel spaced driven endless chains and clamps thereon disposed to grip the web at marginal edge portions, each chain clamp comprises a rigid base member forming one jaw of the clamp on which to receive a marginal edge portion of the web, an opposing leaf spring jaw having a free clamping end and a remote portion anchored on the base member so that the free clamping end constantly will tend to close against the base jaw, and a roller carried on the leaf spring jaw adjacent its free end, and there also being included cam means engageable with the clamp rollers to first separate the jaws of each clamp to open the clamp and then permit the respective leaf spring jaws to move to their clamp closed positions, and means for placing web marginal edge portions between the jaws of opened clamps.

84. In a machine of the character described, means for feeding a web in a taut condition and including a pair of parallel spaced driven endless chains and clamps thereon disposed to grip the web at marginal edge portions, each chain clamp comprises a rigid base member forming one jaw of the clamp on which to receive a marginal edge portion of the web, an opposing leaf spring jaw having a free clamping end and a remote portion anchored on the base member so that the free clamping end constantly will tend to close against the base jaw, and a roller carried on the leaf spring jaw adjacent its free end, and there also being included cam means engageable with the clamp rollers to first separate the jaws of each clamp to open the clamp and then permit the respective leaf spring jaws to move to their clamp closed positions, and means for placing web marginal edge portions between the jaws of opened clamps, each said last named means including a web edge camming and guide edge mounted stationarily with the respective cam means.

85. In a machine of the character described, means for advancing a pocketed web and a pocket covering web to a heat sealing station whereat said webs are to be heat sealed together at engaging pocket defining wall portions, heat sealer bar means movable toward and from said wall portions, cushion bar means and mounting bars therefor opposing and cushioning pressure contact of the sealer bar means with said wall portions, and screw means for locally adjusting the cushioning pressure sealer bar opposition by local deflection of said mounting bars to correct local defects in seals and assure efficient sealing together of said webs at said pocket defining wall portions.

86. In a package forming machine, the combination comprising means for feeding a heat sealable web in step-by-step motion, means for horizontally gripping said web at its marginal edges only, means for heating the web in preparation for the formation of pockets therein, means for successively forming clusters of pockets in the webs during one of the rest positions, said means for forming clusters including a means for defining each cluster of pockets in part by an outlining peripheral wall portion and in part by wall portions which intersect within said outlining peripheral wall portion to provide a plurality of adjacent pocket corners; means depositing fill in the pockets of each cluster, means for laying a heat sealable cover web over the filled pocket clusters, means for heat sealing the cover web over each pocket cluster about the peripheral wall portion thereof and over the wall portions within said intersecting wall portions except at and adjacent the intersection of said intersecting wall portions, means for evacuating the pockets of each cluster simultaneously through an orifice formed at a wall portion intersection thereof, and means for completing the heat sealing at the wall portion intersection.

87. The combination of claim 86 wherein said means for forming clusters includes forming cavities, means for drawing the web into the forming cavities to form pockets and means for retaining the shape of the pockets once formed.

88. The combination of claim 87 wherein the shape retaining means includes forming cavities.

89. In a package forming machine, the combination comprising means for feeding a heat-sealable web in step-by-step motion, means for horizontally gripping said web at its marginal edges only, means for heating the web in preparation for the formation of pockets therein, means for successively forming clusters of pockets in the web at one rest position, and means at an adjacent rest position for holding the previously and successively formed clusters of pockets, each said means for forming and holding clusters including cavities and pressure differential means for drawing the web into pocket cluster shape.

References Cited by the Examiner

UNITED STATES PATENTS

| | | | |
|---|---|---|---|
| 1,810,864 | 6/1931 | Vogt | 53—25 X |
| 2,395,387 | 2/1946 | Fry et al. | |
| 2,557,492 | 6/1951 | Young. | |
| 2,586,580 | 2/1952 | Truscott | 53—77 X |
| 2,712,717 | 7/1955 | Keller | 53—184 X |
| 2,796,913 | 6/1957 | Fener et al. | |
| 2,888,788 | 6/1959 | Gerbhardt | 53—112 X |
| 2,898,715 | 8/1959 | Cella | 53—166 X |
| 3,029,007 | 4/1962 | Hepner | 226—173 |
| 3,061,984 | 11/1962 | Mahaffy | 53—112 X |
| 3,118,262 | 1/1964 | Messick | 53—184 |

TRAVIS S. McGEHEE, *Primary Examiner.*